US012737763B2

(12) United States Patent
Robell et al.

(10) Patent No.: US 12,737,763 B2
(45) Date of Patent: Sep. 15, 2026

(54) TECHNOLOGIES FOR CREATING NON-FUNGIBLE TOKENS FOR KNOW YOUR CUSTOMER AND ANTI-MONEY LAUNDERING

(71) Applicant: FORTIOR SOLUTIONS, LLC, Hillsboro, OR (US)

(72) Inventors: James Frederick Robell, Beaverton, OR (US); James G. Hart, Hillsboro, OR (US); Qui Quoc Hoang, Portland, OR (US); Viet Quoc Hoang, Portland, OR (US)

(73) Assignee: FORTIOR SOLUTIONS, LLC, Hillsboro, OR (US)

( * ) Notice: Subject to any disclaimer, the term of this patent is extended or adjusted under 35 U.S.C. 154(b) by 17 days.

(21) Appl. No.: 18/402,470

(22) Filed: Jan. 2, 2024

(65) Prior Publication Data

US 2024/0412220 A1 Dec. 12, 2024

Related U.S. Application Data

(60) Provisional application No. 63/437,081, filed on Jan. 4, 2023.

(51) Int. Cl.

| | |
|---|---|
| ***G06Q 20/40*** | (2012.01) |
| ***G06Q 20/38*** | (2012.01) |
| *H04L 9/40* | (2022.01) |

(52) U.S. Cl.

CPC ....... *G06Q 20/4016* (2013.01); *G06Q 20/389* (2013.01)

(58) Field of Classification Search

None

See application file for complete search history.

(56) References Cited

U.S. PATENT DOCUMENTS

| | | | |
|---|---|---|---|
| 12,182,204 | B2 | 12/2024 | Tran |
| 2021/0398687 | A1 | 12/2021 | Abdulla |

(Continued)

FOREIGN PATENT DOCUMENTS

| | | | |
|---|---|---|---|
| WO | 2022266293 | A1 | 12/2022 |

OTHER PUBLICATIONS

International Search Report and Written Opinion of International Application No. PCT/US24/10078, dated Jan. 2, 2024, pp. 1-13.

(Continued)

*Primary Examiner* — Bennett M Sigmond
*Assistant Examiner* — Bhavin D Shah
(74) *Attorney, Agent, or Firm* — Schwabe Williamson & Wyatt

(57) ABSTRACT

The present disclosure generally relates to the fields of computing, data processing, cryptography, blockchain technologies, tokenization and non-fungible tokens (NFTs), identity verification, account verification, information security (InfoSec), and fraud prevention technologies, and in particular, to technologies for creating NFTs for know your customer/client (KYC) and anti-money laundering (AML) purposes. A KYC NFT service receives a set of user data items associated with a user, verifies each user data item of the set of user data items, and generates a set of hashes, wherein each hash in the set of hashes corresponds to a verified user data item in the set of user data items. The KYC NFT service mints a KYC NFT that includes each hash in the set of hashes, and updates a smart contract to include the KYC NFT. Other embodiments may be described and/or claimed.

19 Claims, 11 Drawing Sheets

(56) References Cited

U.S. PATENT DOCUMENTS

| | | | | |
|---|---|---|---|---|
| 2022/0020026 | A1* | 1/2022 | Wadhwa | G06N 3/088 |
| 2022/0139566 | A1 | 5/2022 | Gardina | |
| 2022/0188664 | A1 | 6/2022 | Singh | |
| 2022/0215382 | A1 | 7/2022 | Chen et al. | |
| 2022/0253834 | A1 | 8/2022 | Vijayan | |
| 2022/0266293 | A1 | 8/2022 | Huang | |
| 2022/0270725 | A1* | 8/2022 | Derosa-Grund | G06F 16/2365 |
| 2022/0351195 | A1* | 11/2022 | Quigley | G06Q 20/1235 |
| 2022/0384027 | A1 | 12/2022 | Kaleal, III | |
| 2023/0045080 | A1 | 2/2023 | Marks | |
| 2023/0385445 | A1 | 11/2023 | Saavedra | |
| 2024/0070627 | A1 | 2/2024 | Galterio | |
| 2024/0413999 | A1 | 12/2024 | Robell et al. | |

OTHER PUBLICATIONS

International Search Report and Written Opinion of International Application No. PCT/US24/10079, dated Jan. 2, 2024, pp. 1-10.

* cited by examiner

User System 501

510

NFT/Blockchain service 502

Updateable Smart Contract(s) 522

NFT(s) 520

NFT/Blockchain Admin 530

Private Blockchain(s) 540

Org 533-1

Org 533-2

...

Org 533-N

TECHNOLOGIES FOR CREATING NON-FUNGIBLE TOKENS FOR KNOW YOUR CUSTOMER AND ANTI-MONEY LAUNDERING

RELATED APPLICATIONS

The present application claims priority to U.S. Provisional App. No. 63/437,081 filed Jan. 4, 2023 ("'081"), the contents of which is hereby incorporated by reference in its entirety.

FIELD

The present disclosure generally relates to the fields of computing, data processing, cryptography, blockchain technologies, tokenization and non-fungible tokens (NFTs), identity verification, account verification, information security (InfoSec), fintech, regulatory technology (regtech), and fraud prevention technologies, and in particular, to technologies for creating NFTs for know your customer (KYC), anti-money laundering (AML), and/or counter terrorism financing (CTF) purposes.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Identity verification services are often used by businesses and/or government agencies to ensure that information provided by users is associated with the identity of a real person and that the user is the owner of the identity. The identity of the real person may be verified using identity information indicated by physical identity documents (e.g., identity card, driver's license, passport, national identification card, etc.). The identity document is usually used to connect a person to information about the person, often in a database such as those provided by one or more authoritative sources (e.g., credit bureaus, government database(s), corporate database(s), and the like). In some places, such as in the United State of America (US), individuals may be issued numerous forms of identity cards such as state-issued driver's license or other state-issued ID, social security card, passport, health insurance cards, company (e.g., employer) ID cards, and the like. These physical forms of ID have varying levels of security, trustworthiness, and identity assurance, and can be susceptible to counterfeit.

Know your customer (also referred to as "know your client" or "KYC") mechanisms are one type of identity verification method used by financial institutions as well as non-financial organizations. KYC also includes electronic KYC (eKYC) mechanisms, which involve the use of the internet and/or other digital means of identity verification. In general, KYC requires professionals and institutions to make an effort to verify the identity, suitability, and risks involved with maintaining a business relationship. KYC processes are sometimes employed by organizations (orgs) to ensure their potential customers, agents, consultants, and/or distributors are anti-bribery compliant, and to ensure that these individuals are actually who they claim to be. KYC and ekYC mechanisms are commonly used by financial institutions as well as non-financial institutions.

KYC procedures fit within the broader scope of anti-money laundering (AML) policies. AML generally refers to the rules, regulations, and/or requirements that require financial institutions and other regulated entities to prevent, detect, and report money laundering activities. Although some AML mechanisms utilize big data and machine learning to detect potential money laundering activities, many institutions/orgs spend vary large amounts of time and money conducting AML processes. For example, according to some estimates up to 8 billion dollars is spent annually on AML compliance globally.

The compliance processes are mostly based on paper (or electronic equivalents), with significant human input. The process is fragmented and duplicative for both intrabank and interbank. Customers are frustrated, approval is slow, potential business is lost, and compliance is insufficient. Most banks end up doing most of the compliance (e.g., KYC) with poor results in detecting money laundering.

BRIEF DESCRIPTION OF THE DRAWINGS

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

1. Know Your Customer (KYC) Non-Fungible Token (NFT) Aspects

The present disclosure provides technologies for using NFTs for KYC and/or AML purposes. The NFT-based mechanisms discussed herein enhance KYC ecosystems by providing for an NFT-based form of digitized/tokenized personal KYC/AML using, for example, private blockchain technology, smart contracts, and digital wallets. The present disclosure at least solves the following problems: reduces multiple KYC/AML processes from various departments within an org to a single process thereby conserving computational and/or network resources; reduces multiple KYC/AML processes in all other orgs in the private blockchain to zero thereby conserving computational and/or network resources; enables the reuse of previously determined KYC/AML results from an individual org thereby further reducing computational and/or network resources; converts paper-based and/or other manual KYC/AML mechanisms to a digital, automated KYC/AML in NFT forms thereby reducing resource consumption; transfers most of the resources in validating documents to monitoring and detecting money laundering thereby conserving computational and/or network resources; detects multiple transactions (e.g., deposits to multiple financial institutions) from one KYC NFT thereby conserving computational and/or network resources; and/or detects multiple transactions (e.g., deposits to multiple financial institutions) from multiple KYC NFTs to one end point thereby conserving computational and/or network resources.

Figure 1:
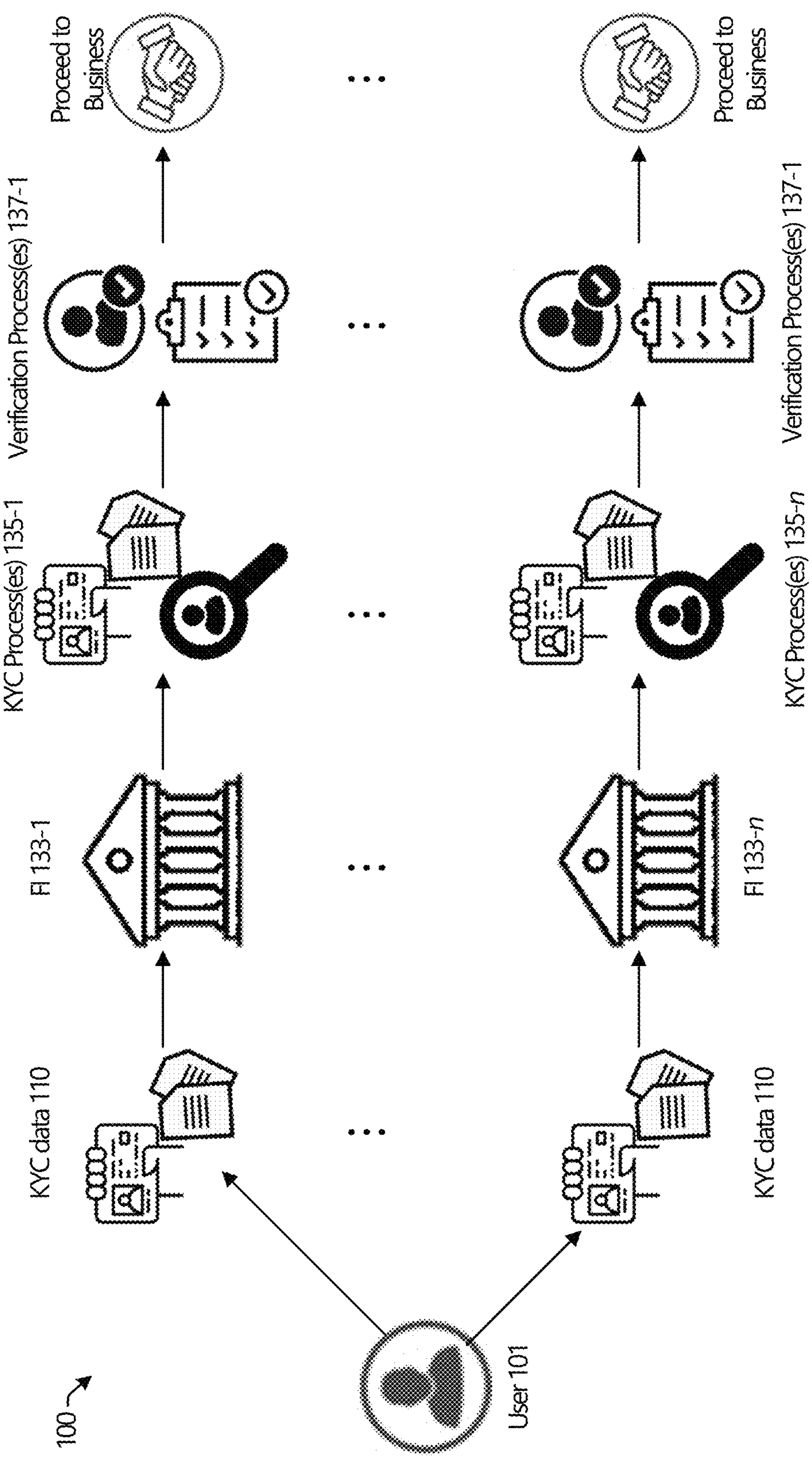
FIGS. 1, 2, 3, and 4 depicts example KYC ecosystems.

FIG. 1 depicts an example KYC ecosystem 100, which includes a user. Throughout the present disclosure, US-based KYC/AML ecosystems are used as example use cases; however, the embodiments discussed herein may be applicable to other KYC/AML ecosystems of any geopolitical entity, legal jurisdiction, enterprise or corporate entity, and/or ad-hoc/non-formal entity or group.

In the KYC ecosystem 100, a user 101 provides their KYC data 110 (also referred to as "AML data 110", "CTF data 110", and/or the like) to one or more financial institutions (FIs) 133 (e.g., FI 133-1 to 133-*n*, where n is a number) with which the user 101 wishes to conduct business. Here, the user 101 may represent a legal person or one or more computing devices/platforms used by a legal person. A legal person is a human or non-human legal entity (e.g., corporations, partnerships, limited liability companies (LLCs), limited liability partnerships (LLPs), and/or the like) that is treated as a person for legal purposes, and is capable of engaging in typical business activities, such as suing/being sued, owning property, and entering into contracts. Each FI 133 uses the KYC data 110 for customer onboarding and verification purposes. The specific types of KYC data 110 needed may be based on various factors, such as entity type, jurisdiction(s) in which the entity (user 101) operates, the financial services being sought, and/or other relevant factors.

In examples where the user 101 represents a human or a computing device operated by a human, the KYC data 110 can include, for example, user identifiers (IDs), personal information (e.g., full name, date of birth, gender, nationality, citizenship, marital status, residential address, email address, phone number(s), and/or the like), identity documents (e.g., passport, driver's license, national ID, and/or the like), financial data (e.g., occupational data and/or employment records, source(s) of funds and/or income details, FI account statements, and/or the like), credit cards, vital/health records (e.g., birth certificates, marriage licenses, electronic medical records, and/or the like), biometric data, and/or the like.

In examples where the user 101 represents a non-human legal entity or a computing device/platform owned/operated by the non-human legal entity, the KYC data 110 can include, for example, business information (e.g., legal name, business registration number, date of incorporation, legal entity type (e.g., corp. partnership, LLC, LLP, and/or the like), registered address (e.g., business address, contact information for registered agents, and/or the like)), ownership and control information (e.g., personal information of each beneficial owner, percentage of ownership for each beneficial owner, and/or the like), financial information (e.g., annual turnover, source of funds, nature of business, and/or the like), legal structure (e.g., organizational structure, details of affiliated companies if any, and/or the like), operational information (e.g., countries where the business operates, purpose and nature of the business relationship, and/or the like), banking references (e.g., details of the business's banking relationships with individuals and/or other orgs, and/or the like), regulatory compliance information (e.g., compliance with local and international regulations, any licenses or permits held by the business, and/or the like), as well as any other relevant data/information.

Each FI 133 (e.g., one or more of FI 133-1 to 133-*n*) can be or include, for example, depository institutions, investment institutions, contractual institutions, credit card companies, and/or the like. For purposes of the present disclosure, the terms "FI 133", "org 133", "org system", "org platform", "fintech platform", and/or the like may be used interchangeably throughout the present disclosure, and these terms may refer to the FI's 133 themselves, FI systems/platforms used by an individual FI 133 (e.g., hospital information system (HIS), hospital management system (HMS), health information management (HIM) system, health informatics tools, health information technology, and/or the like), and/or the one or more users of the HP systems/platforms, unless the context dictates otherwise. Each FI 133 has its own in-house/custom KYC processes 135 (also referred to as "KYC/AML processes 135", "AML processes 135", "CTF processes 135", and/or the like). For example, a first FI 133-1 has its own KYC process(es) 135-1, a second FI 133-2 has its own KYC process(es) 135-2 (not shown by FIG. 1), and so forth to an n-th FI 133-*n* that has its own KYC process(es) 135-*n*. Additionally, each FI 133 conducts its own identity verification process(es) 137 before proceeding to conduct business with the user 101. For example, a first FI 133-1 has its own verification process(es) 137-1, a second FI 133-2 has its own verification process(es) 137-2 (not shown by FIG. 1), and so forth to an n-th FI 133-*n* that has its own verification process(es) 137-*n*. Identity verification process(es) 137 involve processes/procedures for confirming or denying that a user's 101 claimed identity is correct by, for example, comparing their identity data/credentials with those previously proven (and/or associated with known/stored credentials or identity data), and/or confirming that predefined and/or configured identity verification requirements have been fulfilled through the provision of objective evidence. The identity verification process(es) 137 may be done in-house or performed by a third party verification service. While some FIs 133 may use automated tools and systems to conduct initial document checks, in most cases, FIs 133 manually verify and validate KYC data 110, usually requiring multiple people or departments for completing various tasks associated with the processes 135, 137.

This process is repeated for each FI 133 that the user 101 visits, and is also repeated for each service within the same FI 133 that the user 101 wishes to use (e.g., opening bank accounts, opening brokerage accounts, applying for loans, applying for insurance, and so forth). This is, in part, because there is little or no data shared within departments or between FIs 133 (or between departments within an individual FI 133) for KYC and/or AML purposes. These repeated KYC processes 135 increase costs for the FIs 133 in terms of time, money, and computing resources used for verification purposes.

AML refers to the web of laws, regulations, and procedures aimed at uncovering and preventing illegally obtained money from entering the financial system and/or detecting transactions to hide the origins of funds connected to illegal activity. AML targets a wide variety of crimes, from corruption and tax fraud to market manipulation and illicit trade and financing of terrorism, as well as efforts to mask these activities as the source of money. KYC includes financial service guidelines, regulations, and/or procedures for verifying the identity, suitability, and risks involved with maintaining a business relationship with a customer. The KYC procedures fit within the broader scope of AML and CTF regulations. One objective of KYC is to prevent businesses from being used for illegal purposes, such as money laundering and/or terrorism. KYC principles apply to FIs 133, as well as various online and offline orgs. Most KYC policies (or KYC processes 135) have the following elements: customer acceptance policies, customer identification procedures (CIP), transaction monitoring, and risk assessment/management.

Customer acceptance policies include policies and procedures for the KYC process itself including, for example, approval process(es), types of KYC data 110 to be provided by the user 101 (e.g., name, date of birth, address, identification number(s), and the like), the factors to be considered when deciding whether a user 101 should be approved, and how to classify individual users 101 when they are identified. CIP refers to the procedures and/or processes for identifying the user 101 based on the KYC data 110 and according to the customer acceptance policies/procedures. CIP can include identity verification to confirm the authenticity of the user's 101 identity, and applying differing levels of due diligence to evaluate the risk associated with the user 101 such as, for example, applying simplified (standard) due diligence (SDD), customer due diligence (CDD), or enhanced due diligence (EDD) based on a risk level associated with individuals/orgs. These due diligence activities involves gathering additional information to understand the nature of the user's 101 activities, their source of funds, and the expected level of transactions. This helps in assessing the risk associated with the user (customer) 101 and tailoring the level of due diligence applied to the user (customer) 101 accordingly. Higher-risk individuals/orgs, such as those involved in international transactions, deal with large sums of money, and/or politically exposed persons (PEP) and/or heads of international organizations (HIO), may undergo more thorough scrutiny than lower risk individuals/orgs.

Transaction monitoring can involve employing systems to monitor financial transactions and flag potentially unusual or suspicious transactions for further investigation. This also involves ongoing monitoring customer activity for suspicious behavior. Risk assessment/management involves using the collected information and verification results, to assess the user's 101 risk profile, which may be based on factors such as location, source of funds, and transaction history. KYC processes 135 can also involve record keeping policies defining how records of the KYC process 135 itself is/are maintained for audit purposes and regulatory compliance. This can include storing the KYC data 110, transaction records, and/or any communications related to the KYC processes 135.

Figure 2:
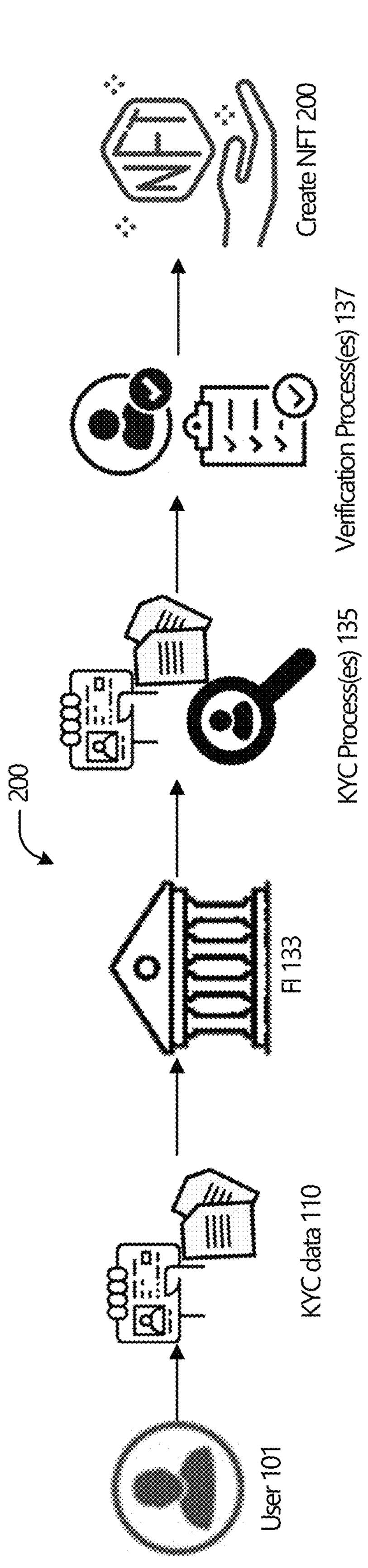

FIG. 2 depicts an example NFT-based KYC ecosystem 200. Here, the user 101 provides their KYC data 110 to an FI 133, which performs KYC process(es) 135 and verification process(es) 137, and an NFT 200 is created for the verified user 101. The NFT 200 may be generated by an NFT/blockchain service, such as NFT/blockchain service 502 of FIG. 5. In this example, the KYC ecosystem 200 does not include an NFT ID system. Additionally or alternatively, the NFT 200 is personalized to the user 101 and the FI 133.

Figure 3:
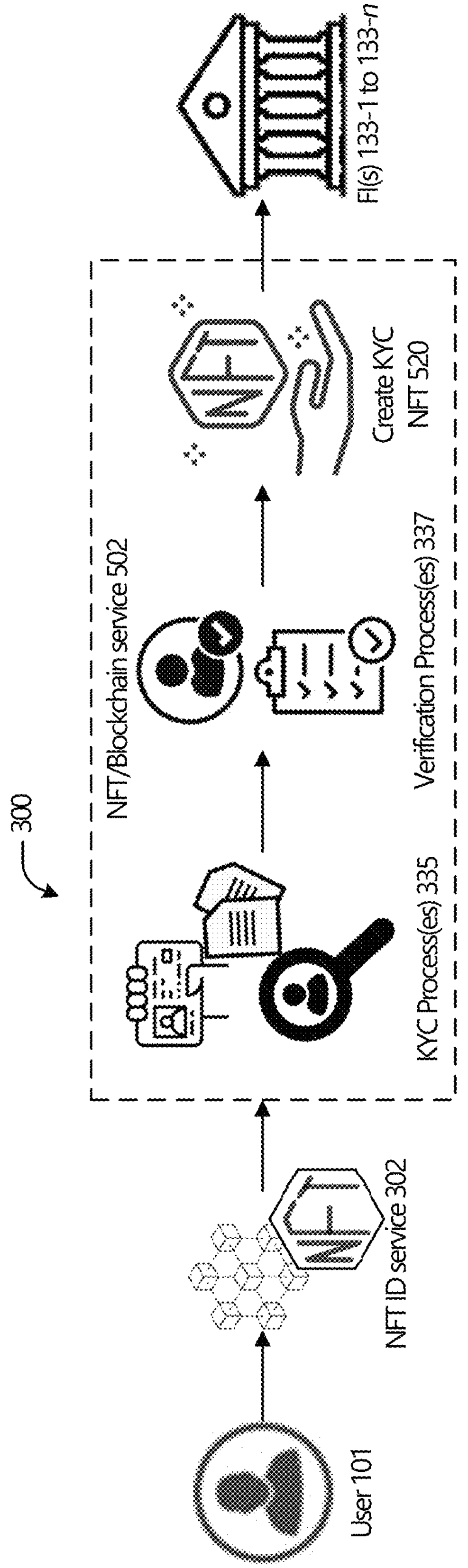

FIG. 3 depicts another example NFT-based KYC ecosystem 300. The NFT-based KYC ecosystem 300 includes an NFT ID service 302 to create a powerful, industry-first, multi-purpose new form of super ID. In some examples, the NFT ID service 302 is the same or similar to the NFT system(s) discussed in U.S. Prov. App. No. 63/315,396 filed on 1 Mar. 2022 ("'396"), the contents of which is hereby incorporated by reference in its entirety and for all purposes. In this example, the user 101 provides their KYC data 110 to an NFT ID service 302, which generates (mints) an NFT ID for the user 101, and provides the NFT ID to an NFT/blockchain service 502 (see e.g., FIG. 5). The NFT/blockchain service 502 performs KYC process(es) 335 and verification process(es) 337 using the NFT ID provided by the NFT ID service 302, and creates an KYC NFT 520 that is submitted to one or more FIs 133 by the user 101 and/or on behalf of the user 101, which is also shown by FIG. 4.

In some examples, the KYC process(es) 335 can include onboarding aspects, such as information/data collection from the user 101 (e.g., supplied by the user 101 and/or data mined or extracted from the user's 101 client device) and/or from other data sources (e.g., governmental databases (e.g., DMV, police, FBI, electoral records, property records, utilities department records, and/or the like), credit bureaus, social media platforms, one or more FIs 533, and/or the like), risk assessment, and/or the like. Additionally or alternatively, the verification process(es) 337 include, for example, authentication of user supplied data (e.g., KYC data 110), authentication of data obtained from other sources, due diligence aspects, ongoing monitoring and oversight of user's 101 activities (e.g., financial transactions and the like), compliance checks, and/or the like. For example, the authentication of the user 101 can involve comparing collected data 101 with other sources, for example, comparing provided biographic data (e.g., name, birth date, address(es), and/or social security number (SSN), and/or the like) against various publicly available data (e.g., data from Social Security Administration records, death records, birth certificates, electronic health records, and/or other publicly available data) to determine whether the provided biographic data corresponds with known identities/entities. Some other authentication/verification checks that may be performed include criminal background checks, credit checks, financial fraud checks, KBA questions/answers, biometric data comparisons, among many others. In some examples, the KYC process(es) 335 and verification process(es) 337 may be combined into a single function and/or divided into additional discrete functions than shown.

The NFT-based KYC ecosystems 200 and 300 provide a more secure, trustworthy form of compliance in comparison to conventional KYC mechanisms, which can be used for any and all online and/or in-person activities that can be used for financial qualifications, transactions, fulfillment, and/or any other identity verification purposes.

Figure 4:
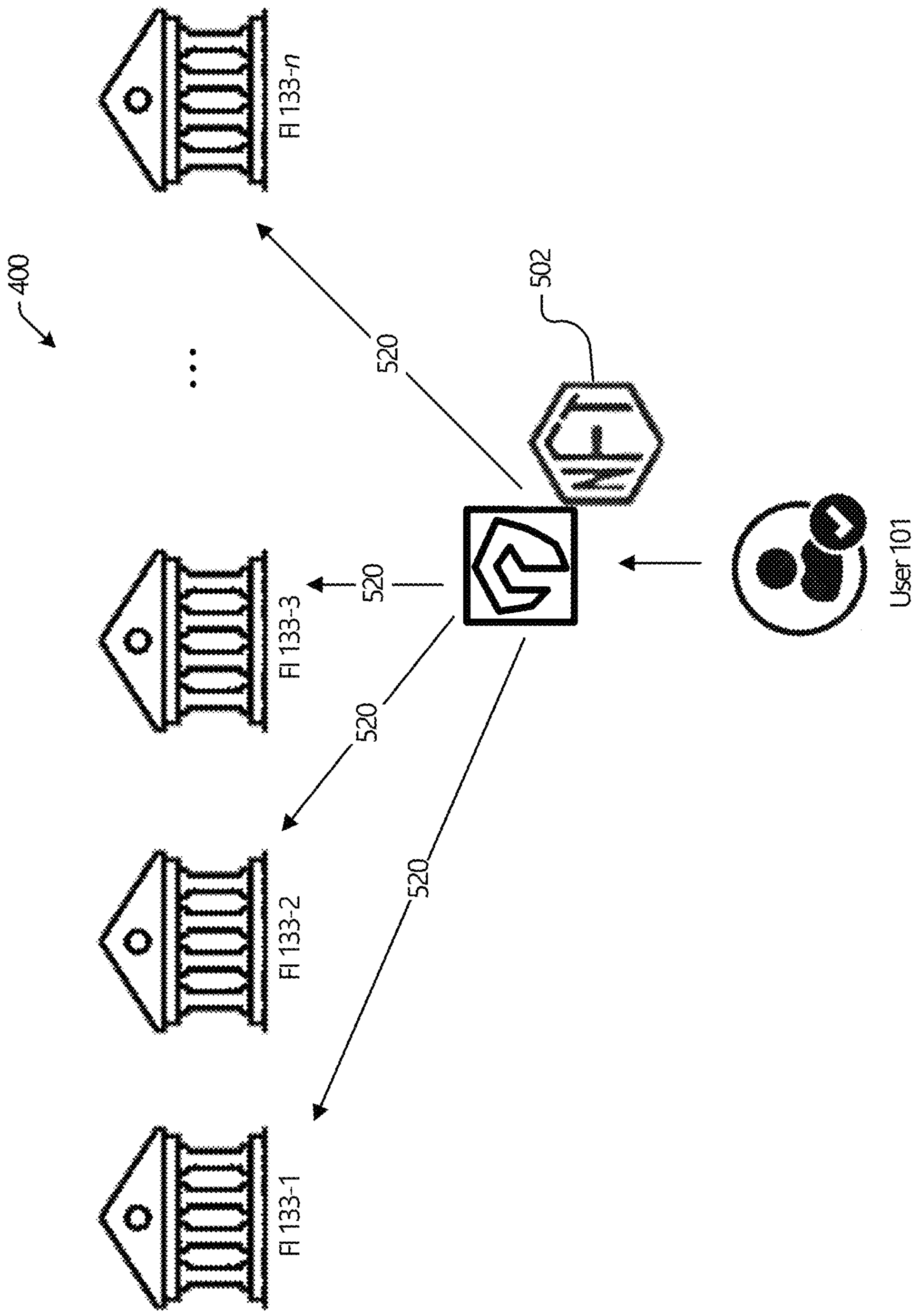

FIG. 4 shows a system 400 in which the NFT-based KYC/AML mechanisms discussed herein are used at multiple orgs, such as FIs 133-1 to **133-*n*. Here, a user 101 is able to become verified through the NFT/blockchain service 502, and the verification of the user 101 can be used for multiple FIs 133-1 to 133-*n*. It should be understood that, although the various examples provided in the present disclosure are described in terms of verifying/validating users 101 for access to FIs 133, the various embodiments herein are not limited to such examples and can be used for verifying/validating users 101 for other purposes, such as security clearances for employment with government agencies and/or the like. The NFT-based KYC/AML mechanisms reduce multiple KYC/AML verification processes to a single KYC/AML verification process at the NFT ID service 502 (e.g., processes 335 and/or 337 of FIG. 3). Additionally, the results of the KYC/AML verification process (e.g., processes 335 and/or 337 of FIG. 3) can be stored in a private blockchain (see e.g., one or more private blockchains 540 in FIG. 5**), which can be shared among multiple orgs rather than requiring each org to perform their own KYC/AML verification processes. This also allows users (customers)

101 to own and control their KYC/AML data. Furthermore, the KYC/AML verification mechanisms discussed herein can detect irregular transactions and raise alarms as required by various regulations.

Figure 5:
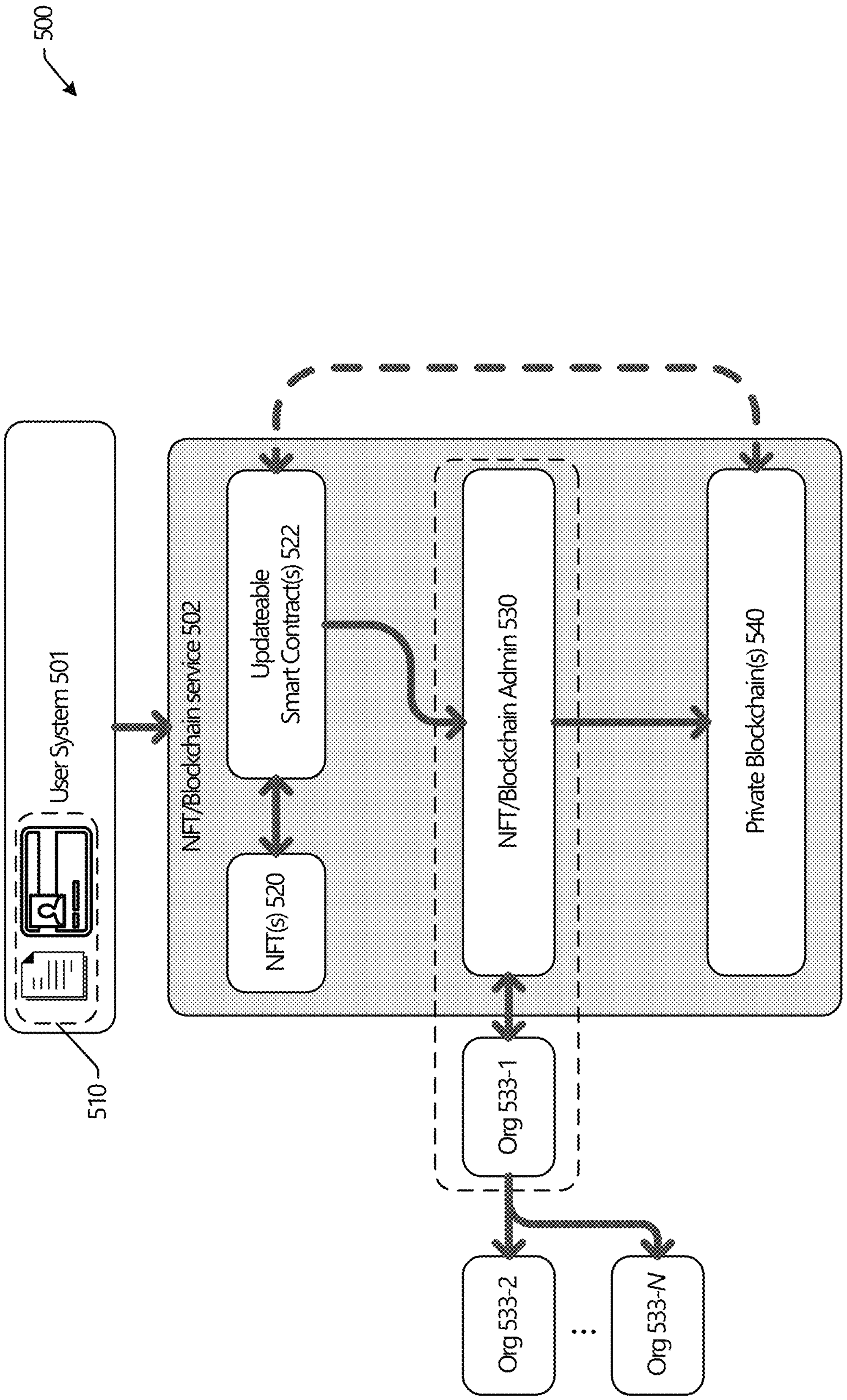
FIG. 5 depicts an example NFT KYC platform.

FIG. 5 shows an example NFT-based KYC environment 500. In this example, a user system 501 provides user data 510 to an NFT/blockchain service 502. The user data 510 includes data associated with a user of the user system 501 (e.g., user 101). Additionally or alternatively, the user data 510 can be obtained from one or more data sources, which can include user systems operated by other users, data storage systems associated with one or more orgs 533, or some other third party data source (e.g., government databases, non-governmental org (NGO) databases, and/or the like). As examples, the user data 510 includes KYC information, personal information, confidential information, sensitive information, and/or any other suitable data. Additionally or alternatively, the user data 510 can include physical identity documents (e.g., images and/or videos of physical identity documents), electronic identity documents, authentication or authorization credentials, biometric data, knowledge-based authentication (KBA) data, social media profile data, and/or other types of data, including any types of data mentioned herein. Additionally or alternatively, user system 501 data can be part of the user data 510 or otherwise provided with the user data 510. Examples of the user system 501 data can include location data (e.g., GPS coordinates, time zone information, cellular network location services, WiFi positioning, IP address location correlations, and/or the like), device fingerprint, screen or display resolution, operating system (OS) type and/or version, browser type and/or version, rendering engine type and/or version, device type of the user device 501, device manufacturer, hardware platform type, device serial numbers, system information of the user device 501, and/or other suitable information, data, and/or metadata, including any of the information/data discussed infra with respect to (w.r.t) the inputs 1001 of FIG. 10. In some examples, the user data 510 is the same or similar as the KYC data 110 discussed previously, and the user system 501 may be the same or similar as the user devices 910, 960, client system 1250, and/or any other suitable user/client device that can be operated by a user, such as user 101 discussed previously. In implementations including an NFT ID system (see e.g., '396), the user data 510 can additionally or alternatively include an NFT ID belonging to a user 101. Some or all of the aforementioned data may be obtained from the user system 501 and/or from third party data sources.

The NFT/blockchain service 502 includes and/or generates NFTs 520 and/or updatable smart contracts 522. The NFT/blockchain service 502 may be the same or similar as the NFT/blockchain service 900 or the NFT engine 950 discussed infra w.r.t FIGS. 8-11. The NFT/blockchain service 502 generates (or mints) NFTs 520 as discussed herein and/or according to, for example, [EIP-721] and/or some other suitable standard(s)/specification(s). The smart contracts 522 can manage multiple token types. For example, a single deployed contract 522 may include any combination of fungible tokens, NFTs, and/or other configurations (e.g. semi-fungible tokens and/or the like). The smart contracts 522 may be the same or similar to the smart contracts 1011 of FIG. 10 and/or can be created and/or implemented according to, for example, [EIP-1155], [EIP-2535], and/or the like. In some examples, individual smart contracts 522 can include functions, codes, scripts, and/or the like for performing some or all aspects of KYC process(es) 335 and/or verification process(es) 337 of FIG. 3.

The NFT/blockchain service 502 also includes a blockchain/NFT administrator (admin) 530, which performs KYC processes (e.g., KYC process(es) 335 and/or verification process(es) 337 of FIG. 3) using an NFT 520 associated with the user of the user system 501. In some examples, the NFT/blockchain service 502 executes one or more smart contracts 522 to perform the KYC process(es) (e.g., KYC process(es) 335 and/or verification process(es) 337 of FIG. 3).

Based on results of the KYC processes, the NFT/blockchain service 502 provides the results, for example, in the form of suitable indicators/notifications to one or more orgs 533. In this example, the KYC indicators are provided to a first org 533-1. This information can be shared with, or is otherwise accessible by, one or more other orgs 533-2 to 533-N (where N is a number). Additionally or alternatively, the KYC results/indicators are added to one or more private blockchains 540. In this example, the private blockchains 540 are provided by the NFT/blockchain service 502 (e.g., a Blockchain as a Service); however, in other implementations, some or all of the blockchains 540 can be provided by one or more separate blockchain services.

Additionally or alternatively, individual private blockchains 540 may be provided or maintained for individual orgs 533, for example, where a first private blockchain(s) 540 can be maintained for or otherwise correspond to a org 533-1, a second private blockchain(s) 540 can be maintained for or otherwise correspond to a second org 533-2, and so forth up to an Nth private blockchain(s) 540 that can be maintained for or otherwise correspond to an Nth org 533-N. In these implementations, the set of private blockchains 540 may form a "consortium blockchain", which is a group of multiple private blockchains 540 that permit sharing of data/blocks amongst themselves for various purposes, such as transparency, accountability, and/or streamlining workflows. While each org 533 manages their own node or blockchain(s) 540, the data within their blockchain(s) 540 can be accessed, shared, and distributed by orgs 533 within the consortium. In some implementations, the sharing among the blockchain(s) 540 may be mediated or otherwise controlled by the admin 530.

The NFT/blockchain service 502 can also detect suspicious activities in real-time (RT) or near RT, and can raise alarms and/or issue suitable notifications to relevant entities (e.g., one or more orgs 533, government entities (e.g., regulatory bodies, administrative agencies, and the like), and/or other entities). These suspicious activities include any conducted or attempted transaction or pattern of transactions that potentially involves money from criminal activity, is designed to evade statutory or regulatory requirements (whether through structuring or other means), appears to serve no business or other legal purpose and for which available facts provide no reasonable explanation, involves use of financial services to facilitate criminal activity, and/or in any other way is indicative of potential money laundering activities and/or other malicious behaviors. In some implementations, the admin 530 uses existing AML rules or policies and/or AML rules/policies provided by individual orgs 533 to detect suspicious activities. In these implementations, the admin 530 converts the AML rules/policies provided by individual orgs 533 into RT codes, in the form of one or more smart contracts 522, which are then used to track various transactions at the various orgs 533. For example, the RT codes can include conditions, parameters, criteria, functions, methods, API calls, data, and/or the like that can be used for monitoring financial transactions related (or potentially related) to the user of the user system 501 and/or for monitoring for suspicious activities. In some implementations, the AML policies and/or rulesets can be defined or otherwise expressed by individual orgs 533 using standardized mechanisms (e.g., language, syntax, schema, and/or the like) using any suitable data format (e.g., JSON, XML, and/or any other data format such as any of those mentioned herein). In other implementations, the NFT/blockchain service 502 may provide an AML policy tool (e.g., a web app with a graphical user interface (GUI) and/or the like) that allows individual orgs 533 to define or specify AML policies and/or rulesets.

In some implementations, the AML mechanisms (or RT codes) include tracking deposits or transfers associated with the user 101 or user system 501. In some examples, the deposit/transfer tracking involves tracking or monitoring deposits made into a predetermined or configurable number of FI accounts (e.g., bank accounts or the like). These deposits/transfer can include deposits made to the user's 101 account(s) at various orgs 533 and/or deposits made by the user 101 into other accounts at various orgs 533 that are owned or not owned by the user 101. In one example, the predetermined or configurable number of accounts is five different bank accounts, which may or may not be owned by the user 101. The amount of individual deposits/transfers can be based on thresholds (e.g., monetary amounts specified by relevant statutes or regulations), seemingly random amounts, deposits/transfers made in a relatively short period of time, substantial increases in deposits/transfers without apparent cause, making multiple matching deposits/transfers/payments on the same day or in successive days, making multiple deposits/transfers/payments to multiple accounts at multiple orgs 533, and/or the like. Individual orgs 533 cannot detect these types of deposits/transfers being made at other orgs 533; however, the AML smart contract(s) 522, running in (near-) RT can flag these deposits immediately (e.g., in RT or near-RT). In another example, the AML smart contract(s) 522 can be configured to detect one or multiple low-score users (e.g., high risk users) associated with various orgs 533 (e.g., banks) depositing relatively small amounts into a single FI account on a regular or irregular basis. In another example, the AML smart contract(s) 522 can be configured to detect one or more structuring activities, which involve designing transactions to evade triggering reporting or record-keeping requirements. Additionally or alternatively, the AML smart contract(s) 522 can be configured to detect any known suspicious activities or transactions. In any of the aforementioned examples, the AML smart contract(s) 522 can be configured to track minted KYC NFTs, NFT IDs, and/or other IDs, conditions, parameters, and/or criteria. In these implementations, the AML smart contract(s) 522 can include various configured thresholds, such as a number of deposits threshold, deposit amount threshold, number of accounts threshold, and/or other thresholds, conditions, parameters, criteria according to various AML rules/policies.

Additionally or alternatively, the AML smart contract(s) 522 are configured to automatically raise flags or issue indicators/notifications when the configured and/or predefined conditions or parameters are met. For example, the admin 530 (e.g., based on operation of one or more smart contracts 522) can generate suspicious activity reports (SARs), currency transaction reports (CTRs), foreign bank and financial accounts reports (FBARs), and/or other notifications, indicators, or alerts based on detected potential money laundering activities and/or malicious behaviors. In some implementations, the admin 530 provides such reports/notifications to the individual orgs 533 and/or can file such reports with the relevant authorities or regulatory bodies. In these ways, regulatory compliances can be maintained and/or up-to-date, and can be transferred to relevant authorities as needed or required. Additionally, the monitored data and transactions, including intrabank and interbank, can be included in one or more blockchains 540, which can be audited or otherwise analyzed for regulatory purposes. The smart contracts 522 can be configured to send notifications/reports regularly to regulatory authorities/agencies on a periodic basis. Additionally or alternatively, the regulatory authorities/agencies can pull desired data in real time from the one or more blockchains 540 via suitable APIs and/or other mechanisms. In these ways, the NFT/blockchain service 502 can act as or be employed as a regtech platform.

The private blockchain(s) 540 is/are a type of blockchain and/or blockchain network where only one or a few authorities or orgs have control over the blockchain and/or the blockchain network. By contrast, a public blockchain is permissionless, allows anyone to join, and is usually decentralized. The private blockchain(s) 540 may or may not be decentralized.

In some implementations, the admin 530 manages or acts as an administrator of the private blockchain(s) 540, NFT service(s), NFT(s) 520, and/or other entities or services within the NFT/blockchain service 502. Additionally or alternatively, participating orgs 533 can seek approval and consent to join the NFT/blockchain service 502 or otherwise access the permissioned blockchain(s) 540. In some examples, the orgs 533 go through a registration process to join or otherwise access the blockchain(s) 540. In these implementations, orgs 533 participating in the NFT/blockchain service/network 502 can have or obtain knowledge about transactions in the blockchain(s) 540, which are private. For example, individual orgs 533 can subscribe to notification services provided by the NFT/blockchain service 502 (or the admin 530).

In some implementations, both orgs 533 and KYC NFT holders (e.g., user system 501) belong to the NFT/blockchain service/network 502 and/or have access to the private blockchain(s) 540. The data visibility (e.g., either through the aforementioned notifications and/or via a suitable app/interface) is layered and controlled by one or more smart contracts 522. The KYC NFT holders (e.g., user system 501) are capable of viewing and/or accessing their user data 510 and approval status. In various implementations, the interactions between the KYC NFT holders (e.g., user system 501) and the blockchain(s) 540 are via a digital wallet (e.g., client/wallet devices 910 of FIG. 9, client app 1251 of FIG. 12, and/or the like) or another suitable app and/or device (e.g., EHR app 501 of FIG. 5, client app 1251 of FIG. 12, and/or the like). Additionally, the smart contracts 522 can be configured with suitable permissions, authorizations, policies, rules, and/or the like to ensure that each org 533 is only able to access data from other orgs 533 that is/are relevant to it's own users/customers 501. For example, permissions/authorizations may be programmed into the smart contracts 522 so that an org 533-1 is only able to access data from org 533-2 that is related to the org's 533-1 own customers 501 that are also customers of org 533-2. Additionally or alternatively, each org 533 can see their own customers' full records, and multiple orgs 533 can agree amongst themselves if they want to see the other orgs' 533 processes or not. Additionally or alternatively, some or all of the orgs 533 can start with only customers' approval statuses, approval scores, and red flags, if any. Additional data 510 could be shared per one or more smart contracts 522.

The NFT/blockchain service 502 reduces multiple KYC processes to a single KYC process, and allows the KYC results to be shared with multiple orgs. The result is tamper-proof, and is stored in a private blockchain(s) 540, and in the user's digital wallet in the form of an NFT 520.

The NFT/blockchain service 502 also enables AML compliances to be up to date on a periodic and/or event-based basis, and can be transferred to authorities at any time. All the data and transactions, intrabank and interbank, are stored on the blockchain(s) 540, and one or more smart contracts 522 can be set up to send compliance records/data to relevant authorities on a periodic or event-triggered basis. Additionally or alternatively, the regulators or authorities can pull the data in real time, and in some implementations, the regulators or authorities can define their own smart contract(s) 522 for reporting and/or other compliance purposes.

The NFT/blockchain service 502 includes very multiuse applications (apps) with one or more microservices and business logic. Examples of the microservices provided by the multiuse apps include one or more of the following: smart contract engine (see e.g., [EIP-1155], [EIP-2535], and the like); authentication; metadata; InterPlanetary File System (IPFS); issuance; transaction; on-chain; off-chain; private blockchain(s) 540; minting (see e.g., [EIP-721], [EIP-5679], and the like).

One example implementation of the NFT/blockchain service 502 includes infrastructure components/elements, client-side components/elements, and administrative (admin) components/elements. The infrastructure elements/components include full stack in the cloud; Linux® OS; Apache®/NGINX server; server-side languages including PHP, Python, JavaScript, and Solidity; and database systems including MySQL, MongoDB, and IPFS. The client-side components/elements include client apps such as a digital/crypto wallet. The client apps may be mobile apps designed for Android®, iOS®, and/or other platforms/OS. The admin components/elements include monitoring services, housekeeping services, and digital/crypto wallet apps (which may be the same or similar as the client-side digital/crypto wallet apps).

Figure 6:
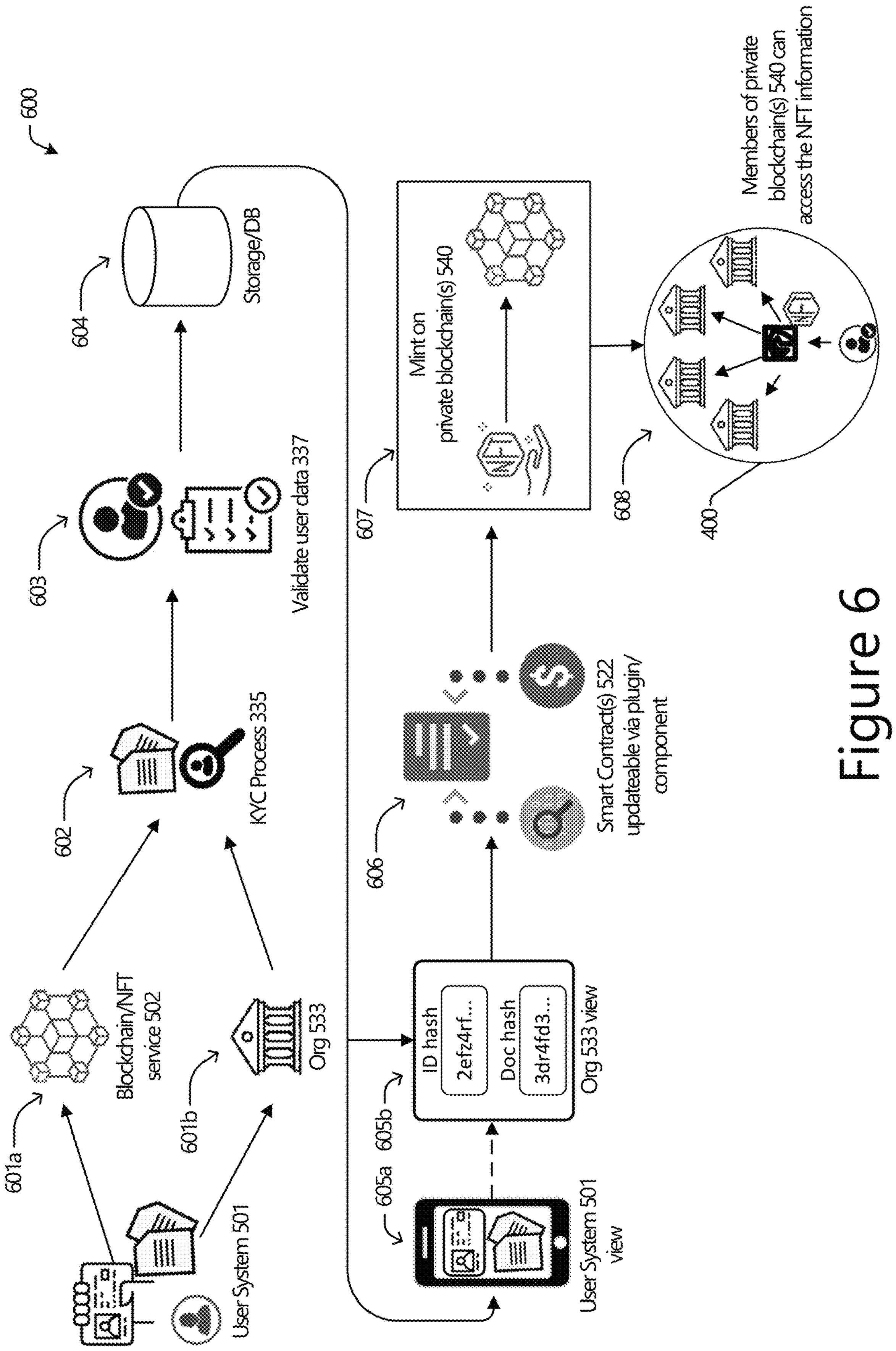
FIG. 6 depicts an example NFT KYC procedure.

FIG. 6 depicts an example NFT KYC procedure 600. Procedure 600 begins where a customer of an org 533 (e.g., user system 501) visits or accesses the NFT/blockchain service 502 (e.g., using a suitable website, application (app), web app, or other suitable interface provided by the NFT/blockchain service 502) (601*a*) and/or accesses the org's 533 platform (e.g., using a suitable website, application (app), web app, or other suitable interface provided by the org 533) (601*b*). Here, the user system 501 provides user data 510 (e.g., identity documents, KYC data, NFT ID, and/or the like) to the NFT/blockchain service 502 (601*a*) and/or to the org's 533 platform (601*b*). In examples where an NFT ID is provided as part of the user data 510, the NFT/blockchain service 502 and/or the org's 533 platform will retrieve or otherwise determine relevant identity information from the NFT ID.

Next, the NFT/blockchain service 502 and/or the org 533 platform performs KYC processes (602) to verify and/or validate the user data 510 (603). The verified/validated user data 510 is then stored in a suitable storage system or database (DB) system (604). In some examples, the user data 510 is hashed and stored on one or more private blockchains 540 (604) as its own block (e.g., as an NFT or a "KYC block"). Additionally or alternatively, each platform/system (e.g., the NFT/blockchain service 502 and the org 533 platform) hashes the user data 510 separately and stores the hashes on the private blockchain(s) 540 (604). In some examples, each piece of user data 510 is hashed separately from other pieces of user data 510 (e.g., each provided identity document, photographs/video data, contact information, KBA data, and so forth may be hashed individually), and stored as respective blocks on the blockchain(s) 440. Additionally or alternatively, some or all user data 510 can be combined or otherwise hashed together and stored as a single block on the blockchain(s) 440. Additionally or alternatively, in examples where the user data 510 includes identity documents (e.g., electronic identity documents and/or scans of physical identity documents), the identity documents themselves are not placed on the blockchain(s) 540; instead, copies (or electronic versions) of the identity documents can be stored in encrypted format in private servers and/or data storage systems owned/operated by the NFT/blockchain service 502 (see e.g., servers 920, 930, 950 and/or NFT/blockchain storage 940 of FIG. 9) and/or private servers owned/operated by the org 533 platform (604).

Next, a KYC block and/or NFT 520 that contains the one or multiple hashes is sent to the wallet app on the user system 501 (605*a*) and/or the org platform 533 (605*b*). The KYC block and/or NFT is also sent to the user's smart contract 522 with the org 533 (606). In this example, the smart contract 522 is updateable via a suitable plugin or other component. The smart contract 522 and/or the KYC block/NFT 520 are minted on the private blockchain(s) 540 (607). After minting, the KYC block/NFT 520 is accessible by members of the private blockchain(s) 540, such as one or more other orgs 533 (608).

Figure 7:
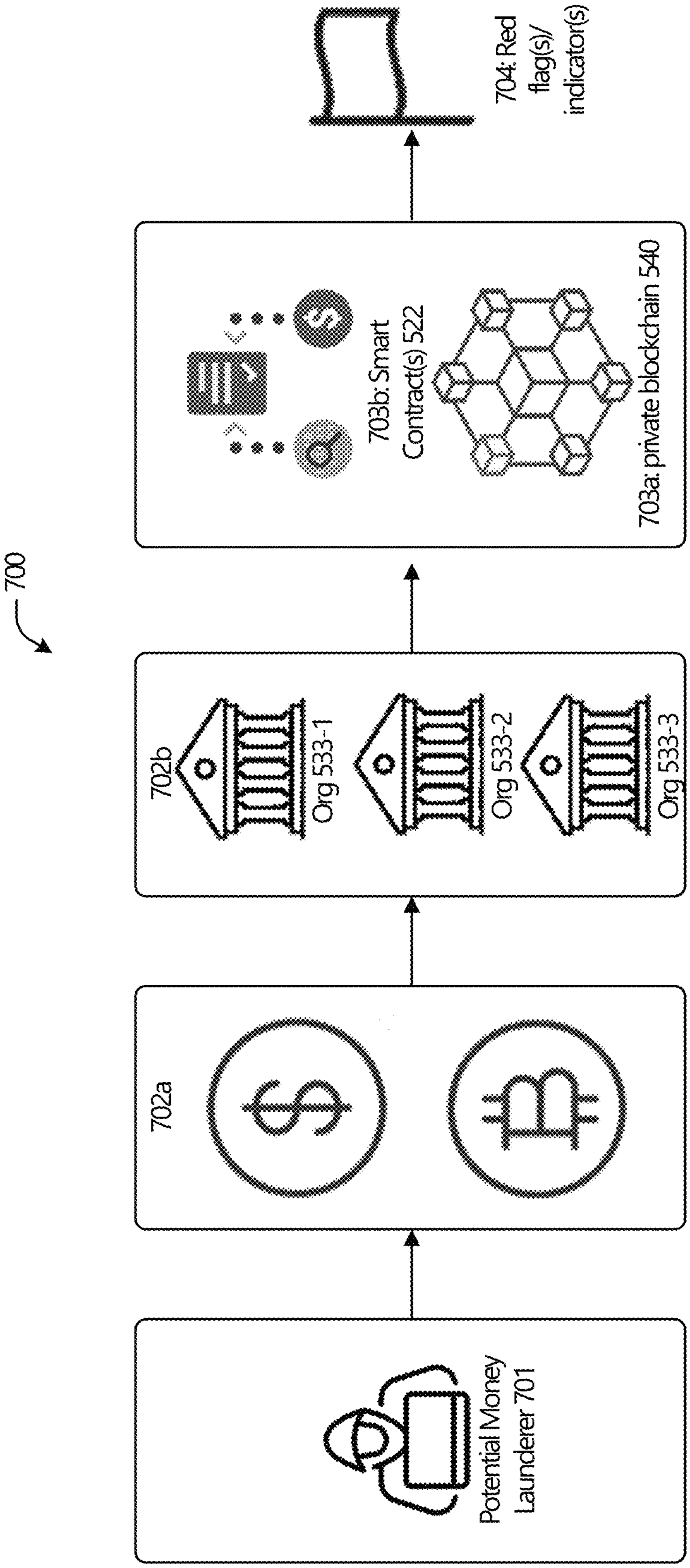
FIG. 7 depicts an example NFT AML procedure.

FIG. 7 depicts an example NFT AML procedure 700. Procedure 700 begins with a potential money launderer 701 providing currency to one or more orgs 533 (702*a*, 702*b*). The currency from money laundering may come from illicit activities, such as drug trafficking, terrorists activities, tax evasion, and the like. A common and popular AML approach involves depositing a relatively small amount of money into multiple accounts in multiple financial institutions. The private blockchain(s) 540 with smart contracts 522 is used to recognize the AML mechanisms used by the orgs 533 and tracks relevant transactions (703*a*, 703*b*), and raises red flags/indicators when needed (704), which may be in the form of financial disclosures/reports.

Figure 8:
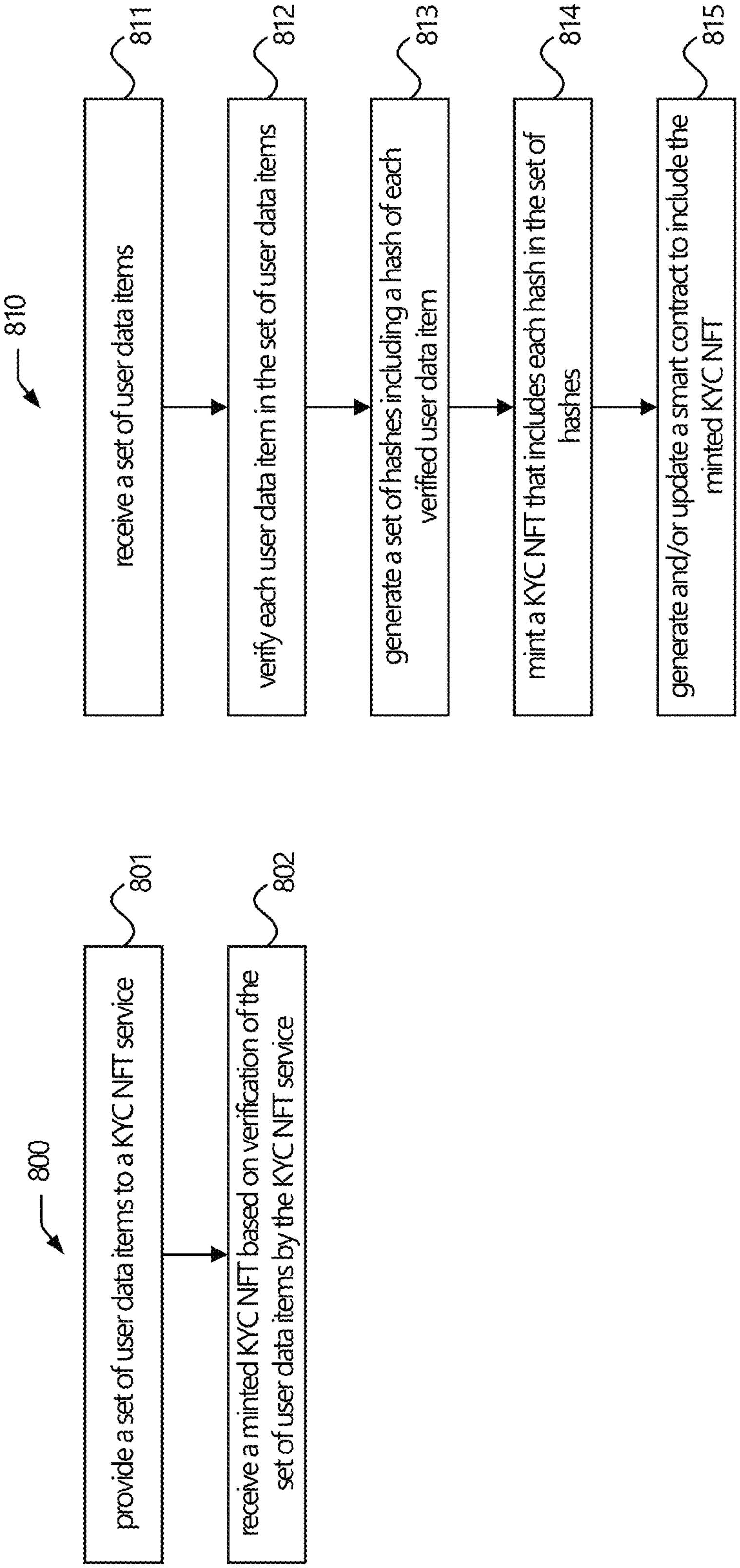
FIG. 8 depicts example processes for practicing various aspects of the present disclosure.

FIG. 8 depicts example processes 800 and 810 for practicing various KYC/AML aspects discussed herein. The example operations of processes 800 and 810 can be arranged in different orders than shown, one or more of the depicted operations may be combined and/or divided/split into multiple operations, depicted operations may be omitted, and/or additional or alternative operations may be included in any of the depicted processes.

Process 800 may be performed by a user device (e.g., users/client devices 101, 501, 910, 960, 1101, 1250) for obtaining know your customer (KYC) non-fungible token (NFT) services. Process 800 includes: at operation 801, providing, via a user app (e.g., wallet app 910 and/or app 1250), a set of user data items (e.g., KYC data 101, user data 501, and/or inputs 1001) to a KYC NFT service (e.g., NFT/Blockchain service 502, 900); and at operation 802, receiving, from the KYC NFT service via the user app, a minted KYC NFT (e.g., NFT 1002) based on verification of the set of user data items by the KYC NFT service.

Process 810 may be performed by a KYC NFT service (e.g., NFT/Blockchain service 502, 900) for providing a know your customer (KYC) non-fungible token (NFT) service. Process 810 includes: at operation 811, receiving a set of user data items (e.g., KYC data 101, user data 501, and/or inputs 1001) associated with a user (e.g., users/client devices 101, 501, 910, 960, 1101, 1250); at operation 812, verifying each user data item in the set of user data items; at operation 813, generating a set of hashes, wherein each hash in the set of hashes corresponds to a verified user data item in the set of user data items; at operation 814, minting a KYC NFT (e.g., NFT 1002) that includes each hash in the set of hashes; and at operation 815, generating and/or updating a smart contract to include the minted KYC NFT (e.g., NFT 1002).

Figure 9:
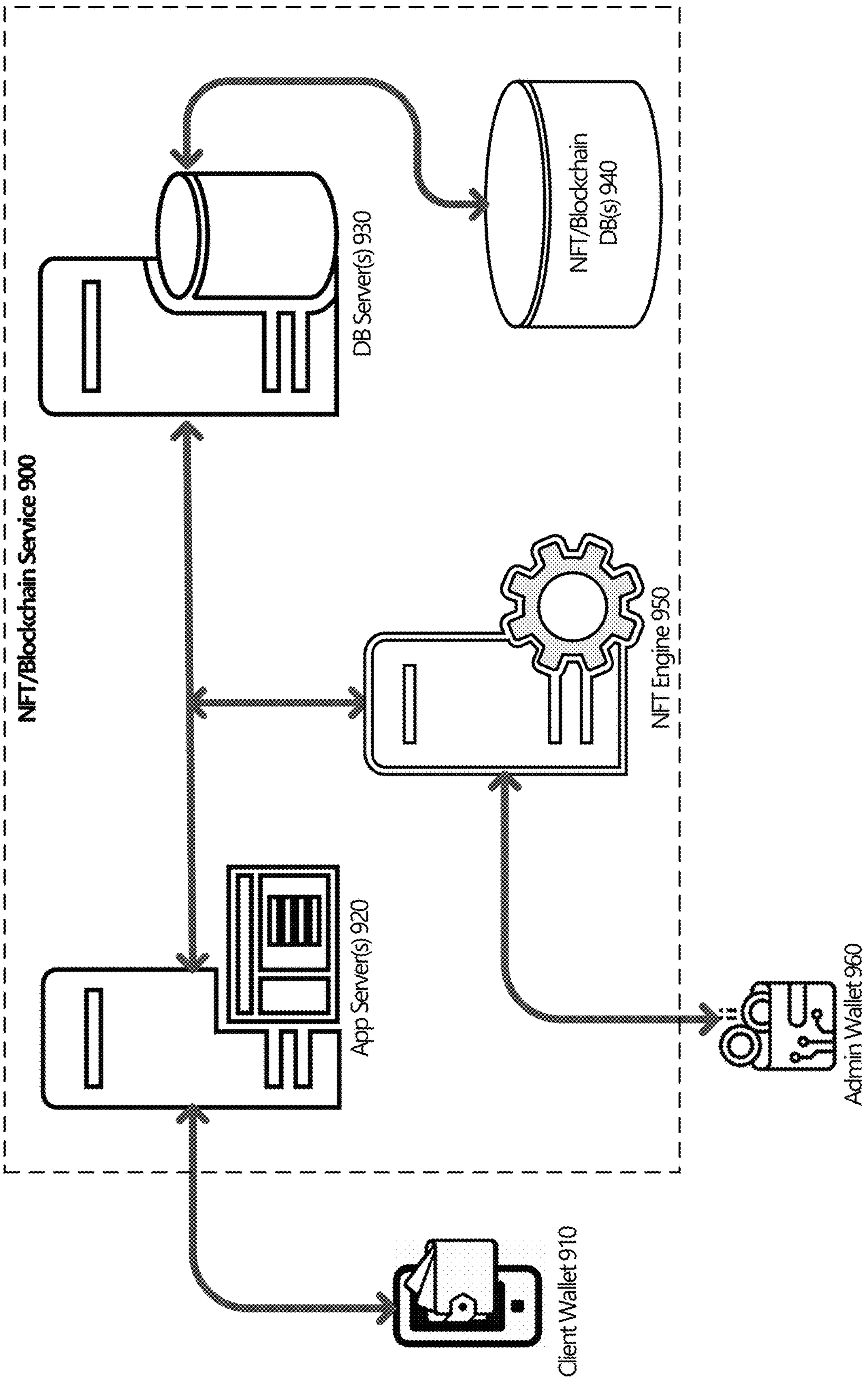
FIG. 9 depicts elements of an example NFT/blockchain service.

FIG. 9 depicts various elements/components of the NFT/blockchain service 900. In this example, the NFT/blockchain service 900 includes an NFT engine 950 communicatively coupled with one or more app servers 920 and one or more database (DB) servers 930. The server(s) 920, 930, and/or 950 operate distributed applications to provide the NFT/blockchain service 900 to client/wallet devices 910. The server(s) 920, 930, and/or 950 may be located in one or more data centers (e.g., provided by a cloud computing service or the like), at the network's "edge", and/or in some other arrangement or configuration. One or more of the servers 920, 930, and/or 950 may be virtual machines (VMs) or other isolated user-space instances provided by a cloud computing service, edge computing service, and/or the like. Furthermore, some or all of the server(s) 920, 930, and/or 950 may also provide various administration capabilities to support the various aspects discussed herein. In various implementations, the servers 920, 930, and/or 950 can be located at different geographic locations such as, for example, in different data centers, co-located with different network access nodes, and/or the like. In one example implementation, the infrastructure may include a full stack in the cloud, the servers 920, 930, and 950 implementing a suitable Linux distribution (distro), operating NGINX and/or Apache® web/app servers, where the server-side languages of the distributed apps are written using PHP, Python, JavaScript, and Solidity, and the DB systems (e.g., NFT DBs 940) are implemented using MySQL, MongoDB, and IPFS.

In some implementations, the server(s) 920 receive user data 510 as inputs (e.g., inputs 1001 in FIG. 10) via a front-end portal (e.g., mobile app, web app, and/or website, not shown by FIGS. 8 and 9). As examples, the user data 510 includes physical or electronic identity documents and/or other information such as contact information, authentication credentials, biometric data, credit report scores and/or other credit report data, KYC data, knowledge-based authentication (KBA) data, and/or the like. In some implementations, physical identity documents and/or other physical media can be scanned in and uploaded by individual users (e.g., using their client/wallet device/apps 910 or 960) to the server(s) 920 using a suitable user interface provided by the front-end portal. This user interface can also be used to provide (upload) electronic documents/information to the server(s) 920. Additionally or alternatively, the same or different interfaces can be used to supply the KYC data and/or KBA data. Additionally or alternatively, the user data 510 can be provided to the server(s) 920 via third party web/mobile apps and/or Web2 apps using suitable APIs and the like. Examples of such APIs include remote APIs and/or web APIs (e.g., Representational State Transfer (REST or RESTful) API, HTTP/2, Simple Object Access Protocol (SOAP) API, salesforce.com Apex API, and/or the like), a web services (WS) (e.g., Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, Flow Wallet API, and/or the like), and/or some other suitable API and/or WS. Additionally or alternatively, the APIs can include inter-process communications (IPC), such as sockets, message queues, anonymous pipes, named pipes, shared memory, message passing, memory-mapped files, message-oriented middleware, Thirft, Common Object Request Broker Architecture (CORBA), Electron asynchronous IPC, and/or other IPC or related technologies. The terms "users 910, 960", "individuals 910, 960", "wallet apps 910, 960", "wallet devices 910, 960", "client systems 910, 960", "client devices 910, 960", and/or the like may be used interchangeably throughout the present disclosure, and these terms may refer to the devices/apps 910, 960 themselves and/or the users of the devices/apps 910, 960, unless the context dictates otherwise. Furthermore, the term "users 910, 960" may refer to a "user 910", a "user 960", or both a "user 910 and user 960". Additionally or alternatively, the users 910, 960 may be the same or similar to the user 101 and/or user system 501 discussed previously.

Web 2.0 platforms ("Web2") are websites and/or apps that emphasize user-generated content, ease of use, participatory culture and interoperability (i.e., compatibility with other products, systems, and devices) for end users (e.g., users 910, 960). A Web2 platform allows users (e.g., users 910, 960) to interact and collaborate with each other through, for example, social media dialogue as creators of user-generated content in a virtual community. Data and content are centralized in a relatively small group of companies sometimes referred to as "Big Tech". Examples of Web2 platforms include social networking sites or social media platforms (e.g., Facebook®, Instagram®, Twitter®, and the like); blogs, wikis, and folksonomies ("tagging" keywords on websites and links); video sharing platforms (e.g., YouTube®, Vimeo®, TikTok®, and the like); image sharing platforms (e.g., Flickr®, Imgur®, and the like); hosted services; Web apps and mobile apps; collaborative consumption platforms; and mashup apps.

Web 3.0 platforms ("Web3") represent a new iteration of the World Wide Web based upon blockchain technologies, which incorporates concepts including decentralization and token-based economics. Web3 platforms usually revolve around the idea of decentralization and often incorporate blockchain technologies, such as various cryptocurrencies and NFTs.

The received user data 510 may be provided to the DB servers 930, which may store the data in the NFT DB(s) 940 for temporary and/or persistent storage. The DB(s) 940 can be blockchains, distributed ledgers, and/or any suitable relational and/or non-relational DB(s) stored by one or more suitable data storage devices. The DB servers 930 may also be configurable to destroy the stored information within a predefined or configurable period of time (e.g., by deleting such information from the DB(s) 940). In some implementations, the servers 920, 930, and/or 950 can also be configurable or operable to generate reports and statistics to authorized recipients upon request. In embodiments, the received user data 510 is provided to the NFT engine 950 for generation of suitable NFTs according to the various embodiments discussed herein.

The NFT engine 950 is an adaptable and multipurpose software and/or hardware element that generates an NFT-based form of digitized/tokenized IDs, using blockchain technology, smart contracts, distributed ledgers, digital wallets 910, distributed apps, and/or identity data (e.g., identity documents, personal information, biometric data, and/or the like). In some implementations, the NFT engine 950 is an application operated by one or more computing devices, such as one or more servers (e.g., a cluster of cloud compute nodes, one or more edge compute nodes, network functions and/or application functions in a cellular network, and/or the like). Additionally or alternatively, the NFT engine 950 may be a distributed application operated by multiple app servers 920 or other devices.

The NFT engine 950 accepts inputs (e.g., inputs 1001 in FIG. 10) from any number of sources, processes the inputs, and produces NFTs (e.g., outputs 1002 in FIG. 10) that can be used on Web2 and/or Web3 platforms, and/or carried by individuals via digital wallets 910. The NFT engine 950 can take any form of physical ID, digital ID, KYC data, KBA data, and/or other information, process them in complex ways as defined by the users (e.g., users 910, 960), and generate and output an NFT form to be used in various applications (apps), such as Web2 and/or Web3 apps. The generated NFTs are then stored in the NFT DB(s) 940 via the DB servers 930 in one or more distributed ledgers or blockchains (e.g., blockchains 1015 in FIG. 10).

Blockchain is a technology that uses cryptographic mechanism(s) to create secure linkages between records (referred to as "blocks"). Additionally or alternatively, a blockchain (e.g., blockchain 1015 in FIG. 10) is a type of DB, which may or may not be a distributed DB, that can record transactions in a public or private peer-to-peer (p2p) network. For purposes of the present disclosure, the term "blockchain" can refer to a blockchain DB and/or the technologies used to create, maintain, and/or modify a blockchain DB. In the context of blockchain technologies, a "ledger" refers to a series of interconnected records or blocks. Blockchain technologies distribute a DB of transactions (a ledger) to some or all participants in a network. The participants in a blockchain network are referred to as "peers" or "nodes". In some examples, the client devices 501, 910, 960, servers 920, 930, 950, individual wallet apps, and/or other apps and/or compute nodes, including any of those discussed herein, can operate as nodes or peers in a blockchain network. In some implementations, some or all nodes in a blockchain network can include or otherwise implement the same or similar cryptographic mechanism(s) and/or blockchain service(s) 502 discussed herein. An individual blockchain (or ledger) is shared, replicated, and synchronized among one or more nodes in the blockchain network.

In some implementations, a blockchain has no central administrator or centralized data storage system; however, in other implementations a centralized system may be used to store and maintain individual blockchains, validate blocks, and/or perform other functions. Most ledgers are used to track a specific type of information or transactions, such as cryptocurrency, securities, tokens, NFTs (including NFT IDs, KYC NFTs, and/or the like), smart contracts, and/or the like; however, some ledges may be used to track multiple types of information/transactions.

As mentioned previously, blocks in a blockchain are linked together using some identifier or other like mechanism. Each block (record) in a blockchain includes, for example, transaction data, a timestamp, and a block ID. Typically, blocks are linked together using cryptographic mechanism(s) where each block contains a cryptographic hash of a previous block. In some implementations, the hash of the previous block may act as the block ID for a block, or a hash of the block itself (including the hash of the previous block) may act as a block ID for a block. In some implementations, the blocks may be encrypted to enhance security. The timestamp proves that the transaction data existed when the block was published in order to get into its hash. Each block contains information about the block previous to it, forming a chain, with each additional block reinforcing the ones before it. This makes blockchains resistant to modification of their data because once recorded, the data in any given block cannot be altered retroactively without altering all subsequent blocks. An advantage of using blockchain technology is that transactions performed on a blockchain are immutable, which means that the transactions cannot be changed or altered without permission from the network. This creates an accurate and nearly unchangeable record (or chain of records) that can be used to verify each transaction, such as each transfer of title or ownership, identity changes and/or changes/updates to identifying information, and the like.

The nature of the cryptographic linkage makes the series of interconnected records more resistant to spontaneous changes to data in a record because publishing an update to an individual record entry also requires altering the cryptographic hash that was generated as the record was created, and any records added to the ledger after an altered record must be re-validated and re-added to the ledger (also with updated hashes). In a blockchain, a change to a record's value is typically published as a new ledger entry. When this single blockchain is connected to some kind of network that can handle communication between nodes and provide a system for one or more nodes to verify changes to network data, then an individual blockchain can be replicated across different nodes in the network. This replication creates multiple blockchain ledgers, containing identical records that have been independently verified. In these ways, a blockchain is provides immutability for the transactions that are tracked. In some implementations, a node pipeline may be used to verify blockchain transactions as discussed in [Flow], [Flow-NFT], and/or the like).

Additional or alternative examples of information that can be included in a block include: a timestamp (e.g., the time when the block was minted and/or mined or created), a block number (e.g., the length of the blockchain in number of blocks), fee per gas or gas price (e.g., the minimum fee per gas required for a transaction to be included in the block), difficulty (e.g., the effort required to mint and/or mine the block), mix hash (e.g., a unique ID for the block), parent hash (e.g., a unique ID for the block that came before (i.e., the previous block or the top-most block)), transaction data (e.g., the transaction included in the block (e.g., inputs 1001 in FIG. 10)), state root (e.g., the entire state of the system including, for example, account balances, contract storage, contract code, account nonces, identity documents and/or identity data, KYC data 110 (or user data 510), and/or the like), and a nonce (e.g., a hash that, when combined with the mix hash, proves that the block has gone through a consensus (e.g., proof-of-work, proof-of-stake, and/or the like) and/or other suitable verification/validation process(es)). Additional or alternative information may be included in a block in other implementations.

Blockchains can be managed by a p2p network for use as a publicly distributed ledger, where nodes collectively adhere to a protocol to communicate and validate new blocks. These blockchains are referred to as "public blockchains". Public blockchains are permission-less by nature, allowing most users to join, and are usually decentralized (e.g., stored and updated by multiple compute nodes). By contrast, a private blockchain is a blockchain network where only one or a few authorities or organizations have control over the blockchain network including, for example, rules and/or policies for adding new blocks to the blockchain and the like.

A non-fungible token (NFT) is a unique and non-interchangeable unit of data stored on a blockchain. NFTs use a digital ledger to provide a public certificate of authenticity or proof of ownership, but do not restrict the sharing or copying of the underlying digital files. The lack of interchangeability (fungibility) distinguishes NFTs from blockchain cryptocurrencies, such as Bitcoin, Ethereum, and the like. The mapping from original data to a token uses methods which render tokens infeasible to reverse in the absence of the tokenization system, for example, using tokens created from random numbers. Tokenization systems provide data processing applications with the authority and interfaces to request tokens, or detokenize back to sensitive data. NFTs can be associated with reproducible digital files such as photos, videos, and audio. In various implementations, the NFTs may be generated in accordance with suitable standards, such as [EIP-20], [EIP-721], [EIP-1155], [EIP-3525], [EIP-5528], [EIP-5679], [EIP-5727], [Flow-NFT], and/or the like.

As mentioned previously, the NFTs generated by the NFT engine 950 can be stored in a client wallet 910 (also referred to as a "digital wallet 910", "cryptocurrency wallet 910", "wallet device 910", "wallet 910", or the like). The wallet 910 is a device, physical medium, program, or a service that stores a user's credentials (cryptographic private keys and/or public keys, digital certificates, and the like) for completing transactions such as cryptocurrency and/or other blockchain-related transactions. In some implementations, the wallet 910 may be a software element (e.g., mobile payment app) such as Apple Pay®, Google Pay®, PayPal®, Venmo®, and/or other like application operated by a user device.

The user device may be a mobile device such as a laptop, smartphone, tablet, wearable (e.g., smartwatch), and/or the like, or any other suitable user device such as those discussed herein. In these implementations, the wallet 910 may be a platform-specific app (e.g., iOS app, Android app, and the like). In other implementations, the wallet 910 may be a standalone hardware wallet device such as the Ledger Nano X provided by Ledger SAS®, the YubiHSM2 provided by Yubico®, the Trezor Model TR provided by SatoshiLabs S.R.O., and/or the like. The wallet 910 may be a "hot wallet" (e.g., a wallet that stores the user credentials, a network-connected application, and the like) or a "cold wallet (e.g., a wallet that stores the user credentials offline and/or disconnected from the internet or other network).

In various implementations, the user credentials are associated with a state of a user's account in a blockchain-based framework. The wallet 910 allows the user to make transactions, where the public key of the public/private key pair allows other wallets to, for example, make payments to the wallet 910 (e.g., using the wallet's 910 network address, app/wallet identifier, or the like) and/or mint tokens and/or NFTs, and the private key of the public/private key pair allows the wallet 910 spend currency or cryptocurrency stored by the wallet 910 and/or in the blockchain as well as transfer tokens and/or NFTs to/from other wallets. In addition to this basic function of storing the keys, the wallet 910 also offers the functionality of encrypting and/or digitally signing information or electronic documents. Signing can for example result in executing a smart contract, a cryptocurrency transaction, identification process, and/or legally signing a document.

Additionally, an administrator (admin) that operates the admin wallet 960 (also referred to as "admin 960") associated with an org/entity defines the requirements and functions of each NFT type. In some implementations, the admin 960 is involved in the creation of the NFTs by coding, compiling, deploying, and running a smart contract in/at the NFT engine 950. Additionally or alternatively, the admin 960 gathers information provided by individual users, encrypts the information, and then uploads the information to an InterPlanetary File System (IPFS) (see e.g., IPFS 1014 in FIG. 10 and [IPFS]) and/or a private data storage server. The admin 960 uses a wallet 960 which may be the same or similar as the wallet 910. In addition to the aspects discussed previously w.r.t the wallet 910, the wallet 960 may also perform monitoring and/or housekeeping functionality.

Furthermore, the wallets 910, 960 implement a wallet interface with the NFT/blockchain service 900 in order to provide inputs (e.g., inputs 1001 in FIG. 10) to the NFT/blockchain service 900, and to accept outputs (e.g., NFTs/outputs 1002 in FIG. 10) such as accepting transfers and the like. This wallet interface may be the aforementioned NFT front-end portal or some other interface.

Figure 10:
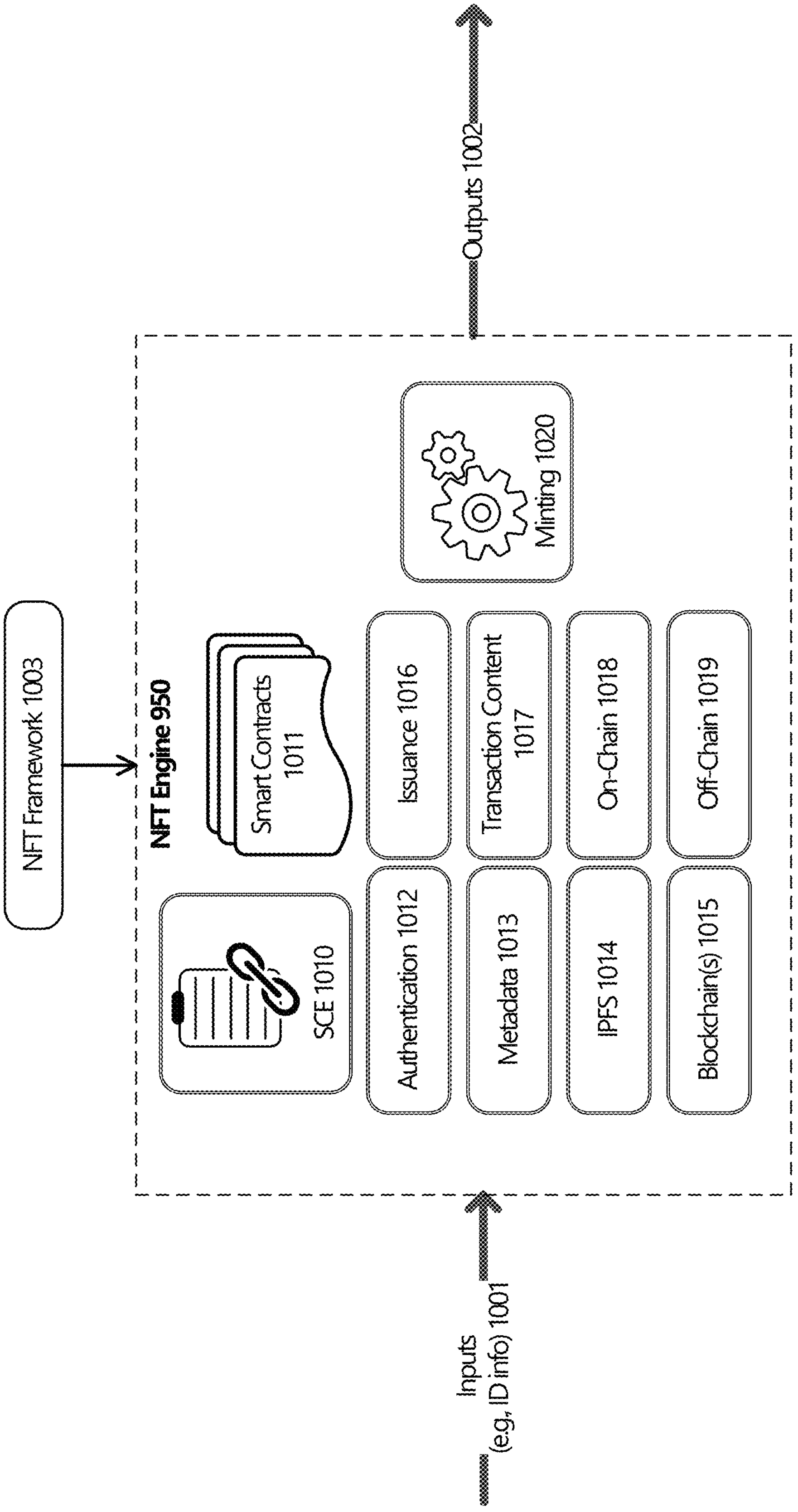
FIG. 10 depicts components of an example NFT ID engine.

FIG. 10 depicts an example implementation of the NFT engine 950. The NFT engine 950 is or includes one or more multi-use applications that include multiple microservices and business logic. In this example, the microservices of the NFT engine 950 include a smart contracts engine (SCE) 1010, one or more smart contracts 1011, authentication engine 1012, metadata 1013, IPFS microservice 1014, one or more blockchains 1015, issuance microservice 1016, transaction content 1017, on-chain microservice 1018, off-chain microservice 1019, and minting engine 1020.

As alluded to previously, the NFT engine 950 accepts various inputs 1001 (e.g., the user data 510 discussed herein), performs various operations (e.g., using the microservices 1011-1020), and produces NFT(s) as outputs 1002 (also referred to herein as "NFTs 1002" or the like). The inputs 1001 may include various identity documents (e.g., electronic identity documents and/or physical identity documents scanned in or otherwise transformed into electronic form) and/or other data associated with a particular individual or user.

Additionally or alternatively, the inputs 1001 may include user-supplied/provided personal data such as, for example, name, physical home address, physical employment address, phone number, email address, medical data (e.g., lab test results, vaccination records, EHRs, and/or the like), and/or any other types of data. Additionally or alternatively, the inputs 1001 may include other information related to a user such as, for example, rental agreements, mortgage statements, utility bills, cell phone service bills, and/or other financial instruments and/or financial institution documents. Additionally or alternatively, the web/app interface may request other information to be provided by the user such as biometric data and/or the like.

Additionally or alternatively, the inputs 1001 may include other information collected from the user device such as any type or combination of network addresses, timestamp, geolocation information associated with the user's access of the NFT/blockchain service 900, user ID (userId), client app ID, client app type (e.g., browser, wallet/payment app, or the like) and/or version, an app session ID, user agent string, operating system (OS) type and/or version, app and/or OS vendor, a network address (such as those discussed herein), a network session ID, a device ID or serial number, a product ID, EPC, RFID tag ID, an integer assigned to the user 910, 960 by a Unix-like OS (e.g., effective user ID (euid), file system user ID (fsuid), saved user id (suid), real user id (ruid), etc.), a cookie ID, a realm name, domain name/ID, logon user name or credentials, network credentials, social media account name, session ID, device fingerprint of a user/wallet device 910, 960, a digital certificate, and/or any other like ID associated with a particular user 910, 960 or user/wallet devices 910, 960) and/or the like. This information may be collected by program code/script embedded in webpages/web apps of the NFT front-end portal, which when executed by the user device, causes the user device to collect such data and send it to the NFT/blockchain service 900 as inputs 1001. Additionally or alternatively, sensitive data and/or confidential information may be collected. The personal, sensitive, and/or confidential data can be anonymized and/or pseudonymized or otherwise de-identified using suitable anonymization/pseudonymization technique(s).

The particular types of inputs 1001 used may be specified or configured by a particular platform, agency, org, FI 133, and/or other entity. In some implementations, individual users 910, 960 provide the inputs 1001 to the NFT/blockchain service 900 (e.g., using their client/user devices). In other implementations, an admin 960 collects the information and provides the information as inputs 1001 to the NFT/blockchain service 900 (e.g., using their client/user devices and/or a specialized/secure admin portal).

In addition to or alternatively to identity documents, other user data 510 may be provided as inputs 1001, such as, for example, user generated text, images, video, audio content, KYC data 110 and/or user data 510, KBA data, and/or other data. In some implementations, biometric analysis and/or processing may be incorporated into the NFT generation process (e.g., including biometrics being provided as inputs 1001). The biometric inputs 1001 may include physiological biometrics (e.g., fingerprints, face/facial features, DNA, palm print, body part geometry, vein patterns, eye features, odor/scent, voice features or voiceprint, neural oscillations and/or brainwaves, pulse, electrocardiogram (ECG), pulse oximetry, and/or the like) and/or behavioral biometrics (or "behaviometrics") (e.g., typing rhythm, gait, signature, behavioral profile features, voice features, and/or the like). In these implementations, the NFT engine 950 accepts one or more biometrics as inputs 1001, which are then combined together (and/or with other inputs 1001) and hashed. The hash will then become part of a smart contract (e.g., as generated and/or operated by the smart contracts engine 1011) to generate NFTs where use of biometrics is desired (e.g., identify-proofed NFTs, NGO/commercial NFTs, and/or social NFTs).

The authentication engine 1012 is a microservice that authenticates individual users 910, 960 that submit or otherwise provide inputs 1001 to the NFT engine 950. In some implementations, individuals 910, 960 register or enroll with the NFT/blockchain service 900 by providing user data 510 (e.g., as inputs 1001) to the NFT/blockchain service 900 using a suitable user interface operated by a user system (e.g., wallet devices 910, 960). For example, a web/app interface may be provided to the user system and/or wallet devices 910, 960 to access a web/app server 920 to provide the information to the NFT engine 950, which is then stored by the DB server(s) 930 in NFT DB 940. This web/app interface may include form fields for users 910, 960 to enter the information and/or other personal information. Additionally or alternatively, client-side script, tags, program code, and the like may be included in the NFT front-end portal/interface that collects some of the user data 510/inputs 1001 from the user 910, 960 when accessed by the user/wallet devices 910, 960. The information used for authentication may be the same or similar to the user data 510/inputs 1001 used to create the NFTs 1002 and/or may be a subset of the user data 510/inputs 1001. In some implementations, the authentication engine 1012 may verify the user data 510/inputs 1001 against authoritative sources (e.g., credit bureaus, government database(s), corporate database(s), and the like). Additionally or alternatively, the authentication engine 1012 authenticates a user's 910, 960 identity using authentication or authorization credentials, biometric data, KYC data, and/or KBA data. The authentication engine 1012 also provides access control to restrict what accounts can mint items, including defining and enforcing ownership and role-based access schemes (see e.g., [OZContracts]). Additionally or alternatively, the authentication engine 1012 authenticates a user's 910, 960 identity using third party identity verification services, in which case the authentication engine 1012 can communicate with the third party identity verification service via suitable APIs and the like.

The NFTs (e.g., NFT(s) 520, 1002) and/or other tokens may be created (or "minted" in the parlance of the NFT arts) by the minting engine 1020, which is discussed in more detail infra. The minting process may be based on one or more of the smart contracts 1011, which are generated by the SCE 1010 based on configurations and/or templates provided by admins 960. The SCE 1010 may implement any suitable smart contract mechanism (e.g., [Solidity], [EEA-CS7], and/or the like) to generate smart contracts 1011. In some implementations, a suitable integrated development environment (IDE) or software development environment may be used to define and generate the configurations used by the SCE 1010 to generate and deploy the smart contracts 1011. The SCE 1010 combines one or more inputs 1001 and hashes the combined inputs 1001. The hash will then become part of a smart contract 1011 (e.g., as generated and/or operated by the SCE 1011), which are then executed by the minting engine 1020 to generate NFTs 1002.

The NFT engine 950 can include or provide runtime environment(s) in which smart contracts 1011 can be executed. Smart contracts 1011 are reusable snippets of code (e.g., a program, application, set of trigger functions, or transaction protocol) that are intended to automatically execute, control, or document relevant events and actions according to some predefined criteria or conditions. Additionally or alternatively, smart contracts 1011 are computer programs, scripts, and/or code snippets that are executed by nodes in a blockchain network to digitally facilitate, verify, and/or enforce the negotiation or performance of a contract, which may be made partially or fully self-executing and/or self-enforcing. Smart contracts 1011 can implement a contract between two or more parties, such as where the execution is guaranteed and auditable. In some examples, the smart contracts 1011 include codes, real-time codes, scripts, programs, API calls, and/or the like that verify, validate, and/or authenticate one or more inputs 1001 (e.g., KYC data 110, 510, and/or the like), generate risk assessments/evaluations for users 101 (customers), and/or monitor financial transactions for KYC ongoing monitoring aspects.

Each smart contract 1011 includes a set of policies, rules, configurations, functions, and/or data that govern what happens whenever an interaction with an NFT 1002 takes place. In some implementations, each NFT 1002 is associated with a smart contract 1011, which includes a set of functions of the NFT 1002 that allow applications to interact with the NFT 1002. Additionally or alternatively, smart contracts 1011 include one or more functions that take relevant or desired data (e.g., unique IDs, content items (e.g., KYC data 110), name, inheritance (if applicable), metadata, and/or any other relevant data structures, variables, parameters, and/or the like) as arguments and/or parameters, and assigns it/them to appropriate variables. Smart contracts 1011 can also include transfer logic for transferring corresponding assets, such as the cryptocurrency, fungible token, or NFT 1002. This can involve defining one or more functions that take a new owner's address (e.g., wallet ID, network address, and/or the like) as an argument and/or parameter and updates the contract's internal state to reflect the transfer. Additionally or alternatively, the smart contracts 1011 can include logic for calculating and distributing royalties, which may include one or more functions defined to obtain a sale price as an argument and/or parameter and uses it to calculate the royalty payment. In various implementations, individual smart contracts 1011 specify functions, rules, policies, and/or configurations for verifying a user's 101 identity and/or for providing such verification to one or more orgs 133, 533. Additionally or alternatively, the smart contract 1011 specifies transaction(s) or transaction type(s) that can be used to mint (generate), purchase, transfer, or otherwise obtain the corresponding NFT 1011. The specific syntax and/or code of a smart contract may depend on the specific language being used and/or the platform or service 502, 900 on which the smart contract 1011 is to be deployed. Smart contracts 1011 can be written in higher-level programming languages and compiled to smart contract-specific bytecode. The higher-level programming languages may be a smart contract specific language such as, for example, Ethereum® Virtual Machine (EVM) bytecode, [Solidity], [Vyper] (Python derived), [Yul+], [Cadence], Bamboo, Lisp Like Language (LLL), EOS.IO, C++ for EOS.IO, Simplicity provided by Blockstream™, Rholang, Michelson, Counterfactual, Plasma, Plutus, Sophia, and/or the like, or may be any of the other programming languages discussed herein, or combination(s) thereof. Once a smart contract 1011 is written/developed and compiled, it can then be deployed to one or more blockchains 540, 1015 via a suitable interface(s). Once deployed, one or more blockchain nodes in a blockchain network can execute or run the smart contract code.

In various implementations, a transaction is made on an NFT 1002, the code of the smart contract 1011 checks for certain conditions and executes relevant actions. This transaction is then stored as transaction content 1017. For example, when an NFT 1002 is requested by an entity/org 133, 533 that wishes to verify an individual's identity, the smart contract 1011 will update and/or manage relevant permissions, and execute a transaction when permitted by the owner of the NFT 1002 (e.g., a user 101 and/or user that operates user system/device 501, 910, 960). Some smart contracts 1011 determine whether nodes, accounts, and/or platforms can access, or perform specific actions on or using a particular NFT 1002, or on a particular blockchain 1015 (see e.g., discussion of permissioning smart contracts in [EEA-CS7]). In some implementations, when an NFT 1002 is used to verify a user's 101 identity, the corresponding smart contract 1011 can automatically allocate payments or asset transfers to or from the owner of the NFT 1002 based on the rates set and/or other conditions in the smart contract 1011 when the NFT 1002 was created or updated. Additionally or alternatively, when an NFT 1002 is used to verify a user's 101 identity, the corresponding smart contract 1011 can automatically transfer suitable data or indicators of the user's 101 identity to a requesting org 133, 533.

In some implementations, a smart contract 1011 comprises a collection of code (e.g., its functions) and data (e.g., its state) that resides at a specific address on a blockchain(s) 540, 1015. In Ethereum implementations, a developer publishes smart contract code into Ethereum Virtual Machine (EVM) memory. EVM is a global virtual computer whose state every participant on the Ethereum network stores and agrees on. Ethereum participants can request the execution of arbitrary code on the EVM, and code execution changes the state of the EVM. Individuals (e.g., wallet devices 910 and/or 960) can request smart contract code be executed by making a transaction request. An example smart contract is shown by table 1-1.

TABLE 1-1 example pseudocode for a smart contract

```
//SPDX-License-Identifier: MIT
pragma solidity ^0.7.0;
import "hardhat/console.sol";
import "@openzeppelin/contracts/token/ERC721/ERC721.sol";
import "@openzeppelin/contracts/utils/Counters.sol";
contract NFTMinter is ERC721 {
  using Counters for Counters.Counter;
  Counters.Counter private__tokenIds;
  constructor(string memory tokenName, string memory symbol)
  ERC721(tokenName, symbol)
{
  __setBaseURI("ipfs://");
  }
  function mintToken(address owner, string memory metadataURI)
  public
  returns (uint256)
  {
  __tokenIds.increment( );
  uint256 id = __tokenIds.current( );
  __safeMint(owner, id);
  __setTokenURI(id, metadataURI);
  return id;
  }
}
```

In table 1-1, the pragma directive is used to enable certain compiler features or checks (see e.g., [Solidity], [OZContracts]). The contract is a function that is similar to classes in object-oriented languages, which contains persistent data in state variables and functions that can modify these variables. Here, the contract is NFTMinter, which is set to be an ERC721 object, which is an implementation of [EIP-721] (note that [EIP-721] is also referred to as Ethereum Request for Comments 721 or "ERC721"). The ERC721 object comprises a set of interfaces, contracts, and utilities are all related to [EIP-721]. The constructor is a special function that is executed during the creation of the contract and cannot be called afterwards. In this case, the constructor sets the resource address or base URI (e.g., "ipfs://") based on the token name ("tokenName") and token symbol ("symbol"). In some implementations, the token name and token symbol are concatenated to generate the base URI. In some implementations, after the constructor has executed, the final code of the contract is stored on the blockchain.

Furthermore, the token name in table 1-1 refers to the name of the token being generated. In some implementations, a generic token name may be used for the NFTs 1002 (e.g., "NFT-ID"). Additionally or alternatively, the token name may include a name of the particular sector for which the NFT is created (e.g., government sector 802, NGO sector 804, social media sector 806, or the like), a particular platform type for which the NFT 1002 is created (e.g., social media platform, ecommerce platform, Web2, Web3, or other platform types), and/or a specific org for which the NFT 1002 is created (e.g., a specific platform, enterprise, company, government agency or regulatory body, and/or the like).

The token symbol usually refers to the currency symbol (or currency sign) used to represent a currency (e.g., the symbol "$" representing U.S. dollars, the symbol "¥" representing Yen, the symbol "'₿'" representing Bitcoin, the symbol "Ξ" representing Ether, and the like). In some implementations, such as when an NFT 1002 is a government NFT 1002, the symbols used for NFTs 1002 may be based on the jurisdiction for which the NFT 1002 is created (e.g., a two or three character country codes or geocodes as defined by ISO 3166-1:2020 and/or ISO 3166-2:2020, currency codes such as those defined by ISO 4217:2015, ITU letter codes, international telephone country codes, mobile country codes (MCCs), and/or the like). Additionally or alternatively, when an NFT 1002 is an NGO/commercial NFTs, the symbols used for NFTs 1002 may be based on an abbreviation or acronym of the org/entity, a ticker or stock symbol of the org/entity, and/or some other symbol as defined by the entity or org. Additionally or alternatively, a generic symbol may be used or the symbol may be omitted.

In some implementations, the smart contracts 1011 may be part of one or more decentralized apps (Đapps), which are apps running on a decentralized p2p network, often a blockchain 1015. A ĐApp may include a user interface running on another (centralized or decentralized) system and may include decentralized storage and/or a message protocol and platform. In these implementations, a ĐApp may be a web user interface and a smart contract 1011.

Furthermore, the SCE 1010 and/or minting engine 1020 may implement a suitable NFT framework 1003, such as the Ethereum® platform (e.g., as discussed in [EIP-20], [EIP-165], [EIP-173], [EIP-721], [EIP-777], [EIP-1155], [EIP-3525], [EIP-5528], [EIP-5679], [EIP-5727], [Ethereum-Doc], [EEA-CS7], and the like), Ethereum® Immutable X platform, Polygon (formerly known as Matic Network), the Flow blockchain (see e.g., [Flow] and/or [Flow-NFT]), Bitcoin Cash, Cardano, and/or the like.

The metadata 1013 may include any data about individual NFTs 1002 such as, for example, NFT type and/or data identifying an asset/object to which the NFT represents (e.g., a particular type of ID that the NFT 1002 represents), approval identities/entities, owners of an individual NFTs 1002, an org associated with the NFT 1002 (e.g., an issuer of the NFT 1002), transferor ID (e.g., someone to which the NFT 1002 is transferred, a description of the asset/object to which the NFT 1002 represents (e.g., usage and/or permissions associated with the NFT 1002), a URI pointing to a resource with an image (e.g., a MIME type image) representing the asset to which the NFT 1002 represents, and/or other like metadata. In some implementations, the ID metadata 1013 can reside on one or more blockchains 1015, which may be stored in the NFT DB(s) 940. In other implementations, the ID metadata 1013 is stored off-chain when a token URI includes the resource/location of the ID metadata 1013, which may be stored either on a centralized server or in or at an IPFS location (e.g., a content identifier (CID) or other a label used to point to material in IPFS).

The IPFS microservice 1014 may include APIs and/or functions to access data stored in the IPFS as discussed in [IPFS]. Additionally or alternatively, the IPFS microservice 1014 includes an update feature, where an ID history can be updated without touching the original data. In these implementations, the update procedure may include reading or otherwise accessing current metadata from the IPFS; updating the metadata with new data entry/entries; adding new metadata to the IPFS; and updating content hash on smart contract.

The minted NFTs 1002 may be stored in one or more blockchains 1015. Some or all of the blockchains 1015 may be private blockchains 1015 and/or some or all of the blockchains 1015 may be public blockchains 1015. In some implementations, individual blockchains 1015 are owned or are otherwise associated with a particular org or sector. For example, a blockchain 1015 owned or otherwise corresponding to a State's Department of Motor Vehicles (DMV) may include blocks for respective driver's license NFTs 1002. In other implementations, individual blockchains 1015 are owned or are otherwise associated with a an individual, where each block corresponds to minted NFT 1002 for that person, and new blocks are added whenever the NFT 1002 is updated with new or alternative user data 510.

The transaction content 1017 includes content or data associated with transactions involving the minted NFTs 1002. In general, a transaction 1017 involves a request to execute operations on a blockchain 1015 that changes the state of one or more accounts. More specifically, transaction content 1017 may include data committed to a blockchain 1015, which may be signed by an originating account and targeting a specific address. The transaction content 1017 also contains metadata 1013. Some transaction content 1017 may include a contract creation transaction, which is a special transaction 1017 with a zero address (e.g., an address of all zeros, "0") as the recipient, which is used to register a contract and record it on the Ethereum blockchain.

Nodes processing transactions is the basis of adding blocks to a blockchain 1015, and may be subject to the permissions defined in the corresponding smart contracts 1011. When mining new blocks, a processing node checks the validity of a transaction using the appropriate smart contract 1011 with the state at the block's parent. If not permitted, the transaction is discarded. If permitted, the transaction is included as a new block and the block dispatched to other nodes (for inclusion in local versions of the blockchain 1015). When receiving a block, the receiving node checks each included transaction using the appropriate smart contract 1011 with the state at the block's parent. If any transactions in the new block are not permitted, the block is considered invalid and discarded. If all transactions are permitted, the block passes the permissioning validation check and is then subject to any other validity assessments the client 910, 960 might usually perform.

Transactions 1017 can be on-chain transactions 1018 or off-chain transactions 1019. On-chain transactions 1018 (simply referred to as "transactions 1018" or "on-chain 1018") are transactions that occur on a blockchain 1015 that are reflected on the distributed ledger. On-chain transactions 1018 are transactions that have been validated or authenticated and lead to an update to the overall blockchain network. An on-chain transaction 1018 occurs and is considered valid when the blockchain 1015 is modified. By contrast, an off-chain transaction 1019 (simply referred to as "off-chain 1019") takes the value outside of the blockchain 1015 and/or transactions that do not occur on the blockchain network, but instead, are transacted on another electronic system.

The minting engine 1020 is a microservice or facility that generates NFTs 1002. Similar to the way metal coins are minted and put into circulation, the NFTs 1002 are also "minted" after they are created. The minting process turns the collection of inputs 1001 into an NFT 1002. During the minting process, the owner of the NFT 1002 can schedule reviews, define and/or execute identity verification processes, and/or the like. Once the NFT 1002 is generated, the issuance microservice 1016 issues or otherwise distributes the NFT 1002 to the wallet 910 of the owner of the NFT 1002. Minting NFTs typically involves the use of a smart contract 1011 that is specifically designed for minting NFTs 1002. Here, the smart contract code defines rules and/or functions for the NFT 1002, and how the NFT 1002 will be minted and transferred. Additionally, the smart contract 1011 may define the structure of the NFT 1002, such as the particular data/metadata fields the NFT 1002 will include (e.g., tokenId, owner, name, description, traits, FI account numbers, the owner's financial information, external links to relevant content, any of the metadata 1013, and/or the like). In some implementations, once the smart contract 1011 is written or developed, the smart contract 1011 is deploy to a blockchain 1015. This is can done using an SDK, command line interface (CLI), NFT minting app, and/or other suitable interface provided by the blockchain/NFT platform (e.g., NFT service(s) 502, 900 and/or the like). Once the smart contract 1011 is deployed, it can be used to mint the NFT 1002.

The NFT minting can involve calling specific function(s) in the smart contract (e.g., mint ( ) and/or the like), and passing data and/or parameters (e.g., a set of inputs 1001) to the smart contract 1011 for minting the NFT 1002. Calling the specific function(s) generates a unique ID for the new token/NFT (e.g., "tokenId"), and assigns the new token/NFT (or the unique ID) to an address of the NFT's 1002 owner by, for example, updating the ownership information within the smart contract 1011 to include the owner's address. Additionally, the function(s) may update the smart contract 1011 to include the relevant metadata (e.g., metadata 1013) in the predefined fields, and/or reference an off-chain storage location for the metadata (e.g., metadata 1013). In some implementations, the smart contract 1011 emits an event (e.g., a transfer event or the like) to notify the blockchain network (or individual blockchain nodes) about the minting transaction. This event can contain information (e.g., transaction content 1017), such as the sender, receiver, the token ID (or unique ID), and/or other data. The minting transaction indicated by the event message is broadcast to blockchain nodes (or "miners") that validate and/or verify the transaction data (e.g., transaction content 1017) and include the generated NFT 1002 as a block in the blockchain. When the transaction is confirmed and included in a block, the NFT 1002 is officially minted, and ownership is transferred to the specified address. The specific methods, operations, tasks, and/or functions for minting an NFT 1002 may depend on the NFT/blockchain platform, the specific smart contract 1011 being used, and/or other conditions, parameters, and/or criteria. In some cases, minting an NFT 1002 requires payment of transaction fees on the same or different blockchain 1015, which may be in the form of fiat currency and/or cryptocurrency. In some implementations, the fees can vary depending on the NFT/blockchain platform, network conditions, and/or other conditions, parameters, and/or criteria.

In some implementations, each NFT 1002 is identified by a unique ID inside a smart contract 1011. This unique ID does not change for the life of the smart contract 1011. An attribute-value pair including the contract address and the tokenId is a globally unique and fully-qualified identifier for a specific asset on a blockchain 1015. The unique ID may be any value or data structure that uniquely identifies an individual and/or their user devices 910, 960. In one example, the unique ID may be a randomly generated number or string, which may be generated using a suitable random number generator, pseudorandom number generators (PRNGS), and/or the like. Additionally or alternatively, the unique ID may be a version 4 Universally Unique Identifier (UUID) that is randomly generated according to Leach et al., "A Universally Unique IDentifier (UUID) URN Namespace", Internet Engineering Task Force (IETF), Network Working Group, Request for Comments (RFC): 4122 (July 2005) ("[RFC4122]"), which is hereby incorporated by reference in its entirety and for all purposes. In one example implementation, the random unique ID is generated for an individual device 910, 960 upon completing the registration process.

Additionally or alternatively, the unique ID may be a hash value calculated from one or more inputs (which may or may not be unique to the individual/user devices 910, 960). In one example implementation, the unique ID may be generated using the supplied contact information (or a portion thereof) as an input to a suitable hash function (e.g., such as sha3 and/or any of those discussed herein). For example, the unique ID may be a version 3 or 5 UUID that is generated according by hashing a namespace identifier and name using MD5 (UUID version 3) or SHA-1 (UUID version 5) as discussed in [RFC4122]. In another example, the unique ID may be generated using any suitable hash function and using any combination of PII and/or device or system information supplied by a user and/or extracted from the user devices 910, 960 during the NFT generation process.

Additionally or alternatively, the unique ID may be a digital certificate supplied by a suitable certificate authority, or may be generated using the digital certificate (e.g., hashing the digital certificate). In another embodiment, the unique ID may be a specific identifier or may be generated using the specific identifier (e.g., as discussed previously). The specific identifier may be any suitable identifier associated with a user and/or user devices 910, 960, associated with a network session, an application, an app session, an app instance, an app-generated identifier, and/or some other identifier (ID). The specific identifier may be a user ID or unique ID for a specific user on a specific client app and/or a specific user devices 910, 960. Additionally or alternatively, the user ID may be or include one or more of a user ID (UID) (e.g., positive integer assigned to a user by a Unix-like OS), effective user ID (euid), file system user ID (fsuid), saved user id (suid), real user id (ruid), a cookie ID, a realm name, domain ID, logon user name, network credentials, social media account name, user session ID, and/or any other like ID associated with a particular user devices 910, 960). Additionally or alternatively, the specific identifier may be a device identifier such as a device ID, product ID/code, serial number of the user devices 910, 960, a document of conformity (DOC), and/or the like. Additionally or alternatively, the specific identifier may be a network ID such as an international mobile subscriber identity (IMSI), internet protocol (IP) address, and/or some other suitable network address such as those discussed herein. Any of the aforementioned identifiers and/or information may be combined to produce the UID/unique ID, and/or other information, such as the information discussed infra, may be used to produce the UID/unique ID.

Additionally or alternatively, the unique ID may be based on a device fingerprint of the user devices 910, 960. The device fingerprint may be any information collected about the software and hardware of a computing device for the purpose of identification, which may or may not be incorporated into an identifier (e.g., any of the aforementioned IDs or the like). In one example implementation, the device fingerprint may be based on system data, sensor data, and/or the like that is/are collected and combined using some known mechanism (e.g., a hash function or the like). In another example implementation, the device fingerprint may be the output of a physical unclonable function (PUF) implemented by a tamper-resistant chipset in the user devices 910, 960 (e.g., TEE 1209 of FIG. 12 discussed infra). When a physical stimulus (e.g., electric impulse) is applied to the PUF, it may react in an unpredictable way due to the complex interaction of the stimulus with the physical microstructure of the PUF. This exact microstructure may depend on physical factors introduced during manufacture which may be unpredictable. The PUF outputs the device fingerprint that may serve as the UID. Any of the aforementioned embodiments/implementations may be combined and/or used to generate the NFT 1002.

Figure 11:
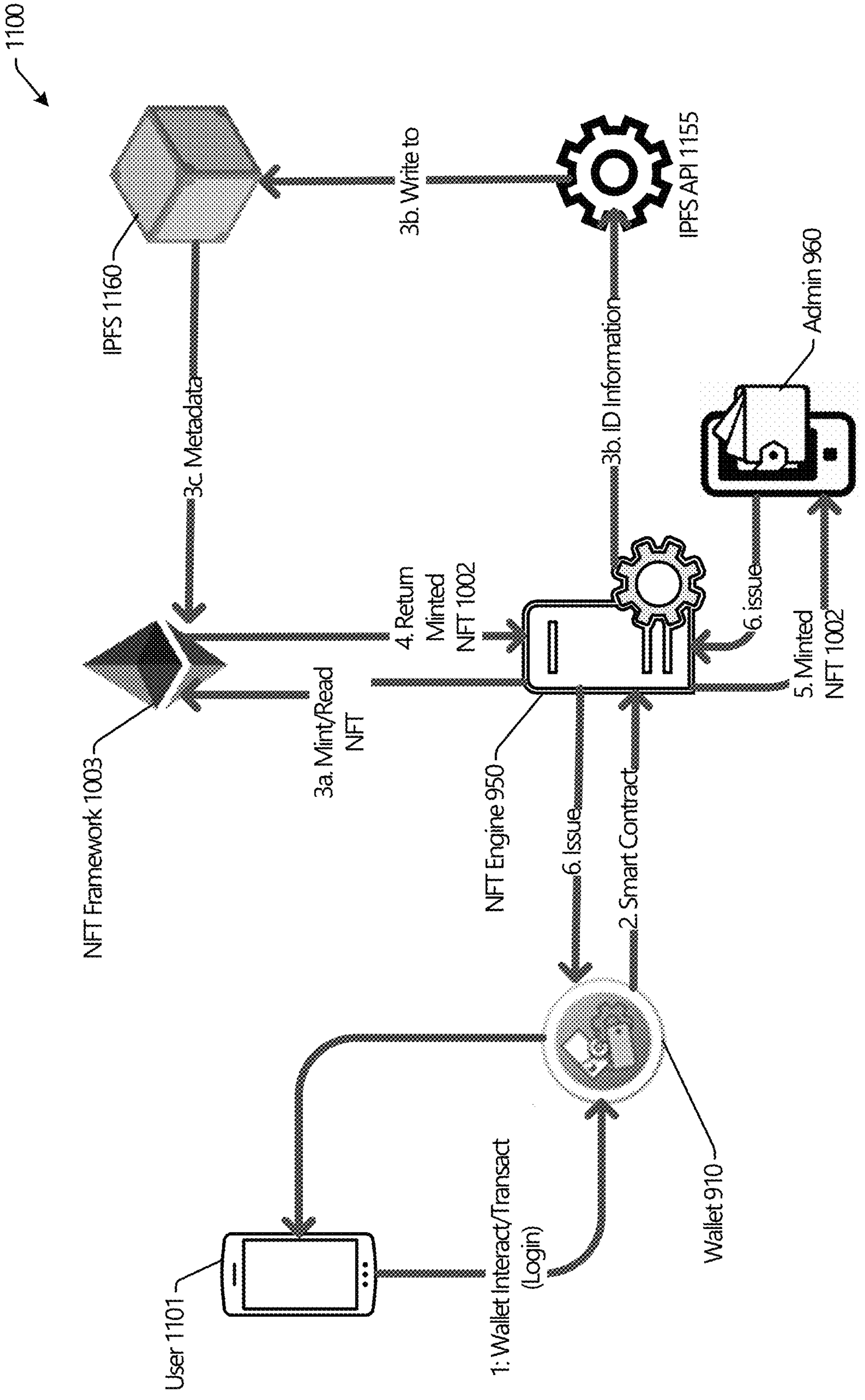
FIG. 11 depicts an example procedure for minting NFT IDs.

FIG. 11 depicts an example process 1100 for minting NFTs 1002. Process 1100 begins at operation 1 where a user 1101 logs in to their wallet app (e.g., wallet 910). As mentioned previously, the wallet 910 could be a mobile app (e.g., iOS/Android app), a browser extension or plugin, a web app, a desktop app, and/or the like.

At operation 2, the smart contract 1011 is triggered. The smart contract 1011 is inside and a part of the NFT engine 950, where the admin 960 defines the requirements and functions of each NFT type, then creates it. Deployment scripts are also included here. In some implementations, the smart contracts 1011 are written in Solidity or some other suitable smart contract language, such as any of those mentioned herein. The admin 960 may code, compile, deploy, and run this smart contract 1011. The power, flexibility, and multiuse may come from proprietary coding used for generating such smart contracts 1011.

At operation **3*a*, the NFT engine 950 (or the minting engine 1020) mints a new NFT 1002. To create a new NFT 1002, the user 910 or the admin 960 gathers KYC data 110, 510 provided by the user 1101 (e.g., KYC/KBA data, metadata 1013, and/or the like), encrypts the information, and then uploads the information to IPFS 1160 via the IPFS API 1155 at operation 3*b*, and/or uploads the information to a private data storage server (e.g., DB server 930 and/or NFT/blockchain DB(s) 940). In some examples, the IPFS 1160 is stored in the NFT/blockchain DB(s) 940, or otherwise corresponds to the NFT/blockchain DB(s) 940. Additionally, the information stored in the IPFS 1160 or the private data storage server may correspond to the metadata 1013 of FIG. 10. This information (e.g., metadata 1013) is provided to the NFT framework 1003 at operation 3*c*. This will also return a URL or other reference that points to the storage location of the data (e.g., metadata 1013) at operation 4. In some implementations, this data (KYC data 110, user data 510, and/or metadata 1013) is not stored on the blockchain 1015**.

Examples of user data 510 that may be submitted to the admin 960 and/or the NFT engine 950 include ID documents, phone number, email address; social media handles, YouTube channel, and/or the like; work or school ID; residential, academic, and/or financial history/records and/or related documentations (these can be periodically updated if needed); KYC data; KBA data; any other information the users 910, 960 and/or orgs 133, 533 require; and/or any other information or data discussed herein. The minting process stores the URL or other reference to the metadata 1013 inside the NFT 1002.

When an NFT 1002 is minted, it is added to the Admin digital wallet 960 at operation 5. A newly minted NFT 1002 belongs initially to whoever did the actual minting, which in this example is the admin 960. In some examples, the admin 960 may represent an employee, agent, or department of an org 133, 533 that requests a KYC NFT on behalf of user 1101. The NFT 1002 is then transferred to the individual's wallet 910 during the issuance process described infra.

At operation 6, the minted NFT 1002 is issued to the wallet 910. The admin 960 issues the new NFT 1002 by transferring the newly minted NFT 1002 to the wallet 910 of the new ID holder 1101 via the NFT engine 950 or using some other transfer mechanism. The transfer of the minted NFT 1002 from the admin wallet 960 to the wallet 910 of the new NFT holder 1101 may be recorded as transaction content 1017. In various implementations, an individual 1101 can have multiple NFTs 1002, for example, a first NFT 1002 for a first FI account, a second NFT 1002 for a second FI account, a third NFT 1002 for a third FI account, and so forth.

2. Example Hardware and Software Systems and Configurations

Referring back to FIGS. 1-11, the client devices 501, 910, 960, 1101 (hereinafter, the "client devices", "client systems," "user systems," "user devices," and/or the like) include physical hardware devices and software components capable of accessing content and/or services provided by the NFT/blockchain service 900. In order to access the content/services, the client devices include components such as processors, memory devices, communication interfaces, and the like. Additionally, the client devices may include, or be communicatively coupled with, one or more sensors (e.g., image capture device(s), microphones, and/or the like), which is/are used to capture biometric data. The client devices communicate with the NFT/blockchain service 900 to obtain content/services using any suitable access technology and/or communication protocols, such as any of those discussed herein. In this regard, a client device may establish a session with the NFT/blockchain service 502, 900 to exchange information/data with the NFT/blockchain service 502, 900. The session may be bound by use of a session secret (e.g., a password, digital certificate, etc.) that the subscriber's software (e.g., a browser, app, OS, or the like).

The client devices can be implemented as any suitable computing system or other data processing apparatus usable by users to access content/services provided by the NFT/blockchain service 502, 900. In the examples of FIGS. 1-11, the client devices are depicted as digital wallets or mobile cellular phones (e.g., a "smartphones"); however, the client devices can be embodied as any other type computer device/system, such as laptops, tablets, desktop computers, workstations, portable media players, wearable devices (e.g., smart watches and/or the like), video game consoles, digital media players, handheld messaging devices, personal data assistants, electronic book readers (or "e-readers"), extended reality (XR) devices (including augmented reality (AR), virtual reality (VR), and/or mixed reality (MR) devices), in-vehicle infotainment (IVI) systems, in-car entertainment (ICE) systems, instrument clusters (IC), head-up display (HUD) devices, on-board diagnostic (OBD) devices, dashtop mobile equipment (DME), Electronic Engine Management System (EEMS), electronic control unit (ECU), electronic control modules (ECM), embedded systems, microcontrollers, control modules engine management systems (EMS), networked or "smart" appliances, machine-to-machine (M2M) and/or Internet of Things (IoT) devices, autonomous sensors, servers (e.g., stand-alone, rack-mounted, blade, and/or the like), cloud compute nodes, edge compute nodes, network elements, network appliances, base stations, access points, and/or any other electronic devices.

In some examples, the NFT/blockchain service 502, 900 may represent a cloud computing service, an intranet, enterprise network, or some other like private network that is unavailable to the public. In one example implementation, the entirety of NFT/blockchain service 502, 900 including both the front end and the back end may be implemented in or by a cloud computing service (e.g., a "full stack" cloud implementation). The cloud computing service (or "cloud") includes networks of physical and/or virtual computer systems (e.g., one or more servers), data storage systems/devices, and/or the like within or associated with a data center or data warehouse that provide access to a pool of computing resources. The one or more servers in a cloud include user computer systems, where each of the servers includes one or more processors, one or more memory devices, input/output (I/O) interfaces, communications interfaces, and/or other like components. The servers may be connected with one another via a Local Area Network (LAN), fast LAN, message passing interface (MPI) implementations, and/or any other suitable networking technology. Various combinations of the servers may implement different cloud elements or nodes, such as cloud manager(s), cluster manager(s), master node(s), one or more secondary (slave) nodes, and the like. The one or more servers may implement additional or alternative nodes/elements in other implementations. In some cloud implementations, at least some of the servers in the cloud (e.g., servers that act as secondary nodes) may implement app server and/or web server functionality, which includes, inter alia, obtaining various messages from the client devices; processing data contained in those messages; routing data to other nodes in the cloud for further processing, storage, retrieval, etc.; generating and communicating messages including data items, content items, program code, renderable webpages and/or electronic documents (e.g., including the various GUIs discussed herein), and/or other information to/from client devices; and/or other like app server functions. In this way, various combinations of the servers may implement different cloud elements/nodes configured to perform the implementations discussed herein.

The NFT/blockchain service 502, 900 includes one or more servers 920, 930, and/or 950 and one or more DBs (e.g., NFT DB(s) 940 or the like). The web server(s) (e.g., servers 920) serve static content from a file system of the web server(s). The servers 920, 930, and/or 950 may be virtual or physical systems that provide NFT/blockchain services to individual users (e.g., using a client system(s) 910, 960) and/or for org 133, 533 platforms. In some implementations, some or all of the NFT/blockchain services may be provided by or accessed from third party systems/services, and the information provided by the third party systems/services may be enhanced or amended using information collected by the NFT/blockchain service 502, 900. The virtual and/or physical systems may include app servers, web servers, and/or other like computing systems/devices. The particular NFT/blockchain services provided by the servers 920, 930, and/or 950 may depend on the architecture or implementation of the NFT/blockchain service 502, 900, and may vary from embodiment to embodiment. In one example, one or more of the servers 920, 930, and/or 950 may operate as an app server and may provide respective NFT/blockchain services (e.g., KYC onboarding and data collection, KYC NFT minting, KYC ID minting, transaction monitoring and notifications, and so forth) as separate processes, or by implementing autonomous software agents. In another example, individual NFT server(s) 920, 930, and/or 950 may be dedicated to perform separate NFT/blockchain services, where app servers 920 are used to obtain requests from client devices and provide information/data to the NFT server(s) 930 and/or 950 to perform their respective NFT related services.

The app servers 920 comprise one or more physical and/or virtualized systems for providing content and/or functionality (e.g., services) to one or more clients (e.g., client system) over a network. The physical and/or virtualized systems include one or more logically or physically connected servers and/or data storage devices distributed locally or across one or more geographic locations. Generally, the web/app servers 920 are configured to use IP/network resources to provide web pages, forms, apps, data, services, and/or media content to client system. Additionally or alternatively, the web/app servers 920 may generate and serve dynamic content (e.g., server-side programming, database connections, dynamic generation of web documents) using an appropriate plug-in and/or server-side apps. The app server(s) 920 may implement an app platform, which is a framework that provides for the development and execution of server-side apps as part of an app hosting service. The app platform enables the creation, management, and execution of one or more server-side apps developed by or for the NFT/blockchain service 502, 900 and/or third party app developers, which allow users and/or third party app developers to access the NFT/blockchain service 502, 900 via respective client systems. The client devices may operate respective client apps (e.g., app 1251 in FIG. 12) to access the dynamic content, for example, by sending appropriate HTTP messages or the like, and in response, the server-side app(s) may dynamically generate and provide source code documents to the client app, and the source code documents are used for generating and rendering graphical objects (or simply "objects") within the client app. The server-side apps may be developed with any suitable server-side programming languages or technologies, such as PHP; Java™ based technologies such as Java Servlets, JavaServer Pages (JSP), JavaServer Faces (JSF), etc.; ASP.NET; Ruby or Ruby on Rails; and/or any other like technology that renders HyperText Markup Language (HTML), such as those discussed herein. The apps may be built using a platform-specific and/or proprietary development tool, and/or programming languages.

The servers 920, 930, and/or 950 serve one or more instructions or source code documents to client devices, which may then be executed within a client app (e.g., a wallet app as discussed previously and/or app 1251 in FIG. 12) to render one or more objects (e.g., GUIs). The GUIs can include graphical control elements (GCEs) that allow the client devices to perform various functions and/or to request or instruct the NFT/blockchain service 502, 900 to perform various functions. The servers 920, 930, and/or 950 may provide various interfaces such as those discussed herein. The interfaces and/or apps/GUIs/GCEs may be developed using website development tools and/or programming languages (e.g., HTML, Cascading Stylesheets (CSS), JavaScript, Jscript, Ruby, Python, etc.) and/or using platform-specific development tools (e.g., Android® Studio™ integrated development environment (IDE), Microsoft® Visual Studio® IDE, Apple® iOS® software development kit (SDK), Nvidia® Compute Unified Device Architecture (CUDA)® Toolkit, Flow® playground IDE, Remix IDE, ChainIDE, Azure Blockchain Workbench provided by Microsoft®, IntelliJ IDEA® provided by JetBrains, and/or any other suitable SDK/IDE, such as any of those discussed herein). The term "platform-specific" may refer to the platform implemented by the client systems and/or the platform implemented by the servers 920, 930, and/or 950. Example interfaces are shown and described with w.r.t FIGS. 1-11 and/or 13. In an example implementation, the servers 920, 930, and/or 950 may implement Apache HTTP Server ("httpd") web servers or NGINX™ webservers on top of the Linux® OS. In this example implementation, PHP and/or Python may be employed as server-side languages, MySQL may be used as the DQL/DBMS. In an example implementation, the mobile apps may be developed for Android®, iOS®, and/or some other mobile platform.

In some embodiments, the one or more servers 920, 930, 950 may implement or operate one or more intelligent agent(s) (also referred to as "artificial intelligence (AI) agent(s)," "AI/ML inference function(s)," "inference engine(s)," "AI/ML entities", and/or the like) to perform the KYC/AML services and/or the NFT/blockchain services 502 discussed previously, or portions thereof. The intelligent agent(s) may operate one or more AI/ML models to generate inferences based on data collected from client systems, servers 920, 930, 950, NFT/blockchain service 502, 900, and/or other sources. The AI/ML models can include any suitable architecture, network, topology, configuration, and/or arrangement, including any of those mentioned herein and/or mentioned in '081. The intelligent agent(s) is/are implemented as autonomous software agents, implemented using hardware elements, or a combination thereof, which are executed or otherwise operated by one or more processors (e.g., processor(s) 1201, accelerator(s) 1210, and/or the like) of one or more servers 920, 930, 950.

Furthermore, one or more servers 920, 930, 950 may digitally sign, encrypt/decrypt data, and/or hash data using a cryptographic mechanism. Examples of cryptographic mechanisms include cryptographic hash algorithms (e.g., a function in the Secure Hash Algorithm (SHA) 2 set of cryptographic hash algorithms (e.g., SHA-226, SHA-256, SHA-512, and the like), SHA 3, and so forth, or any type of keyed or unkeyed cryptographic hash function, and/or any other function discussed herein); an elliptic curve cryptographic (ECC) algorithm (e.g., Elliptic Curve cryptography Key Agreement algorithm (ECKA) algorithm, Elliptic Curve cryptography Digital Signature Algorithm (ECDSA), Lenstra elliptic-curve factorization or elliptic-curve factorization method (ECM), Menezes-Qu-Vanstone (MQV) or elliptic curve MQV (ECMQV), Elliptic Curve Diffie-Hellman (ECDH) key agreement, Elliptic Curve Integrated Encryption Scheme (ECIES) or Elliptic Curve Augmented Encryption Scheme, Edwards-curve Digital Signature Algorithm (EdDSA), and/or the like); Rivest-Shamir-Adleman (RSA) cryptography; Merkle signature scheme, advanced encryption system (AES) algorithm; a triple data encryption algorithm (3DES); Quantum cryptography algorithms; and/or the like.

The NFT DB 940 may be stored in one or more data storage devices or storage systems that act as a repository for persistently storing and managing collections of data according to one or more predefined DB structures. The data storage devices/systems may include one or more primary storage devices, secondary storage devices, tertiary storage devices, non-linear storage devices, and/or other like data storage devices. In some implementations, at least some of the servers 920, 930, and/or 950 may implement a suitable database management system (DBMS) to execute storage and retrieval of information against various database object (s) in the NFT DB 940. These servers 920, 930, and/or 950 may be storage servers, file servers, or other like computing systems. The DBMS may include a relational database management system (RDBMS), an object database management system (ODBMS), a non-relational DBMS (e.g., a NoSQL DB system), and/or some other DBMS used to create and maintain the NFT DB 940. The NFT DB 940 can be implemented as part of a single database, a distributed database, a collection of distributed databases, a database with redundant online or offline backups or other redundancies, etc., and can include a distributed database or storage network. These servers 920, 930, and/or 950 may implement one or more query engines that utilize one or more data query languages (DQLs) to store and retrieve information in/from the NFT DB 940, such as Structured Query Language (SQL), Structured Object Query Language (SOQL), Procedural Language/SOQL (PL/SOQL), GraphQL, Hyper Text SQL (HTSQL), Query By Example (QBE), object query language (OQL), object constraint language (OCL), non-first normal form query language (NIQL), XQuery, and/or any other DQL or combinations thereof. The query engine(s) may include any suitable query engine technology or combinations thereof including, for example, direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) may include or implement an in-memory caching system and/or an in-memory caching engine (e.g., memcached, Redis, and/or the like) to store frequently accessed data items in a main memory of the servers 920, 930, 950 for later retrieval without additional access to the persistent data store. Suitable implementations for the database systems and storage devices are known or commercially available, and are readily implemented by persons having ordinary skill in the art.

The NFT DB 940 stores or otherwise includes a plurality of database objects (DBOs). The DBOs may be arranged in a set of logical tables containing data fitted into predefined or customizable categories, and/or the DBOs may be arranged in a set of blockchains or ledgers wherein each block (or DBO) in the blockchain is linked to a previous block. Each of the DBOs may include data associated with users/client devices, such as user/client IDs, UIDs, NFT IDs, KYC NFTs, and/or, in certain embodiments, other data such as biographic data; biometric data; data collected from various external sources; identity session identifiers (IDs); and/or other like data. Additionally or alternatively, the NFT DB 940 may store. Some of the DBOs may store information pertaining to relationships between any of the data items discussed herein. Some of the DBOs may store permission or access-related information for each user. These DBOs may indicate specific third parties that are permitted to access identity data of a particular user. In some implementations, the permission or access-related DBOs for each user may be arranged or stored as a blockchain to control which third parties can access that user's identity data. In these embodiments, the blockchain(s) do not actually store user biometric and/or biographic data, but instead are used to authorize specific third party platforms to access specific identity data items and to track or account for the accesses to the identity data items.

Figure 12:
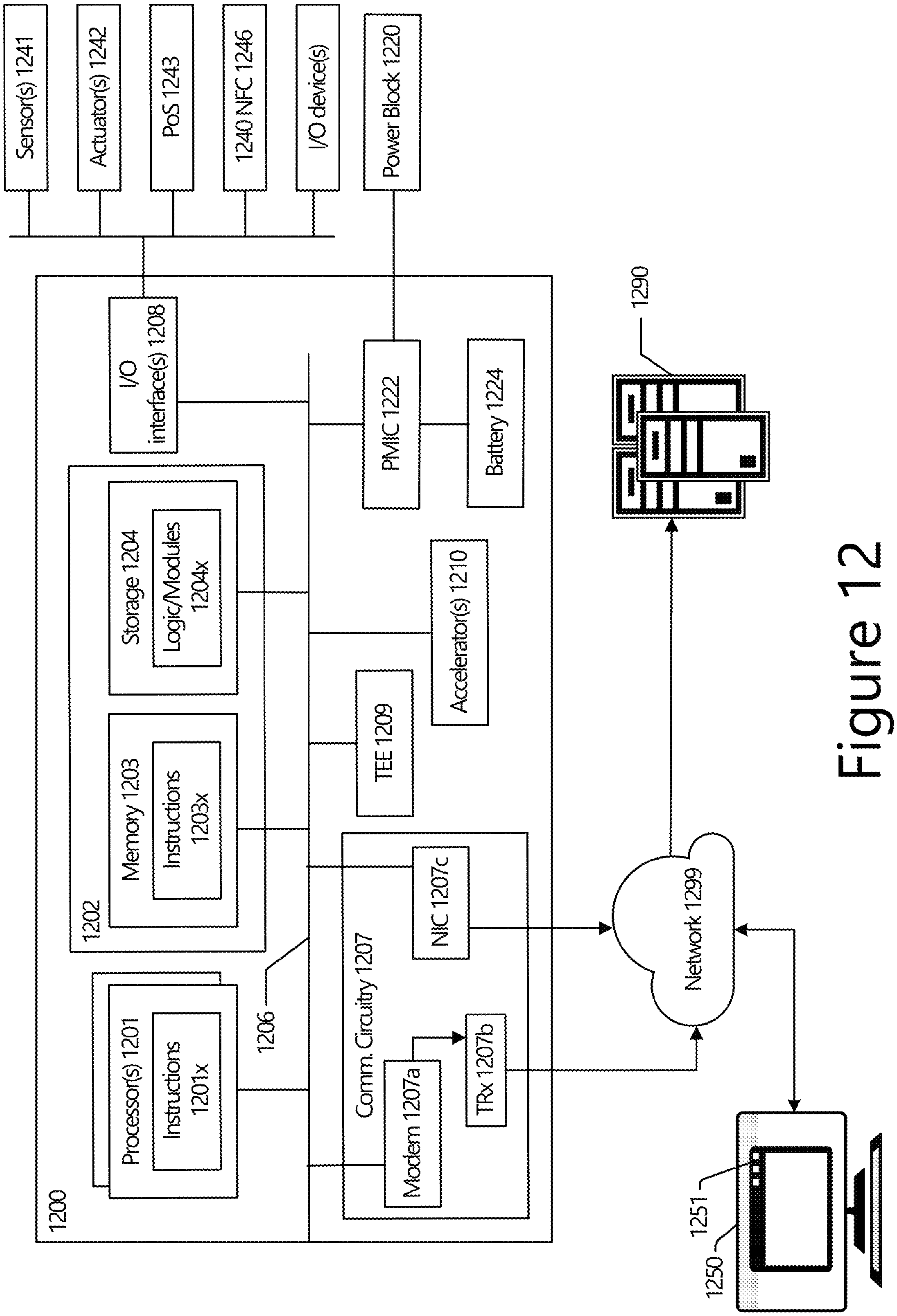
FIG. 12 illustrates an example computing system suitable for practicing various aspects of the present disclosure.

As alluded to previously, the client device(s) is/are configured to run, execute, or otherwise operate the client app (e.g., app 1251 in FIG. 12). The client app is a software app designed to generate and render objects, which include various types of content. At least some of the objects include GUIs and/or GCEs that enable interactions with the NFT/blockchain service 502, 900. In some embodiments, the client app is an app container/skeleton in which an NFT app operates (e.g., a wallet app, payment app, web browser, and the like). For example, the objects may represent a web app that runs inside the client app, and the client app may be an HTTP client, such as a "web browser" (or simply a "browser") for sending and receiving HTTP messages to and from a web/app servers 920 of the NFT/blockchain service 502, 900. In some examples, a suitable browser extension or plug-in may be configured to allow the client app to render objects that allow the user to interact with the NFT/blockchain service 502, 900 for generating KYC NFTs 1002 according to the embodiments discussed herein. Such browsers can include a suitable browser engine such as, for example, a trident engine (e.g., Microsoft® Internet Explorer®, Tencent® Traveler®, and/or the like), a gecko engine (e.g., Mozilla® Firefox®, Tor Browser, and/or the like), a WebKit engine (e.g., Apple® Safari®, the Nintendo® NetFront Browser NX®, Google® Chrome® for iOS, and/or the like), blink engine (e.g., Google Chrome®, Opera®, Microsoft® Edge®, and/or the like), Presto-based (e.g., Nintendo® DS® browser, and/or the like), and/or proprietary browser engines (e.g., Ekioh® Flow®, the play station 5 (PS5) secret web browser, and/or the like). In some examples, one or more client app(s) are native app(s) (e.g., executed and rendered in a container), web apps) (e.g., executed and rendered inside a browser), or hybrid apps (e.g., web apps executed/rendered in a native/platform container or skeleton), or variants thereof. In these examples, an owner/operator of NFT/blockchain service 502, 900 may have pre-built a client app(s) (e.g., wallet device and/or app) for use by users of compute devices 501 to access their specific apps and/or services. In some embodiments, the client app is an app specifically developed or tailored to interact with the NFT/blockchain service 502, 900 NFT/blockchain service 502, 900. For example, the client app may be a desktop or native (mobile) app that runs directly on the client system(s) without a browser, and which communicates (sends and receives) suitable messages with the NFT/blockchain service 502, 900. In some embodiments, the client app is an app specifically developed or tailored to interact with the NFT/blockchain service 502, 900 for generating NFTs 1002 (e.g., NFT IDs, KYC NFTs, and/or the like).

The client app (e.g., app 1251 in FIG. 12) may be developed using any suitable programming languages and/or development tools, such as those discussed herein or others known in the art. The client app may be platform-specific, such as when the client system(s) is/are implemented as a mobile device, such as a smartphone, tablet computer, or the like. In these embodiments, the client app may be a mobile web browser, a native app (or "mobile app") specifically tailored to operate on the mobile client system(s), or a hybrid app wherein objects (or a web app) is embedded inside the native app. In some implementations, the client app and/or the web apps that run inside the client app is/are specifically designed to interact with server-side apps implemented by the app platform of the provider system (discussed infra). In some implementations, the client app, and/or the web apps that run inside the client app may be platform-specific or developed to operate on a particular type of client system(s) or a particular (hardware and/or software) client system(s) configuration. The term "platform-specific" may refer to the platform implemented by the client system(s), the platform implemented by the NFT/blockchain service 502, 900, and/or a platform of a third party system/platform.

In the aforementioned embodiments, the client system(s) implementing a client app is capable of controlling its communications/network interface(s) to send and receive HTTP messages to/from the NFT/blockchain service 502, 900, render the objects in the client app, request connections with other devices, and/or perform (or request performance) of other like functions. The header of these HTTP messages includes various operating parameters and the body of the HTTP messages include program code or source code documents (e.g., HTML, XML, JSON, and/or some other like object(s)/document(s)) to be executed and rendered in the client app. The client app executes the program code or source code documents and renders the objects (or web apps) inside the client app.

The rendered objects (or executed web app) allow the user of the client system(s) to view content provided by the NFT/blockchain service 502, 900, which may include the results of a requested service, visual representations of data, hyperlinks or links to other resources, KYC NFTs (see e.g., 605*a* in FIG. 6), and/or the like. The rendered objects also include interfaces for interacting with the NFT/blockchain service 502, 900, for example, to request additional content or services from the NFT/blockchain service 502, 900. In an example, the rendered objects may include GUIs, which are used to manage the interactions between the user of the client system(s) and the NFT/blockchain service 502, 900. The GUIs comprise one or more GCEs (or widgets) such as buttons, sliders, text boxes, tabs, dashboards, etc. The user of the client system(s) may select or otherwise interact with one or more of the GCEs (e.g., by pointing and clicking using a mouse, or performing a gesture for touchscreen-based systems) to request content or services from the NFT/blockchain service 502, 900.

In some cases, the user of client system(s) may be required to authenticate their identity in order to obtain content and/or services from the NFT/blockchain service 502, 900. To provide the NFT/blockchain services to the user, the client app may be, or may include, a secure portal to the NFT/blockchain service 502, 900 (e.g., a front-end portal and/or the like). The secure portal may be a standalone app, embedded within a web or mobile app (wallet app) provided by NFT/blockchain service 502, 900, and/or invoked or called by the web/mobile app provided by NFT/blockchain service 502, 900 (e.g., using an API, Remote Procedure Call (RPC), IPCs, and/or the like). In these cases, graphical objects rendered and displayed within the client app may be a GUI and/or GCEs of the secure portal, which allows the user to share data (e.g., KYC data 110 and/or user data 510) with the NFT/blockchain service

502, 900. The secure portal also allows users to access and/or perform various NFT-related tasks. For example, the secure portal may provide access to a dashboard GUI that allows admins 960 to submit KYC data 110, user data 510, queries for individuals or entities, set AML policies/rules, and/or setup or subscribe to notifications for automatically receiving alerts for suspicious activities for individuals or entities.

Additionally or alternatively, the client app may collect various data from the client device(s) without direct user interaction with the client app. For example, the client app may cause the client system(s) to generate and transmit one or more HTTP messages with a header portion including, inter alia, an IP address of the client system(s) in an X-Forwarded-For (XFF) field, a time and date that the message was sent in a Date field, and/or a user agent string contained in a User Agent field. The user agent string may indicate an operating system (OS) type/version being operated by the client system(s), system information of the client system(s), an app version/type or browser version/type of the client app, a rendering engine version/type implemented by the client app, a device and/or platform type of the client system(s), and/or other like information. These HTTP messages may be sent in response to user interactions with the client app (e.g., when a user submits biographic or biometric data as discussed infra), or the client app may include one or more scripts, which when executed by the client system(s), cause the client system(s) to generate and send the HTTP messages upon loading or rendering the client app. Other message types may be used and/or the user and/or client system(s) information may be obtained by other means in other embodiments.

In addition to (or alternative to) obtaining information from HTTP messages as discussed previously, the servers 920, 930, 950 may determine or derive other types of user information associated with the client system(s). For example, the servers 920, 930, 950 may derive a time zone and/or geolocation in which the client system(s) is/are located from an obtained IP address. In some embodiments, the user and/or client system(s) information may be sent to the servers 920, 930, 950 when the client system(s) loads or renders the client app. For example, the login page may include JavaScript or other like code that obtains and sends back information (e.g., in an additional HTTP message) that is not typically included in an HTTP header, such as time zone information, global navigation satellite system (GNSS) and/or Global Positioning System (GPS) coordinates, screen or display resolution of the client system(s), and/or other like information. Other methods may be used to obtain or derive such information in other embodiments.

FIG. 12 illustrates an example compute node 1200 (also referred to as "platform 1200," "device 1200," "appliance 1200," "system 1200", and/or the like), and various components therein, for implementing the techniques (e.g., operations, processes, methods, and methodologies) described herein. In FIG. 12, like numbered items are the same as discussed previously w.r.t FIGS. 1-11. The compute node 1200 provides a closer view of the respective components of node 1200 when implemented as or as part of a computing device or system. The compute node 1200 can include any combination of the hardware and/or logical components referenced herein, and may include or couple with any device usable with a communication network or a combination of such networks. Any combination of components depicted by FIG. 12 can be implemented as individual ICs, discrete electronic devices, or other modules, instruction sets, programmable logic or algorithms, hardware, software, firmware, or a combination thereof adapted in the compute node 1200, or as components otherwise incorporated within a chassis of a larger system. Additionally or alternatively, any combination of the components depicted by FIG. 12 can be implemented as a system-on-chip (SoC), a single-board computer (SBC), a system-in-package (SiP), a multi-chip package (MCP), and/or the like, in which a combination of the hardware elements are formed into a single IC or a single package.

The compute node 1200 includes physical hardware devices and software components capable of providing and/or accessing content and/or services to/from the remote system 1290. The compute node 1200 and/or the remote system 1290 can be implemented as any suitable computing system or other data processing apparatus usable to access and/or provide content/services from/to one another. The compute node 1200 communicates with remote systems 1290, and vice versa, to obtain/serve content/services using any suitable communication protocol, such as any of those discussed herein. In some implementations, the remote system 1290 may have some or all of the same or similar components as the compute node 1200. As examples, the compute node 1200 and/or the remote system 1290 can be embodied as desktop computers, workstations, laptops, mobile phones (e.g., "smartphones"), tablet computers, portable media players, wearable devices, head-up display device (HUD) devices, extended reality (XR) devices (e.g., including virtual reality (VR), augmented reality (AR), and/or mixed reality or mediated reality (MR) technologies), in-vehicle compute systems, smart appliances, smart factory machinery, network infrastructure elements, network appliances, network access nodes (NANs), robots, drones, sensor systems and/or IoT devices, server(s), cloud compute nodes, edge compute nodes, an aggregation of computing resources (e.g., in a cloud-based environment), and/or some other computing devices capable of interfacing directly or indirectly with network 1299 or other network(s). For purposes of the present disclosure, the compute node 1200 may represent any of the computing devices discussed herein, and may be, or be implemented in one or more of NFT/blockchain service 502, 900, client systems 501, 910, 960, 1250, servers 920, 930, 950, 1290, and/or any other devices or systems, such as any of those discussed herein.

The system 1200 includes physical hardware devices and software components capable of providing and/or accessing content and/or services to/from the remote system 1255. The system 1200 and/or the remote system 1255 can be implemented as any suitable computing system or other data processing apparatus usable to access and/or provide content/services from/to one another. As examples, the system 1200 and/or the remote system 1255 may comprise desktop computers, a work stations, laptop computers, mobile cellular phones (e.g., "smartphones"), tablet computers, portable media players, wearable computing devices, server computer systems, an aggregation of computing resources (e.g., in a cloud-based environment), or some other computing devices capable of interfacing directly or indirectly with network 1299 or other network. The system 1200 communicates with remote systems 1255, and vice versa, to obtain/serve content/services using any suitable communication protocol, such as any of those discussed herein.

The compute node 1200 includes one or more processors 1201 (also referred to as "processor circuitry 1201"). The processor circuitry 1201 includes circuitry capable of sequentially and/or automatically carrying out a sequence of arithmetic or logical operations, and recording, storing, and/or transferring digital data. Additionally or alternatively, the processor circuitry 1201 includes any device capable of executing or otherwise operating computer-executable instructions, such as program code, software modules, and/or functional processes. The processor circuitry 1201 includes various hardware elements or components such as, for example, a set of processor cores and one or more of on-chip or on-die memory or registers, cache and/or scratchpad memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. Some of these components, such as the on-chip or on-die memory or registers, cache and/or scratchpad memory, may be implemented using the same or similar devices as the memory circuitry 1203 discussed infra. The processor circuitry 1201 is also coupled with memory circuitry 1203 and storage circuitry 1204, and is configured to execute instructions stored in the memory/storage to enable various apps, OSs, or other software elements to run on the platform 1200. In particular, the processor circuitry 1201 is configured to operate app software (e.g., instructions 1201*x*, 1203*x*, 1204*x*) to provide one or more services to a user of the compute node 1200 and/or user(s) of remote systems/devices.

The processor circuitry 1201 can be embodied as, or otherwise include one or multiple central processing units (CPUs), application processors, graphics processing units (GPUs), RISC processors, Acorn RISC Machine (ARM) processors, complex instruction set computer (CISC) processors, DSPs, FPGAs, programmable logic devices (PLDs), ASICs, baseband processors, radio-frequency integrated circuits (RFICs), microprocessors or controllers, multi-core processors, multithreaded processors, ultra-low voltage processors, embedded processors, a specialized x-processing units (xPUs) or a data processing unit (DPUs) (e.g., Infrastructure Processing Unit (IPU), network processing unit (NPU), and the like), and/or any other processing devices or elements, or any combination thereof. In some implementations, the processor circuitry 1201 is embodied as one or more special-purpose processor(s)/controller(s) configured (or configurable) to operate according to the various implementations and other aspects discussed herein. Additionally or alternatively, the processor circuitry 1201 includes one or more hardware accelerators (e.g., same or similar to acceleration circuitry 1208), which can include microprocessors, programmable processing devices (e.g., FPGAs, ASICs, PLDs, DSPs. and/or the like), and/or the like. As examples, the processor circuitry 1202 may include Intel® Core™ based processor(s), MCU-class processor(s), Xeon® processor(s); Advanced Micro Devices (AMD) Zen® Core Architecture processor(s), such as Ryzen® or Epyc® processor(s), Accelerated Processing Units (APUs), MxGPUs, or the like; A, S, W, and T series processor(s) from Apple® Inc., Snapdragon™ or Centriq™ processor(s) from Qualcomm® Technologies, Inc., Texas Instruments, Inc.® Open Multimedia Applications Platform (OMAP)™ processor(s); Power Architecture processor(s) provided by the OpenPOWER® Foundation and/or IBM®, MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; the ThunderX2® provided by Cavium™, Inc.; GeForce®, Tegra®, Titan X®, Tesla®, Shield®, and/or other like GPUs provided by Nvidia®; or the like. Other examples of the processor circuitry 1202 may be mentioned elsewhere in the present disclosure.

The compute node 1200 also includes non-transitory or transitory machine readable media 1202 (also referred to as "computer readable medium 1202" or "CRM 1202"), which may be embodied as, or otherwise include system memory 1203, storage 1204, and/or memory devices/elements of the processor 1201. Additionally or alternatively, the CRM 1202 can be embodied as any of the devices/technologies described for the memory 1203 and/or storage 1204.

The system memory 1203 (also referred to as "memory circuitry 1203") includes one or more hardware elements/devices for storing data and/or instructions 1203*x* (and/or instructions 1201*x*, 1204*x*). Any number of memory devices may be used to provide for a given amount of system memory 1203. As examples, the memory 1203 can be embodied as processor cache or scratchpad memory, volatile memory, non-volatile memory (NVM), and/or any other machine readable media for storing data. Examples of volatile memory include random access memory (RAM), static RAM (SRAM), dynamic RAM (DRAM), synchronous DRAM (SDRAM), thyristor RAM (T-RAM), content-addressable memory (CAM), and/or the like. Examples of NVM can include read-only memory (ROM) (e.g., including programmable ROM (PROM), erasable PROM (EPROM), electrically EPROM (EEPROM), flash memory (e.g., NAND flash memory, NOR flash memory, and the like), solid-state storage (SSS) or solid-state ROM, programmable metallization cell (PMC), and/or the like), non-volatile RAM (NVRAM), phase change memory (PCM) or phase change RAM (PRAM) (e.g., Intel® 3D XPoint™ memory, chalcogenide RAM (CRAM), Interfacial Phase-Change Memory (IPCM), and the like), memristor devices, resistive memory or resistive RAM (ReRAM) (e.g., memristor devices, metal oxide-based ReRAM, quantum dot resistive memory devices, and the like), conductive bridging RAM (or PMC), magnetoresistive RAM (MRAM), electrochemical RAM (ECRAM), ferroelectric RAM (FeRAM), anti-ferroelectric RAM (AFeRAM), ferroelectric field-effect transistor (FeFET) memory, and/or the like. Additionally or alternatively, the memory circuitry 1203 can include spintronic memory devices (e.g., domain wall memory (DWM), spin transfer torque (STT) memory (e.g., STT-RAM or STT-MRAM), magnetic tunneling junction memory devices, spin-orbit transfer memory devices, Spin-Hall memory devices, nanowire memory cells, and/or the like). In some implementations, the individual memory devices 1203 may be formed into any number of different package types, such as single die package (SDP), dual die package (DDP), quad die package (Q17P), memory modules (e.g., dual inline memory modules (DIMMs), microDIMMs, and/or MiniDIMMs), and/or the like. Additionally or alternatively, the memory circuitry 1203 is or includes block addressable memory device(s), such as those based on NAND or NOR flash memory technologies (e.g., single-level cell ("SLC"), multi-level cell ("MLC"), quad-level cell ("QLC"), tri-level cell ("TLC"), or some other NAND or NOR device). Additionally or alternatively, the memory circuitry 1203 can include resistor-based and/or transistor-less memory architectures. In some examples, the memory circuitry 1203 can refer to a die, chip, and/or a packaged memory product. In some implementations, the memory 1203 can be or include the on-die memory or registers associated with the processor circuitry 1201. Additionally or alternatively, the memory 1203 can include any of the devices/components discussed infra w.r.t the storage circuitry 1204.

The storage 1204 (also referred to as "storage circuitry 1204") provides persistent storage of information, such as data, OSs, apps, instructions 1204x, and/or other software elements. As examples, the storage 1204 may be embodied as a magnetic disk storage device, hard disk drive (HDD), microHDD, solid-state drive (SSD), optical storage device, flash memory devices, memory card (e.g., secure digital (SD) card, eXtreme Digital (XD) picture card, USB flash drives, SIM cards, and/or the like), and/or any combination thereof. The storage circuitry 1204 can also include specific storage units, such as storage devices and/or storage disks that include optical disks (e.g., DVDs, CDs/CD-ROM, Blu-ray disks, and the like), flash drives, floppy disks, hard drives, and/or any number of other hardware devices in which information is stored for any duration (e.g., for extended time periods, permanently, for brief instances, for temporarily buffering, and/or caching). Additionally or alternatively, the storage circuitry 1204 can include resistor-based and/or transistor-less memory architectures. Further, any number of technologies may be used for the storage 1204 in addition to, or instead of, the previously described technologies, such as, for example, resistance change memories, phase change memories, holographic memories, chemical memories, among many others. Additionally or alternatively, the storage circuitry 1204 can include any of the devices or components discussed previously w.r.t the memory 1203.

Instructions 1201x, 1203x, 1204x in the form of computer programs, computational logic/modules (e.g., including the various modules/logic discussed herein), source code, middleware, firmware, object code, machine code, microcode (ucode), or hardware commands/instructions, when executed, implement or otherwise carry out various functions, processes, methods, algorithms, operations, tasks, actions, techniques, and/or other aspects of the present disclosure. The instructions 1201x, 1203x, 1204x may be written in any combination of one or more programming languages, including object oriented programming languages, procedural programming languages, scripting languages, markup languages, machine language, and/or some other suitable programming languages including proprietary programming languages and/or development tools, or any other suitable technologies. The instructions 1201x, 1203x, 1204x may execute entirely on the system 1200, partly on the system 1200, as a stand-alone software package, partly on the system 1200 and partly on a remote system 1290, or entirely on the remote system 1290. In the latter scenario, the remote system 1290 may be connected to the system 1200 through any type of network 1299. Although the instructions 1201x, 1203x, 1204x are shown as code blocks included in the processor 1201, memory 1204, and/or storage 1220, any of the code blocks may be replaced with hardwired circuits, for example, built into memory blocks/cells of an ASIC, FPGA, and/or some other suitable IC.

In some examples, the storage circuitry 1204 stores computational logic/modules configured to implement the techniques described herein. The computational logic 1204x may be employed to store working copies and/or permanent copies of programming instructions, or data to create the programming instructions, for the operation of various components of compute node 1200, an OS of compute node 1200, one or more applications, and/or the like. The computational logic 1204x may be stored or loaded into memory circuitry 1203 as instructions 1203x, or data to create the instructions 1203x, which are then accessed for execution by the processor circuitry 1201 via the IX 1206 to carry out the various functions, processes, methods, algorithms, operations, tasks, actions, techniques, and/or other aspects described herein (see e.g., FIGS. 1-11 and 13). The various elements may be implemented by assembler instructions supported by processor circuitry 1201 or high-level languages that may be compiled into instructions 1201x, or data to create the instructions 1201x, to be executed by the processor circuitry 1201. The permanent copy of the programming instructions may be placed into persistent storage circuitry 1204 at the factory/OEM or in the field through, for example, a distribution medium (e.g., a wired connection and/or over-the-air (OTA) interface) and a communication interface (e.g., communication circuitry 1207) from a distribution server (e.g., remote system 1290) and/or the like.

Additionally or alternatively, the instructions 1201x, 1203x, 1204x can include one or more operating systems (OS) and/or other software to control various aspects of the compute node 1200. The OS can include drivers, libraries, APIs, firmware, middleware, and/or other interface or connection mechanisms to control particular devices or components that are embedded in the compute node 1200, attached to the compute node 1200, communicatively coupled with the compute node 1200, and/or otherwise accessible by the compute node 1200. The OSs also include one or more libraries, drivers, APIs, inter-process communications (IPC), facilities, firmware, middleware, software glue, software connector(s), and/or other interface or connection mechanisms, which provide program code and/or software components for one or more apps to obtain and use the data from other apps operated by the compute node 1200, such as the various subsystems of the NFT/blockchain service 502, 900 and/or any other device or system discussed herein. For example, the OS can include a display driver to control and allow access to a display device, a touchscreen driver to control and allow access to a touchscreen interface of the system 1200, sensor drivers to obtain sensor readings of sensor circuitry 1221 and control and allow access to sensor circuitry 1221, actuator drivers to obtain actuator positions of the actuators 1222 and/or control and allow access to the actuators 1222, a camera driver to control and allow access to an embedded image capture device, audio drivers to control and allow access to one or more audio devices. The OS can be a general purpose OS or an OS specifically written for and tailored to the computing platform 1200. Example OSs include consumer-based OS (e.g., Microsoft® Windows® 10, Google® Android®, Apple® macOS®, Apple® IOS®, KaiOS™ provided by KaiOS Technologies Inc., Unix or a Unix-like OS such as Linux, Ubuntu, or the like), industry-focused OSs such as real-time OS (RTOS) (e.g., Apache® Mynewt, Windows® IoTR, Android Things®, Micrium® Micro-Controller OSs ("MicroC/OS" or "uC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. For purposes of the present disclosure, can also include hypervisors, container orchestrators and/or container engines. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 1200 may be the same or different than a second OS on a second compute node 1200 (here, the first and second compute nodes 1200 can be physical machines or VMs operating on the same or different physical compute nodes). In these examples, the first OS may be an RTOS having particular performance expectations of responsivity to dynamic input conditions, and the second OS can include GUI capabilities to facilitate end-user I/O and the like.

The various components of the computing node 1200 communicate with one another over an interconnect (IX) 1206. The IX 1206 may include any number of IX (or similar) technologies including, for example, instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced extensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 1206 may be a proprietary bus, for example, used in a SoC based system.

In some implementations (e.g., where the system 1200 is a server computer system), the compute node 1200 includes one or more hardware accelerators 1210 (also referred to as "acceleration circuitry 1210", "accelerator circuitry 1210", or the like). The acceleration circuitry 1210 can include various hardware elements such as, for example, one or more GPUs, FPGAS, DSPs, SoCs (including programmable SoCs and multi-processor SoCs), ASICs (including programmable ASICs), PLDs (including complex PLDs (CPLDs) and high capacity PLDs (HCPLDs), xPUs (e.g., DPUs, IPUs, and NPUs) and/or other forms of specialized circuitry designed to accomplish specialized tasks. Additionally or alternatively, the acceleration circuitry 1210 may be embodied as, or include, one or more of AI/ML accelerators (e.g., vision processing unit (VPU), neural compute sticks, neuromorphic hardware, deep learning processors (DLPs) or deep learning accelerators, tensor processing units (TPUs), physical neural network hardware, and/or the like), cryptographic accelerators (or secure cryptoprocessors), network processors, I/O accelerator (e.g., DMA engines and the like), and/or any other specialized hardware device/component. The offloaded tasks performed by the acceleration circuitry 1210 can include, for example, AI/ML tasks (e.g., training, feature extraction, model execution for inference/prediction, classification, and so forth), visual data processing, graphics processing, digital and/or analog signal processing, network data processing, infrastructure function management, object detection, rule analysis, and/or the like. As examples, the processor(s) 1201 and/or accelerators 1208 may be a cluster of GPUs, tensor processing units (TPUs) developed by Google® Inc., Real AI Processors (RAPS™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the processor circuitry 1202 and/or hardware accelerator circuitry may be implemented as AI accelerating co-processor(s), such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit (NPU) within the HiSilicon Kirin 970 provided by Huawei®, and/or the like.

The acceleration circuitry 1210 includes any suitable hardware device or collection of hardware elements that are designed to perform one or more specific functions more efficiently in comparison to general-purpose processing elements (e.g., those provided as part of the processor circuitry 1201). For example, the acceleration circuitry 1210 can include special-purpose processing device tailored to perform one or more specific tasks or workloads of the subsystems of the NFT/blockchain service 502, 900. In some examples, the specific tasks or workloads may be offloaded from one or more processors of the processor circuitry 1202. In some implementations, the processor circuitry 1201 and/or acceleration circuitry 1210 includes hardware elements specifically tailored for executing, operating, or otherwise providing AI and/or ML functionality, such as for operating various subsystems of the NFT/blockchain service 502, 900 and/or any other device or system discussed previously with regard to FIGS. 1-11 and/or 13. In these implementations, the circuitry 1201 and/or 1208 is/are embodied as, or otherwise includes, one or more AI or ML chips that can run many different kinds of AI/ML instruction sets once loaded with the appropriate weightings, training data, AI/ML models, and/or the like. Additionally or alternatively, the processor circuitry 1201 and/or accelerator circuitry 1210 is/are embodied as, or otherwise includes, one or more custom-designed silicon cores specifically designed to operate corresponding subsystems of the NFT/blockchain service 502, 900 and/or any other device or system discussed herein. These cores may be designed as synthesizable cores comprising hardware description language logic (e.g., register transfer logic, verilog, Very High Speed Integrated Circuit hardware description language (VHDL), and the like); netlist cores comprising gate-level description of electronic components and connections and/or process-specific very-large-scale integration (VLSI) layout; and/or analog or digital logic in transistor-layout format. In these implementations, one or more of the subsystems of the NFT/blockchain service 502, 900 and/or any other device or system discussed herein may be operated, at least in part, on custom-designed silicon core(s). These "hardware-ized" subsystems may be integrated into a larger chipset but may be more efficient than using general purpose processor cores.

The TEE 1209 operates as a protected area accessible to the processor circuitry 1201 and/or other components to enable secure access to data and secure execution of instructions. The TEE 1209 operates as a protected area accessible to the processor circuitry 1202 to enable secure access to data and secure execution of instructions. In some implementations, the TEE 1209 is embodied as one or more physical hardware devices that is/are separate from other components of the system 1200, such as a secure-embedded controller, a dedicated SoC, a trusted platform module (TPM), a tamper-resistant chipset or microcontroller with embedded processing devices and memory devices, and/or the like. Examples of such implementations include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1209 is embodied as secure enclaves (or "enclaves"), which is/are isolated regions of code and/or data within the processor and/or memory/storage circuitry of the compute node 1200, where only code executed within a secure enclave may access data within the same secure enclave, and the secure enclave may only be accessible using the secure app (which may be implemented by an app processor or a tamper-resistant microcontroller). In some implementations, the memory circuitry 1203 and/or storage circuitry 1204 may be divided into one or more trusted memory regions for storing apps or software modules of the secure enclave(s) 1209. Example implementations of the TEE 1209, and an accompanying secure area in the processor circuitry 1201 or the memory circuitry 1203 and/or storage circuitry 1204, include Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1200 through the TEE 1209 and the processor circuitry 1202.

Additionally or alternatively, the TEE 1209 and/or processor circuitry 1201, acceleration circuitry 1210, memory circuitry 1203, and/or storage circuitry 1204 may be divided into, or otherwise separated into isolated user-space instances and/or virtualized environments using a suitable virtualization technology, such as, for example, virtual machines (VMs), virtualization containers (e.g., Docker® containers, Kubernetes® containers, Solaris® containers and/or zones, OpenVZ® virtual private servers, DragonFly BSD® virtual kernels and/or jails, chroot jails, and/or the like), and/or other virtualization technologies. These virtualization technologies may be managed and/or controlled by a virtual machine monitor (VMM), hypervisor container engines, orchestrators, and the like. Such virtualization technologies provide execution environments/TEEs in which one or more apps and/or other software, code, or scripts may execute while being isolated from one or more other apps, software, code, or scripts.

The communication circuitry 1207 is a hardware element, or collection of hardware elements, used to communicate over one or more networks (e.g., network 1299) and/or with other devices. The communication circuitry 1207 includes modem 1207a and transceiver circuitry ("TRx") 1207b. The modem 1207a includes one or more processing devices (e.g., baseband processors) to carry out various protocol and radio control functions. Modem 1207a may interface with application circuitry of compute node 1200 (e.g., a combination of processor circuitry 1201, memory circuitry 1203, and/or storage circuitry 1204) for generation and processing of baseband signals and for controlling operations of the TRx 1207b. The modem 1207a handles various radio control functions that enable communication with one or more radio networks via the TRx 1207b according to one or more wireless communication protocols. The modem 1207a may include circuitry such as, but not limited to, one or more single-core or multi-core processors (e.g., one or more baseband processors) or control logic to process baseband signals received from a receive signal path of the TRx 1207b, and to generate baseband signals to be provided to the TRx 1207b via a transmit signal path. In various implementations, the modem 1207a may implement a real-time OS (RTOS) to manage resources of the modem 1207a, schedule tasks, and the like.

The communication circuitry 1207 also includes TRx 1207b to enable communication with wireless networks using modulated electromagnetic radiation through a non-solid medium. The TRx 1207b may include one or more radios that are compatible with, and/or may operate according to any one or more of the radio communication technologies, radio access technologies (RATs), and/or communication protocols/standards including any combination of those discussed herein. TRx 1207b includes a receive signal path, which comprises circuitry to convert analog RF signals (e.g., an existing or received modulated waveform) into digital baseband signals to be provided to the modem 1207a. The TRx 1207b also includes a transmit signal path, which comprises circuitry configured to convert digital baseband signals provided by the modem 1207a to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the TRx 1207b using metal transmission lines or the like.

The network interface circuitry/controller (NIC) 1207c provides wired communication to the network 1299 and/or to other devices using an access technology and/or communication protocol such as, for example, Ethernet (e.g., IEEE 802.3), Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others, including any of those mentioned herein and/or in '081. Network connectivity may be provided to/from the compute node 1200 via the NIC 1207c using a physical connection, which may be electrical (e.g., a "copper interconnect"), fiber, and/or optical. The physical connection also includes suitable input connectors (e.g., ports, receptacles, sockets, and the like) and output connectors (e.g., plugs, pins, and the like). The NIC 1207c may include one or more dedicated processors and/or FPGAs to communicate using one or more of the aforementioned network interface protocols. As examples, the NIC 1207c is embodied as an Ethernet controller (e.g., a Gigabit Ethernet Controller or the like), a high-speed serial interface (HSSI), a Peripheral Component Interconnect (PCI) controller, a USB controller, a SmartNIC, an Intelligent Fabric Processor (IFP), and/or some other like device. In some implementations, the NIC 1207c may include multiple controllers to provide connectivity to other networks using the same or different protocols. For example, the compute node 1200 may include a first NIC 1207c providing communications to the network 1299 over Ethernet and a second NIC 1207c providing communications to other devices over another type of network.

The interface circuitry 1208 (also referred to as "input/output (I/O) interface circuitry 1208", "I/O circuitry 1208", and/or the like) is configured to connect or communicatively coupled the compute node 1200 with one or more external (peripheral) components, devices, and/or subsystems. Examples of such external (peripheral) components/devices include sensor circuitry 1241, actuator circuitry 1242, positioning circuitry 1243, and other I/O devices 1240, but may also include other devices or subsystems not shown by FIG. 12. In some implementations, the interface circuitry 1208, is part of, or includes circuitry that enables the exchange of information between two or more components or devices internal to the compute node 1200. Additionally or alternatively, the interface circuitry 1208 may be used to transfer data between the compute node 1200 and another computer device (e.g., remote system 1290, client system 1250, and/or the like) via a wired and/or wireless connection. Access to various such devices/components may be implementation specific, and may vary from implementation to implementation. As examples, the interface circuitry 1208 can be embodied as, or otherwise include, one or more hardware interfaces such as, for example, buses (e.g., including an expansion buses, IXs, and/or the like), input/output (I/O) interfaces, peripheral component interfaces (e.g., peripheral cards and/or the like), network interface cards, host bus adapters, and/or mezzanines, and/or the like. In some implementations, the interface circuitry 1208 includes one or more interface controllers and connectors that interconnect one or more of the processor circuitry 1201, memory circuitry 1203, storage circuitry 1204, communication circuitry 1207, and the other components of compute node 1200 and/or to one or more external (peripheral) components, devices, and/or subsystems.

Additionally or alternatively, the interface circuitry 1208 and/or the IX 1206 can be embodied as, or otherwise include memory controllers, storage controllers (e.g., redundant array of independent disk (RAID) controllers and the like), baseboard management controllers (BMCs), input/output (I/O) controllers, host controllers, and the like. Examples of I/O controllers include integrated memory controller (IMC), memory management unit (MMU), input-output MMU (IOMMU), sensor hub, General Purpose I/O (GPIO) controller, PCIe endpoint (EP) device, direct media interface (DMI) controller, Intel® Flexible Display Interface (FDI) controller(s), VGA interface controller(s), Peripheral Component Interconnect Express (PCIe) controller(s), universal serial bus (USB) controller(s), FireWire controller(s), Thunderbolt controller(s), FPGA Mezzanine Card (FMC), extensible Host Controller Interface (xHCI) controller(s), Enhanced Host Controller Interface (EHCI) controller(s), Serial Peripheral Interface (SPI) controller(s), Direct Memory Access (DMA) controller(s), hard drive controllers (e.g., Serial AT Attachment (SATA) host bus adapters/controllers, Intel® Rapid Storage Technology (RST), and/or the like), Advanced Host Controller Interface (AHCI), a Low Pin Count (LPC) interface (bridge function), Advanced Programmable Interrupt Controller(s) (APIC), audio controller(s), SMBus host interface controller(s), UART controller(s), and/or the like. Some of these controllers may be part of, or otherwise applicable to the memory circuitry 1203, storage circuitry 1204, and/or IX 1206 as well. As examples, the connectors include electrical connectors, ports, slots, jumpers, receptacles, modular connectors, coaxial cable and/or BNC connectors, optical fiber connectors, PCB mount connectors, inline/cable connectors, chassis/panel connectors, peripheral component interfaces (e.g., non-volatile memory ports, USB ports, Ethernet ports, audio jacks, power supply interfaces, on-board diagnostic (OBD) ports, and so forth), and/or the like.

The sensor(s) 1241 (also referred to as "sensor circuitry 1241") includes devices, modules, or subsystems whose purpose is to detect events or changes in its environment and send the information (sensor data) about the detected events to some other a device, module, subsystem, and the like. Individual sensors 1241 may be exteroceptive sensors (e.g., sensors that capture and/or measure environmental phenomena and/external states), proprioceptive sensors (e.g., sensors that capture and/or measure internal states of the compute node 1200 and/or individual components of the compute node 1200), and/or exproprioceptive sensors (e.g., sensors that capture, measure, or correlate internal states and external states). Examples of such sensors 1241 include inertia measurement units (IMU), microelectromechanical systems (MEMS) or nanoelectromechanical systems (NEMS), level sensors, flow sensors, temperature sensors (e.g., thermistors, including sensors for measuring the temperature of internal components and sensors for measuring temperature external to the compute node 1200), pressure sensors, barometric pressure sensors, gravimeters, altimeters, image capture devices (e.g., visible light cameras, thermographic camera and/or thermal imaging camera (TIC) systems, forward-looking infrared (FLIR) camera systems, radiometric thermal camera systems, active infrared (IR) camera systems, ultraviolet (UV) camera systems, and/or the like), light detection and ranging (LiDAR) sensors, proximity sensors (e.g., IR radiation detector and the like), depth sensors, ambient light sensors, optical light sensors, ultrasonic transceivers, microphones, inductive loops, force and/or load sensors, remote charge converters (RCC), rotor speed and position sensor(s), fiber optic gyro (FOG) inertial sensors, Attitude & Heading Reference Unit (AHRU), fibre Bragg grating (FBG) sensors and interrogators, tachometers, engine temperature gauges, pressure gauges, transformer sensors, airspeed-measurement meters, speed indicators, and/or the like. The IMUs, MEMS, and/or NEMS can include, for example, one or more 3-axis accelerometers, one or more 3-axis gyroscopes, one or more magnetometers, one or more compasses, one or more barometers, and/or the like. Additionally or alternatively, the sensors 1241 can include sensors of various compute components such as, for example, digital thermal sensors (DTS) of respective processors/cores, thermal sensor on-die (TSOD) of respective dual inline memory modules (DIMMs), baseboard thermal sensors, and/or any other sensor(s), such as any of those discussed herein.

The actuators 1242 allow the compute node 1200 to change its state, position, and/or orientation, or move or control a mechanism or system. The actuators 1242 comprise electrical and/or mechanical devices for moving or controlling a mechanism or system, and converts energy (e.g., electric current or moving air and/or liquid) into some kind of motion. The compute node 1200 is configured to operate one or more actuators 1242 based on one or more captured events, instructions, control signals, and/or configurations received from a service provider 1290, client device 1250, and/or other components of the compute node 1200. As examples, the actuators 1242 can be or include any number and combination of the following: soft actuators (e.g., actuators that changes its shape in response to a stimuli such as, for example, mechanical, thermal, magnetic, and/or electrical stimuli), hydraulic actuators, pneumatic actuators, mechanical actuators, electromechanical actuators (EMAs), microelectromechanical actuators, electrohydraulic actuators, linear actuators, linear motors, rotary motors, DC motors, stepper motors, servomechanisms, electromechanical switches, electromechanical relays (EMRs), power switches, valve actuators, piezoelectric actuators and/or biomorphs, thermal biomorphs, solid state actuators, solid state relays (SSRs), shape-memory alloy-based actuators, electroactive polymer-based actuators, relay driver integrated circuits (ICs), solenoids, impactive actuators/mechanisms (e.g., jaws, claws, tweezers, clamps, hooks, mechanical fingers, humaniform dexterous robotic hands, and/or other gripper mechanisms that physically grasp by direct impact upon an object), propulsion actuators/mechanisms (e.g., wheels, axles, thrusters, propellers, engines, motors (e.g., those discussed previously), clutches, and the like), projectile actuators/mechanisms (e.g., mechanisms that shoot or propel objects or elements), controllers of the compute node 1200 or components thereof (e.g., host controllers, cooling element controllers, baseboard management controller (BMC), platform controller hub (PCH), uncore components (e.g., shared last level cache (LLC) cache, caching agent (Cbo), integrated memory controller (IMC), home agent (HA), power control unit (PCU), configuration agent (Ubox), integrated I/O controller (IIO), and interconnect (IX) link interfaces and/or controllers), and/or any other components such as any of those discussed herein), audible sound generators, visual warning devices, virtual instrumentation and/or virtualized actuator devices, and/or other like components or devices. In some examples, such as when the compute node 1200 is part of a robot or drone, the actuator (s) 1242 can be embodied as or otherwise represent one or more end effector tools, conveyor motors, and/or the like.

The positioning circuitry 1243 includes circuitry to receive and decode signals transmitted/broadcasted by a positioning network of a GNSS. Examples of such navigation satellite constellations include United States' GPS, Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and the like), or the like. The positioning circuitry 1243 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 1243 may include a Micro-Technology for Positioning, Navigation, and Timing (Micro-PNT) IC that uses a master timing clock to perform position tracking/estimation without GNSS assistance. The positioning circuitry 1243 may also be part of, or interact with, the communication circuitry 1207 to communicate with the nodes and components of the positioning network. The positioning circuitry 1243 may also provide position data and/or time data to the application circuitry, which may use the data to synchronize operations with various infrastructure (e.g., radio base stations), for turn-by-turn navigation, or the like.

NFC circuitry 1246 comprises one or more hardware devices and software modules configurable or operable to read electronic tags and/or connect with another NFC-enabled device (also referred to as an "NFC touchpoint"). NFC is commonly used for contactless, short-range communications based on radio frequency identification (RFID) standards, where magnetic field induction is used to enable communication between NFC-enabled devices. The one or more hardware devices may include an NFC controller coupled with an antenna element and a processor coupled with the NFC controller. The NFC controller may be a chip providing NFC functionalities to the NFC circuitry 1246. The software modules may include NFC controller firmware and an NFC stack. The NFC stack may be executed by the processor to control the NFC controller, and the NFC controller firmware may be executed by the NFC controller to control the antenna element to emit an RF signal. The RF signal may power a passive NFC tag (e.g., a microchip embedded in a sticker or wristband) to transmit stored data to the NFC circuitry 1246, or initiate data transfer between the NFC circuitry 1246 and another active NFC device (e.g., a smartphone or an NFC-enabled point-of-sale terminal) that is proximate to the computing system 1200 (or the NFC circuitry 1246 contained therein). The NFC circuitry 1246 may include other elements, such as those discussed herein. Additionally, the NFC circuitry 1246 may interface with a secure element (e.g., TEE 1209) to obtain payment credentials and/or other sensitive/secure data to be provided to the other active NFC device. Additionally or alternatively, the NFC circuitry 1246 and/or some other element may provide Host Card Emulation (HCE), which emulates a physical secure element.

The I/O device(s) 1240 may be present within, or connected to, the compute node 1200. The I/O devices 1240 include input device circuitry and output device circuitry including one or more user interfaces designed to enable user interaction with the compute node 1200 and/or peripheral component interfaces designed to enable peripheral component interaction with the compute node 1200. The input device circuitry includes any physical or virtual means for accepting an input including, inter alia, one or more physical or virtual buttons, a physical or virtual keyboard, keypad, mouse, touchpad, touchscreen, microphones, scanner, headset, and/or the like. In implementations where the input device circuitry includes a capacitive, resistive, or other like touch-surface, a touch signal may be obtained from circuitry of the touch-surface. The touch signal may include information regarding a location of the touch (e.g., one or more sets of (x,y) coordinates describing an area, shape, and/or movement of the touch), a pressure of the touch (e.g., as measured by area of contact between a user's finger or a deformable stylus and the touch-surface, or by a pressure sensor), a duration of contact, any other suitable information, or any combination of such information. In these implementations, one or more apps operated by the processor circuitry 1201 may identify gesture(s) based on the information of the touch signal, and utilizing a gesture library that maps determined gestures with specified actions.

The output device circuitry is used to show or convey information, such as sensor readings, actuator position(s), or other like information. Data and/or graphics may be displayed on one or more user interface components of the output device circuitry. The output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED and/or OLED displays, quantum dot displays, projectors, and the like), with the output of characters, graphics, multimedia objects, and the like being generated or produced from operation of the compute node 1200. The output device circuitry may also include speakers or other audio emitting devices, printer(s), and/or the like. In some implementations, the sensor circuitry 1241 may be used as the input device circuitry (e.g., an image capture device, motion capture device, or the like) and one or more actuators 1242 may be used as the output device circuitry (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, and the like.

A battery 1224 may be coupled to the compute node 1200 to power the compute node 1200, which may be used in implementations where the compute node 1200 is not in a fixed location, such as when the compute node 1200 is a mobile device or laptop. The battery 1224 may be a lithium ion battery, a lead-acid automotive battery, or a metal-air battery, such as a zinc-air battery, an aluminum-air battery, a lithium-air battery, a lithium polymer battery, and/or the like. In implementations where the compute node 1200 is mounted in a fixed location, such as when the system is implemented as a server computer system, the compute node 1200 may have a power supply coupled to an electrical grid. In these implementations, the compute node 1200 may include power tee circuitry to provide for electrical power drawn from a network cable to provide both power supply and data connectivity to the compute node 1200 using a single cable.

Power management integrated circuitry (PMIC) 1222 may be included in the compute node 1200 to track the state of charge (SoCh) of the battery 1224, and to control charging of the compute node 1200. The PMIC 1222 may be used to monitor other parameters of the battery 1224 to provide failure predictions, such as the state of health (SoH) and the state of function (SoF) of the battery 1224. The PMIC 1222 may include voltage regulators, surge protectors, power alarm detection circuitry. The power alarm detection circuitry may detect one or more of brown out (under-voltage) and surge (over-voltage) conditions. The PMIC 1222 may communicate the information on the battery 1224 to the processor circuitry 1201 over the IX 1206. The PMIC 1222 may also include an analog-to-digital (ADC) convertor that allows the processor circuitry 1201 to directly monitor the voltage of the battery 1224 or the current flow from the battery 1224. The battery parameters may be used to determine actions that the compute node 1200 may perform, such as transmission frequency, mesh network operation, sensing frequency, and the like.

A power block 1220, or other power supply coupled to an electrical grid, may be coupled with the PMIC 1222 to charge the battery 1224. In some examples, the power block 1220 may be replaced with a wireless power receiver to obtain the power wirelessly, for example, through a loop antenna in the compute node 1200. In these implementations, a wireless battery charging circuit may be included in the PMIC 1222. The specific charging circuits chosen depend on the size of the battery 1224 and the current required.

The compute node 1200 may include any combinations of the components shown by FIG. 12; however, some of the components shown may be omitted, additional components may be present, and different arrangement of the components shown may occur in other implementations. In one example where the compute node 1200 is or is part of a server computer system, the battery 1224, communication circuitry 1207, the sensors 1241, actuators 1242, and/or positioning circuitry 1243, and possibly some or all of the I/O devices 1240, may be omitted.

As mentioned previously, the memory circuitry 1203 and/or the storage circuitry 1204 are embodied as transitory or non-transitory computer-readable media (e.g., CRM 1202). The CRM 1202 is suitable for use to store instructions (or data that creates the instructions) that cause an apparatus (such as any of the devices/components/systems described w.r.t FIGS. 1-13), in response to execution of the instructions (e.g., instructions 1201*x*, 1203*x*, 1204*x*) by the compute node 1200 (e.g., one or more processors 1201), to practice selected aspects of the present disclosure. The CRM 1202 can include a number of programming instructions (e.g., instructions 1201*x*, 1203*x*, 1204*x*) (or data to create the programming instructions). The programming instructions are configured to enable a device (e.g., any of the devices/components/systems described w.r.t FIGS. 1-13), in response to execution of the programming instructions, to perform various programming operations associated with operating system functions, one or more apps, and/or aspects of the present disclosure (including various programming operations associated with FIGS. 1-13). The programming instructions may correspond to any of the computational logic 1204*x*, instructions 1203*x* and 1201*x* discussed previously.

Additionally or alternatively, programming instructions (or data to create the instructions) may be disposed on multiple CRM 1202. In alternate implementations, programming instructions (or data to create the instructions) may be disposed on computer-readable transitory storage media, such as signals. The programming instructions embodied by a machine readable medium 1202 may be transmitted or received over a communications network using a transmission medium via a network interface device (e.g., communication circuitry 1207 and/or NIC 1207*c* of FIG. 12) utilizing any one of a number of communication protocols and/or data transfer protocols such as any of those discussed herein.

Any combination of one or more computer usable or CRM 1202 may be utilized as or instead of the CRM 1202. The computer-usable or computer-readable medium 1202 may be, for example, but not limited to one or more electronic, magnetic, optical, electromagnetic, infrared, or semiconductor systems, apparatuses, devices, or propagation media. For instance, the CRM 1202 may be embodied by devices described for the storage circuitry 1204 and/or memory circuitry 1203 described previously and/or as discussed elsewhere in the present disclosure. In the context of the present disclosure, a computer-usable or computer-readable medium 1202 may be any medium that can contain, store, communicate, propagate, or transport the program (or data to create the program) for use by or in connection with the instruction execution system, apparatus, or device. The computer-usable medium 1202 may include a propagated data signal with the computer-usable program code (e.g., including programming instructions) or data to create the program code embodied therewith, either in baseband or as part of a carrier wave. The computer usable program code or data to create the program may be transmitted using any appropriate medium, including but not limited to wireless, wireline, optical fiber cable, RF, and the like.

Additionally or alternatively, the program code (or data to create the program code) described herein may be stored in one or more of a compressed format, an encrypted format, a fragmented format, a packaged format, and/or the like. Program code (e.g., programming instructions) or data to create the program code as described herein may require one or more of installation, modification, adaptation, updating, combining, supplementing, configuring, decryption, decompression, unpacking, distribution, reassignment, and the like in order to make them directly readable and/or executable by a computing device and/or other machine. For example, the program code or data to create the program code may be stored in multiple parts, which are individually compressed, encrypted, and stored on separate computing devices, wherein the parts when decrypted, decompressed, and combined form a set of executable instructions that implement the program code or the data to create the program code, such as those described herein. In another example, the program code or data to create the program code may be stored in a state in which they may be read by a computer, but require addition of a library (e.g., a dynamic link library), a software development kit (SDK), an API, and the like in order to execute the instructions on a particular computing device or other device. In another example, the program code or data to create the program code may need to be configured (e.g., settings stored, data input, network addresses recorded, and the like) before the program code or data to create the program code can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code or data to create the program code are intended to encompass such machine readable instructions and/or program(s) or data to create such machine readable instruction and/or programs regardless of the particular format or state of the machine readable instructions and/or program(s) when stored or otherwise at rest or in transit.

The computer program code for carrying out operations of the present disclosure, including, for example, programming instructions, computational logic 1204*x*, instructions 1203*x*, and/or instructions 1201*x*, may be written in any combination of one or more programming languages, including an object oriented programming language (e.g., Python, PyTorch, Ruby, Scala, Smalltalk, Java™, Java Servlets, Kotlin, C++, C#, and/or the like), a procedural programming language (e.g., the "C" programming language, Go (or "Golang"), and/or the like), a scripting language (e.g., ECMAScript, JavaScript, Server-Side JavaScript (SSJS), PHP, Pearl, Python, PyTorch, Ruby, Lua, Torch/Lua with Just-In Time compiler (LuaJIT), Accelerated Mobile Pages Script (AMPscript), VBScript, and/or the like), a markup language (e.g., hypertext markup language (HTML), extensible markup language (XML), wiki markup or Wikitext, User Interface Markup Language (UIML), and/or the like), a data interchange format/definition (e.g., Java Script Object Notion (JSON), Apache® MessagePack™, and/or the like), a stylesheet language (e.g., Cascading Stylesheets (CSS), extensible stylesheet language (XSL), and/or the like), an interface definition language (IDL) (e.g., Apache® Thrift, Abstract Syntax Notation One (ASN.1), Google® Protocol Buffers (protobuf), efficient XML interchange (EXI), and/or the like), a web framework (e.g., Active Server Pages Network Enabled Technologies (ASP.NET), Apache® Wicket, Asynchronous Javascript and XML (Ajax) frameworks, Django, Jakarta Server Faces (JSF; formerly JavaServer Faces), Jakarta Server Pages (JSP; formerly JavaServer Pages), Ruby on Rails, web toolkit, and/or the like), a template language (e.g., Apache® Velocity, Tea, Django template language, Mustache, Template Attribute Language (TAL), Extensible Stylesheet Language Transformations (XSLT), Thymeleaf, Facelet view, and/or the like), and/or some other suitable programming languages including proprietary programming languages and/or development tools, or any other languages or tools such as those discussed herein. It should be noted that some of the aforementioned languages, tools, and/or technologies may be classified as belonging to multiple types of languages/technologies or otherwise classified differently than described previously. The computer program code for carrying out operations of the present disclosure may also be written in any combination of the programming languages discussed herein. The program code may execute entirely on the compute node 1200, partly on the compute node 1200 as a stand-alone software package, partly on the compute node 1200 and partly on a remote computer, or entirely on the remote computer. In the latter scenario, the remote computer may be connected to the compute node 1200 through any type of network (e.g., network 1299).

The network 1299 comprises a set of computers that share resources located on or otherwise provided by a set of network nodes. The set of computers making up the network 1299 can use one or more communication protocols and/or access technologies (such as any of those discussed herein) to communicate with one another and/or with other computers outside of the network 1299 (e.g., compute node 1200, client device 1250, and/or remote system 1290), and may be connected with one another or otherwise arranged in a variety of network topologies. As examples, the network 1299 can represent the Internet, one or more cellular networks (e.g., 3GPP 5G, LTE, and/or the like), local area networks (LANs), wide area networks (WANs), wireless LANS (WLANs), Transfer Control Protocol (TCP)/Internet Protocol (IP)-based networks, Personal Area Networks (PANs), Digital Subscriber Line (DSL) and/or cable networks, data networks, cloud computing services, edge computing networks, proprietary and/or enterprise networks, virtual private network (VPN), and/or any combination thereof. In some implementations, the network 1299 is associated with network operator who owns or controls equipment and other elements necessary to provide network-related services, such as one or more network access nodes (NANs) (e.g., base stations, access points, and the like), one or more servers for routing digital data or telephone calls (e.g., a core network or backbone network), and the like. In either implementation, the network 1299 comprises computers, network connections among various computers (e.g., between the compute node 1200, client device(s) 1250, remote system 1290, and/or the like), and software routines to enable communication between the computers over respective network connections. Connections to the network 1299 (and/or compute nodes therein) may be via a wired and/or a wireless connections using the various communication protocols such as any of those discussed herein. More than one network may be involved in a communication session between the illustrated devices. Connection to the network 1299 may require that the computers execute software routines that enable, for example, the layers of the OSI model of computer networking or equivalent in a wireless (or cellular) phone network.

The remote system 1290 (also referred to as a "service provider", "application server(s)", "app server(s)", "external platform", and/or the like) comprises one or more physical and/or virtualized computing systems owned and/or operated by a company, enterprise, and/or individual that hosts, serves, and/or otherwise provides information objects to one or more users (e.g., compute node 1200). The physical and/or virtualized systems include one or more logically or physically connected servers and/or data storage devices distributed locally or across one or more geographic locations. Generally, the remote system 1290 uses IP/network resources to provide InOb(s) such as electronic documents, webpages, forms, apps (e.g., native apps, web apps, mobile apps, and/or the like), data, services, web services, media, and/or content to different user/client devices 1250. As examples, the service provider 1290 may provide mapping and/or navigation services; cloud computing services; search engine services; social networking, microblogging, and/or message board services; content (media) streaming services; e-commerce services; blockchain services; communication services such as Voice-over-Internet Protocol (VOIP) sessions, text messaging, group communication sessions, and the like; immersive gaming experiences; and/or other like services. In some examples, the remote system 1290 corresponds to the NFT/blockchain service 502, 900, and the system 1200 and/or client device 1250 corresponds to user system 501 and/or client devices 910, 960. The client devices that utilize services provided by remote system 1290 may be referred to as "subscribers" or the like. Although FIG. 12 shows only a single remote system 1290, the remote system 1290 may represent multiple remote system 1290, each of which may have their own subscribing users.

3. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method of obtaining NFT-based KYC and/or AML services, comprising: providing, via an application (app), user data to an NFT/blockchain service; and receiving, from the NFT/blockchain service via the app, a minted NFT based on the provided user data.

Example A02 includes the method of example A01 and/or some other example(s) herein, wherein the app is a client app, a wallet app, a payment app, a mobile app, a web app, a hybrid app, or a combination thereof.

Example A03 includes the method of examples A01-A02 and/or some other example(s) herein, wherein the method is performed by a client computing device or a set of server computing devices.

Example A04 includes a method for providing NFT-based KYC and/or AML services, comprising: receiving, by an NFT/blockchain service, inputs from one or more data sources, wherein at least some of the inputs include user data; generating, by the NFT/blockchain service, one or more smart contracts based on the received inputs; and minting, by the NFT/blockchain service, an NFT based on the received inputs and/or according to the generated smart contract.

Example A05 includes the method of example A04 and/or some other example(s) herein, wherein the method includes: receiving, by the NFT/blockchain service, the user data via a user application (app); generating, by the NFT/blockchain service, the minted NFT based on the provided user data; and sending the minted NFT to the user app.

Example A06 includes the method of examples A04-A05 and/or some other example(s) herein, wherein the method includes: generating a block for inclusion in a blockchain, wherein the block includes the minted NFT; and adding the generated block to the blockchain.

Example A07 includes the method of examples A04-A06 and/or some other example(s) herein, wherein the generated smart contract includes conditions, parameters, and/or criteria for detecting money laundering activities.

Example A08 includes the method of examples A04-A07 and/or some other example(s) herein, wherein the method includes: receiving, by the NFT/blockchain service, AML mechanisms from one or more organizations; generating, by the NFT/blockchain service, a set of real-time codes from the AML mechanisms; and generating, by the NFT/blockchain service, the smart contract based on the set of real-time codes.

Example A09 includes the method of example A08 and/or some other example(s) herein, wherein the AML mechanisms include one or more AML rules, policies, and/or regulations.

Example A10 includes the method of examples A01-A09 and/or some other example(s) herein, wherein the user data includes KYC data and/or knowledge-based authentication (KBA) data.

Example A11 includes the method of examples A01-A10 and/or some other example(s) herein, wherein the inputs include the user data and one or more of ID documents, financial institution documents, personal data, confidential data, sensitive data, authentication credentials, digital certificates, biometric data, one or more network addresses, one or more timestamps, geolocation information associated with access of the NFT/blockchain service, user ID, client app ID, app type of the app, version of the app, app session ID of the app, user agent string, operating system (OS) type, OS version, app vendor, OS vendor, network session ID, device ID or serial number, a product ID, EPC, RFID tag ID, an integer assigned to the user, a cookie ID, a realm name, domain name, logon user name or credentials, network credentials, social media account name, session ID, device fingerprint, electronic health records, electronic medical records, and/or any other data or information such as those discussed herein.

Example A12 includes the method of examples A01-A11, and/or some other example(s) herein, wherein the NFT/blockchain service is implemented by a set of servers, wherein the set of servers is part of a cloud computing service, an edge computing network, and/or a cellular communications network.

Example B01 includes a method for obtaining know your customer (KYC) non-fungible token (NFT) services, the method comprising: providing, via a user application (app), a set of user data items to a KYC NFT service; and receiving, from the KYC NFT service via the user app, a minted KYC NFT based on verification of the set of user data items by the KYC NFT service.

Example B02 includes the method of example B01 and/or some other example(s) herein, wherein the user app is a client app, a wallet app, a payment app, a mobile app, a web app, or a hybrid app.

Example B03 includes a method for providing a know your customer (KYC) non-fungible token (NFT) service, comprising: receiving, by the KYC NFT service, a set of user data items associated with a user; verifying, by the KYC NFT service, each user data item of the set of user data items; generating, by the KYC NFT service, a set of hashes, wherein each hash in the set of hashes corresponds to a verified user data item in the set of user data items; minting, by the KYC NFT service, a KYC NFT that includes each hash in the set of hashes; and updating, by the KYC NFT service, a smart contract to include the KYC NFT.

Example B04 includes the method of example B03 and/or some other example(s) herein, wherein the method includes: receiving the set of user data items via a user application (app); and sending the minted KYC NFT to the user app.

Example B05 includes the method of examples B03-B04 and/or some other example(s) herein, wherein the method includes: generating a block for inclusion in a blockchain, wherein the block includes the minted KYC NFT or the set of hashes; and adding the generated block to the blockchain.

Example B06 includes the method of example B05 and/or some other example(s) herein, wherein the block includes a hash of a previous block in the blockchain.

Example B07 includes the method of examples B05-B06 and/or some other example(s) herein, wherein the block does not include the set of user data items.

Example B08 includes the method of examples B05-B07 and/or some other example(s) herein, wherein the method includes: storing the set of user data items in a private database separate from the blockchain.

Example B09 includes the method of examples B05-B08 and/or some other example(s) herein, wherein the method includes: sending the generated block to one or more nodes in a blockchain network associated with the blockchain; receiving an indication of the verification of the generated block from at least one of the nodes of the one or more nodes; and adding the generated block to the blockchain after receipt of the indication.

Example B10 includes the method of examples B03-B09 and/or some other example(s) herein, wherein the generated smart contract includes conditions, parameters, or criteria for detecting potential money laundering activities.

Example B11 includes the method of example B10 and/or some other example(s) herein, wherein the method includes: detecting a suspicious transaction based on the conditions, parameters, or criteria in the smart contract; and sending a notification to one or more computing platforms defined in the smart contract, wherein the notification indicates the detected suspicious transaction.

Example B12 includes the method of examples B10-B11 and/or some other example(s) herein, wherein the method includes: receiving, by the KYC NFT service, one or more anti-money laundering (AML) policies from one or more organizations; generating, by the KYC NFT service, a set of real-time codes from the AML policies; and generating, by the KYC NFT service, the conditions, parameters, or criteria in the smart contract based on the set of real-time codes.

Example B13 includes the method of example B12 and/or some other example(s) herein, wherein the real-time codes are code snippets in the smart contract configured to monitor transactions at one or more financial institutions.

Example B14 includes the method of example B13, wherein the real-time codes are code snippets in the smart contract configured to generate one or more notifications based on the monitored financial transactions.

Example B15 includes the method of examples B01-B14 and/or some other example(s) herein, wherein the verification of the set of user data items includes: sending the set of user data items to one or more nodes in a blockchain network to verify the set of user data items; and receiving an indication of the verification of the set of user data items from the one or more nodes.

Example B16 includes the method of examples B01-B15 and/or some other example(s) herein, wherein the method includes: submitting the KYC NFT to a set of selected financial institutions; and receiving, from each financial institution in the set of selected financial institutions, an indication of an account opened for the user based on the KYC NFT.

Example B17 includes the method of examples B01-B16 and/or some other example(s) herein, wherein the set of user data items includes one or more of: personal information, confidential information, sensitive information, one or more identity documents, authentication or authorization credentials, biometric data, electronic health records, knowledge-based authentication (KBA) data, social media profile data, or user system data of a user system used to provide the set of user data items to the KYC NFT service.

Example B18 includes the method of example B17 and/or some other example(s) herein, wherein the user system data includes one or more of: one or more user identifiers (IDs) or addresses, one or more timestamps, one or more digital certificates, geolocation information associated with access of the KYC NFT service, a client app ID, an app type of the app, app vendor, version of the app, app session ID of the app, user agent string, operating system (OS) type, an OS version, OS vendor, network session ID, device ID, serial number, product ID, a cookie ID, domain name, a rendering engine type, a rendering engine version, a device type of the user system, a device manufacturer, hardware platform type, one or more device serial numbers, a device fingerprint, system information of the user system, a screen or display resolution of the user system, or metadata.

Example B19 includes the method of examples B01-B18 and/or some other example(s) herein, wherein the set of user data items includes an NFT identity (ID) associated with the user.

Example B20 includes the method of example B19 and/or some other example(s) herein, wherein the NFT ID is generated by an NFT ID service that is separate from the KYC NFT service.

Example B21 includes the method of example B19 and/or some other example(s) herein, wherein the NFT ID is generated by the KYC NFT service.

Example B22 includes the method of examples B01-B21 and/or some other example(s) herein, wherein the method is performed by a client computing device or a set of server computing devices.

Example B23 includes the method of examples B01-B22 and/or some other example(s) herein, wherein the KYC NFT service is implemented by a set of servers, wherein the set of servers is part of a cloud computing service, an edge computing network, and/or a cellular communications network.

Example Z00 includes the method of examples A01-A12, B01-B23, and/or some other example(s) herein, wherein the method includes any one or more aspects as shown and described herein. Example Z01 includes one or more computer readable media comprising instructions, wherein execution of the instructions by processor circuitry is to cause the processor circuitry to perform the method examples A01-A12, B01-B23, and/or some other example(s) herein. Example Z02 includes a computer program comprising the instructions of example Z01 and/or some other example(s) herein. Example Z03 includes an Application Programming Interface defining functions, methods, variables, data structures, and/or protocols for the computer program of example Z02 and/or some other example(s) herein. Example Z04 includes an apparatus comprising circuitry loaded with the instructions of example Z01 and/or some other example(s) herein. Example Z05 includes an apparatus comprising circuitry operable to run the instructions of example Z01 and/or some other example (s) herein. Example Z06 includes an integrated circuit comprising one or more of the processor circuitry and the one or more computer readable media of example Z01 and/or some other example(s) herein. Example Z07 includes a computing system comprising the one or more computer readable media and the processor circuitry of example Z01 and/or some other example(s) herein. Example Z08 includes an apparatus comprising means for executing the instructions of example Z01 and/or some other example(s) herein. Example Z09 includes a signal generated as a result of executing the instructions of example Z01 and/or some other example(s) herein. Example Z10 includes a data unit generated as a result of executing the instructions of example Z01 and/or some other example(s) herein. Example Z11 includes the data unit of example Z10 and/or some other example(s) herein, the data unit is a datagram, network packet, data frame, data segment, a Protocol Data Unit (PDU), a Service Data Unit (SDU), a message, or a database object. Example Z12 includes a signal encoded with the data unit of examples Z10-Z11 and/or some other example(s) herein. Example Z13 includes an electromagnetic signal carrying the instructions of example Z01 and/or some other example(s) herein. Example Z14 includes an apparatus comprising means for performing the method examples A01-A12, B01-B23, and/or some other example(s) herein.

4. Terminology

For the purposes of the present document, the terminology discussed in '081 may be applicable to the examples and embodiments discussed herein. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The phrase "X(s)" means one or more X or a set of X. The description may use the phrases "in an embodiment," "In some embodiments," "in one implementation," "In some implementations," "in some examples", and the like, each of which may refer to one or more of the same or different embodiments, implementations, and/or examples. Furthermore, the terms "comprising," "including," "having," and the like, as used with respect to the present disclosure, are synonymous.

The terms "configuration", "policy", "ruleset", and/or "operational parameters", at least in some examples refer to a machine readable information object that contains instructions, conditions, parameters, criteria, data, metadata, and/or other information that is/are relevant to a component, device, system, network, service producer, service consumer, and/or other element/entity.

The term "information object" or "InOb" at least in some examples refers to a data structure or piece of information, definition, or specification that includes a name to identify its use in an instance of communication. Additionally or alternatively, the term "information object" or "InOb" at least in some examples refers to a configuration item that displays information in an organized form. Additionally or alternatively, the term "information object" or "InOb" at least in some examples refers to an abstraction of a real information entity and/or a representation and/or an occurrence of a real-world entity. Additionally or alternatively, the term "information object" or "InOb" at least in some examples refers to a data structure that contains and/or conveys information or data. Each of the data formats may also define the language, syntax, vocabulary, and/or protocols that govern information storage and/or exchange. Examples of the data formats that may be used for any of the InObs discussed herein may include any of those mentioned in '081.

The term "data format", "file format", and/or "format" at least in some examples refers to a data structure, specification, and/or standard that defines the language, syntax, vocabulary, and/or protocols that govern information storage and/or exchange. Examples of the data formats that may be used for any of the InObs discussed herein may include Accelerated Mobile Pages Script (AMPscript), Abstract Syntax Notation One (ASN.1), Apex®, Backus-Naur Form (BNF), extended BNF, Bencode, BSON, ColdFusion Markup Language (CFML), Cascading Stylesheets (CSS), comma-separated values (CSV), Control Information Exchange Data Model (C2IEDM), DARPA Agent Markup Language (DAML), Document Type Definition (DTD), Electronic Data Interchange (EDI), Extensible Data Notation (EDN), Extensible Markup Language (XML), Efficient XML Interchange (EXI), Extensible Stylesheet Language (XSL), Free Text (FT), Fixed Word Format (FWF), Cisco® Etch, Franca, Geography Markup Language (GML), Guide Template Language (GTL), Handlebars template language, Hypertext Markup Language (HTML), Interactive Financial Exchange (IFX), Keyhole Markup Language (KML), JAMscript, JavaScript, Java Script Object Notion (JSON), JSON Schema Language, Jinja, LaTeX, markdown, MessagePack™, Mustache template language, Ontology Interchange Language (OIL), Open Service Interface Definition, Open Financial Exchange (OFX), Precision Graphics Markup Language (PGML), Google® Protocol Buffers (protobuf), Quicken® Financial Exchange (QFX), Regular Language for XML Next Generation (RelaxNG) schema language, regular expressions, Resource Description Framework (RDF) schema language, RESTful Service Description Language (RSDL), Scalable Vector Graphics (SVG), Schematron, Tactical Data Link (TDL) format (e.g., J-series message format for Link 16; JREAP messages; Multifuction Advanced Data Link (MADL), Integrated Broadcast Service/Common Message Format (IBS/CMF), Over-the-Horizon Targeting Gold (OTH-T Gold), Variable Message Format (VMF), United States Message Text Format (USMTF), and any future advanced TDL formats), VBScript, Web Application Description Language (WADL), Web Ontology Language (OWL), Web Services Description Language (WSDL), wiki markup or Wikitext, Wireless Markup Language (WML), extensible HTML (XHTML), XPath, XQuery, XML DTD language, XML Schema Definition (XSD), XML Schema Language, XSL Transformations (XSLT), YAML ("Yet Another Markup Language" or "YANL Ain't Markup Language"), and/or any other data format, schema language, and/or language discussed elsewhere herein.

The term "data set" or "dataset" at least in some examples refers to a collection of data; a "data set" or "dataset" may be formed or arranged in any type of data structure. In some examples, one or more characteristics can define or influence the structure and/or properties of a dataset such as the number and types of attributes and/or variables, and various statistical measures (e.g., standard deviation, kurtosis, and/or the like). The term "data structure" at least in some examples refers to a data organization, management, and/or storage format. Additionally or alternatively, the term "data structure" at least in some examples refers to a collection of data values, the relationships among those data values, and/or the functions, operations, tasks, and the like, that can be applied to the data. Examples of data structures include primitives (e.g., Boolean, character, floating-point numbers, fixed-point numbers, integers, reference or pointers, enumerated type, and/or the like), composites (e.g., arrays, records, strings, union, tagged union, and/or the like), abstract data types (e.g., data container, list, tuple, associative array, map, dictionary, set (or dataset), multiset or bag, stack, queue, graph (e.g., tree, heap, and the like), and/or the like), routing table, symbol table, quad-edge, blockchain, purely-functional data structures (e.g., stack, queue, (multi) set, random access list, hash consing, zipper data structure, and/or the like.

The term "due diligence" at least in some examples refers to the investigation or exercise of care that an entity is normally expected to take before entering into an agreement or contract with another party and/or an act with a certain standard of care. Additionally or alternatively, the term "due diligence" at least in some examples refers to a detailed examination of an entity/org, its financial records, business transactions, and/or other aspects, done before becoming involved in a business arrangement with that entity/org.

The term "financial institution" or "FI" at least in some examples refers to an org or entity that provides financial services and/or acts as an intermediary for different types of financial transactions. Examples of financial institutions include depository institutions, investment institutions, contractual institutions, credit card companies, non-banking financial institutions (NBFI), and/or the like. The term "depository institution" at least in some examples refers to an org or entity that accepts and manages deposits and/or makes loans. Examples of depository institutions include commercial banks, cooperative banks, central banks, building societies, credit unions, trust companies, mortgage brokers, and/or the like. The term "investment institution" at least in some examples refers to an org or entity that assists other orgs and/or individuals invest in securities, manage investments, and/or access capital markets. Examples of investment institutions include investment banks, finance companies, microfinance or microloan orgs, brokerage firms, underwriters, mutual funds, hedge funds, financial advisors, and/or the like. The term "contractual institution" at least in some examples refers to an org or entity whose operations are based on formal contracts or agreements between the org/entity and other orgs or individuals, and/or between different orgs and/or individuals. Examples of contractual institutions include insurance companies, pension funds, mutual funds, and/or the like.

The term "fintech" at least in some examples refers to various technologies to provide financial products and/or services; examples of such technologies include AI and ML, blockchain and cryptocurrency technologies, cloud computing, big data, online banking, mobile payment applications, robotic process automation, and peer-to-peer lending platforms. In some examples, fintech and/or fintech platforms can encompass aspects of payment processing platforms, digital banking solutions, online brokerage platforms, algorithmic trading platforms, automated financial advisor technologies ("robo-advisors"), BaaS platforms, cryptocurrency trading platforms, regtech platforms, insurance technology (insurtech) platforms, crowdfunding platforms, data analytics platforms, p2p lending platforms, and the like.

The term "know your client", "know your customer", or "KYC" at least in some examples refers to verification procedures, a set of standards and/or requirements used to ensure that an org has sufficient information about their clients, their risk profiles, and their financial position. In various examples, KYC includes three components, including customer identification program (CIP) imposed under the USA Patriot Act in 2001, customer due diligence (CDD), and ongoing monitoring or enhanced due diligence (EDD) of a customer's account once it is established. CIP requires that financial firms must obtain four pieces of identifying information about a client, including name, date of birth, address, and identification number. CDD is a process in which all of a customer's credentials are collected to verify their identity and evaluate their risk profile for suspicious account activity. EDD is used for customers that are at a higher risk of infiltration, terrorism financing, or money laundering and additional information collection is often necessary. Account owners generally must provide a government-issued ID as proof of identity. Some institutions require two forms of ID, such as a driver's license, birth certificate, social security card, or passport. In addition to confirming identity, the address must be confirmed. This can be done with proof of ID or with an accompanying document confirming the address of the client.

The term "knowledge-based assessment", "knowledge-based authentication", or "KBA" at least in some examples refers to verification and/or authentication processes or procedures, which requires the knowledge of private information (or personal data) to prove that the entity/element providing the identifying information is the actual owner of the corresponding identity. In some examples, KBA-generated questions are static KBAs or dynamic KBAs. The term "static KBAs" at least in some examples refers to a pre-agreed set of KBA data and/or shared secrets, such as place of birth, mother's maiden name, name of first pet, and/or the like. The term "dynamic KBAs" at least in some examples refers to KBA-questions generated from a wider base of personal information, such as account numbers, loan amounts, tax payment amounts, and/or the like. Additionally or alternatively, the term "dynamic KBAs" at least in some examples refers to KBA-questions that are generated based on changing parameters or conditions, such as previously supplied KBA questions, timing parameters, and/or the like.

The term "blockchain" at least in some examples refers to a list of records (referred to as "blocks") that are linked together in some way, usually using cryptography. The term "block" as used in "blockchain" at least in some examples refers to a batch of transactions with a reference to a previous block (e.g., a hash of the previous block) in a blockchain thereby linking the block to the previous block. In various implementations, each block in a blockchain contains a cryptographic hash of a previous block, a timestamp, and transaction data (e.g., represented as a Merkle tree). Additionally or alternatively, the term "blockchain" at least in some examples refers to a digital database containing information, such as records of financial or other transactions, which can be simultaneously used and shared within a large decentralized, publicly accessible network. Additionally or alternatively, the term "blockchain" at least in some examples refers to a shared, immutable ledger that facilitates the process of recording transactions and tracking assets (tangible and intangible) in a network. In some examples, a blockchain includes a list of records, called blocks, that are linked together using cryptography.

The term "blockchain mining" or "mining" at least in some examples refers to a process (e.g., computer computations) by which transactions are validated and verified for inclusion in a blockchain.

The terms "consensus algorithm", "consensus protocol", "consensus mechanism", and/or "consensus" at least in some examples refers to one or more coordinating processes that allows distributed computing applications and/or multi-agent systems to agree on a data value that is needed during computation. Examples of consensus algorithms include proof of work (PoW), reusable PoW, proof of useful work, proof of stake (POS), proof of space, proof of authority, Specialized Proofs of Confidential Knowledge (SPoCKs), Delegated Proof of Stake (DPOS), Byzantine fault tolerance (BFT), BFT-DPOS, Transaction as Proof of Stake (TaPOS), Paxos, distributed lock services (e.g., Chubby provided by Google®), lockstep protocols, Byzantine agreement protocol (BAP), quantum BAP, and/or the like.

The term "consortium blockchain" at least in some examples refers to a group of private blockchains, each owned by individual institutions that permit the sharing of information for various purposes, such as improving/streamlining workflows, transparency, and/or accountability. Additionally or alternatively, the term "consortium blockchain" at least in some examples refers to a hybrid blockchain networks that combines public and private blockchain network features. Additionally or alternatively, the term "consortium blockchain" at least in some examples refers to a permissioned blockchain networks governed by a group of organizations that have decided to share a ledger among themselves for transactions. Additionally or alternatively, the term "consortium blockchain" can also be referred to as a "federated blockchain".

The term "decentralized application", "decentralized app", "Dapp", "Đapp", or "dApp" at least in some examples refers to an application that can operate autonomously, for example, through the use of smart contracts, that run on a decentralized computing platform, blockchain, or other distributed ledger system. Additionally or alternatively, the term "decentralized application", "decentralized app", "Dapp", "Đapp", or "dApp" at least in some examples refers to an application configured to generate and distribute tokens or NFTs according to a standard algorithm and/or a set of criteria.

The term "Ethereum" at least in some examples refers to a decentralized, open-source blockchain with smart contract functionality. The term "Ether", "ETH", or "Ξ" at least in some examples refers to the native cryptocurrency of the Ethereum platform. The term "Ethereum Improvement Proposals" or "EIPs" at least in some examples refers to standards for the Ethereum platform, including core protocol specifications, client APIs, and contract standards.

The term "Ethereum Virtual Machine" or "EVM" at least in some examples refers to a runtime environment for transaction execution in Ethereum. Additionally or alternatively, the term "Ethereum Virtual Machine" or "EVM" at least in some examples refers to a global virtual computer whose state every participant on the Ethereum network stores and agrees on; where any participant can request the execution of arbitrary code on the EVM; code execution changes the state of the EVM. Additional aspects of Ethereum, Ether, and EVMs are discussed in *Ethereum Development Documentation,* ETHEREUM.ORG (18 Oct. 2018), https://ethereum.org/en/developers/docs/("[EthereumDoc] "), *Ethereum Glossary,* ETHEREUM.ORG (23 Feb. 2022), https://ethereum.org/en/glossary/, Takenobu T., *Ethereum EVM illustrated: exploring some mental models and implementations*, rev. 0.01.1 (March 2018), http://takenobu-hs.github.io/downloads/ethereum_evm_illustrated.pdf, and Dr. Gavin Wood, *Ethereum: A secure Decentralised Generalised Transaction Ledger*, Berlin version b8ffc51 (21 Feb. 2022), https://ethereum.github.io/yellowpaper/paper.pdf ("[Ethereum-Yellow-Paper]"), the contents of each of which are hereby incorporated by reference in their entireties and for all purposes.

The terms "flow blockchain", "flow framework", or simply "flow" at least in some examples refers to a node pipeline that may be used to verify blockchain transactions as discussed in Hentschel et al., *Flow: Separating Consensus and Compute*, arXiv: 1909.05821v1 [cs.DC], 21 pages (12 Sep. 2019); Hentschel et al., *Flow: Separating Consensus and Compute—Execution Verification—*, arXiv: 1909.05832v1 [cs.DC] (12 Sep. 2019); Hentschel et al., *Flow: Separating Consensus and Compute—Block Formation and Execution—*, arXiv: 2002.07403v1 [cs.DC] (18 Feb. 2020); Flow Primer, FLOW BLOCKCHAIN (24 Sep. 2020), https://flow.com/primer; *FLOW Token Economics*, FLOW BLOCKCHAIN (23 Sep. 2020), https://flow.com/flow-token-economics; Mackenzie 10th floor, *How to Launch a Fungible Token on Flow*, FLOW DEVELOPERS (22 Sep. 2022), https://developers.flow.com/flow/fungible-tokens; [Flow-NFT]; Bastian Müller ("turbolent"), [Cadence]; and Lafrance et al., *Incentives in a Multi-Role Blockchain,* 16 pages (21 September 2020) (collectively referred to herein as "[Flow]"), the contents of each of which are hereby incorporated by reference in their entireties and for all purposes.

The term "gas" at least in some examples refers to a unit that measures the amount of computational effort required to execute specific operations on the Ethereum network. Additionally or alternatively, the term "gas" at least in some examples refers to a limit on the amount of work that is needed to execute a transaction. The term "gas price" or "gas fee" at least in some examples refers to the fee required to conduct a transaction successfully in terms of computational resources, computational complexity, and/or currency.

The term "housekeeping" at least in some examples refers to an entry or exit routine appended to a user-written block of code (such as a routine, subroutine, function, smart contract, and/or the like) at its entry and exit. Additionally or alternatively, the term "housekeeping" at least in some examples refers to any automated or manual process whereby a computer is cleaned up after usage (e.g., freeing resources such as virtual memory or the like, saving and/or restoring a program state or context, initializing local variables, garbage collection processes, data conversion, backing up data, disk maintenance processes, and the like).

The term "InterPlanetary File System" or "IPFS" at least in some examples refers to a protocol and peer-to-peer network for storing and sharing data in a distributed file system. IPFS uses content-addressing to uniquely identify each file in a global namespace connecting all computing devices. Additional aspects of IPFS are discussed in *Interplanetary File System* (*IPFS*) *Documentation*, IPFS DOCS (2018), https://docs.ipfs.io/ ("[IPFS]"), the contents of which is hereby incorporated by reference in its entirety and for all purposes.

The term "Merkle tree" or "hash tree" at least in some examples refers to a tree data structure in which every leaf node is labelled with the cryptographic hash of a data block, and every node that is not a leaf node (e.g., a branch node, inner node, or inode) is labelled with the cryptographic hash of the labels of its child nodes. Additionally or alternatively, "hash tree" at least in some examples is a generalization of a hash list and a hash chain.

The term "minting" at least in some examples refers to a process of turning digital data into a digital asset, such as a token or non-fungible token (NFT), and may involve adding the digital asset to a blockchain or other distributed ledger. In some examples, "minting" is performed according to [EIP-721], [EIP-1155], Lockyer et al., *EIP-998: ERC-998 Composable Non-Fungible Token Standard [DRAFT]*, Ethereum Improvement Proposals, no. 998 (July 2018), https://eips.ethereum.org/EIPS/eip-998 ("[EIP-998]"), Buterin et al., EIP-1559: *Fee market change for ETH 1.0 chain*, Ethereum Improvement Proposals, no. 1559 (April 2019), https://eips.ethereum.org/EIPS/eip-1559 ("[EIP-1559]"), Marro et al., EIP-5375: *NFT Author Information and Consent*, Ethereum Improvement Proposals, no. 5375 (July 2022), https://eips.ethereum.org/EIPS/eip-5375 ("[EIP-5375]"), and/or Zainan Victor Zhou, *EIP-5679: Token Minting and Burning*, Ethereum Improvement Proposals, no. 5679, (September 2022), https://eips.ethereum.org/EIPS/eip-5679 ("[EIP-5679]"), the contents of each of which are hereby incorporated by reference in their entireties and for all purposes.

The term "non-fungible token" or "NFT" at least in some examples refers to a non-interchangeable unit of data. Additionally or alternatively, the term "non-fungible token" or "NFT" at least in some examples refers to a non-interchangeable unit of data that provides or otherwise acts as a certificate of authenticity or proof of ownership of some physical or virtual item or object. NFTs may be stored on a blockchain or other form of digital ledger, and sold or traded. NFTs may be associated with digital files such as photos, videos, audio, virtual property or virtual assets, and the like. Moreover, because individual NFTs are uniquely identifiable, NFTs differ from blockchain cryptocurrencies, such as Bitcoin, Ether, and the like. Additional aspects of NFTs are discussed in Entriken et al., *EIP-721: Non-Fungible Token Standard*, Ethereum Improvement Proposals, no. 721 (24 Jan. 2018), https://eips.ethereum.org/EIPS/eip-721 ("[EIP-721]") and Reitwießner et al., *EIP-165: Standard Interface Detection*, Ethereum Improvement Proposals, no. 165 (23 Jan. 2018), https://eips.ethereum.org/EIPS/eip-165 ("[EIP-165]"), Burks et al., *EIP-2981: NFT Royalty Standard*, Ethereum Improvement Proposals, no. 2981 (September 2020), https://eips.ethereum.org/EIPS/eip-2981 ("[EIP-2981]"), Anders et al., *EIP-4907: Rental NFT, an Extension of EIP-721*, Ethereum Improvement Proposals, no. 4907 (March 2022), https://eips.ethereum.org/EIPS/eip-4907 ("[EIP-4907]"), Lance et al., *EIP-5006: Rental NFT, NFT User Extension [DRAFT]*, Ethereum Improvement Proposals, no. 5006 (April 2022), https://eips.ethereum.org/EIPS/eip-5006 ("[EIP-5006]"), Anders et al., *EIP-5007: Time NFT, EIP-721 Time Extension [DRAFT]*, Ethereum Improvement Proposals, no. 5007 (April 2022), https://eips.ethereum.org/EIPS/eip-5007 ("[EIP-5007]"), Siemens et al., *Flow Non-Fungible Token Standard*, Flow Blockchain (20 Dec. 2021) https://github.com/onflow/flow-nft/blob/master/README.md ("[Flow-NFT]"), and/or Karslen et al., *Non-Fungible Token Metadata*, Flow Improvement Proposal, no. 636 (6 Dec. 2021), the contents of each of which are hereby incorporated by reference in their entireties and for all purposes.

The term "on-chain transaction" at least in some examples refers to a transaction that occurs and is considered valid when the blockchain is modified. Additionally or alternatively, the term "on-chain transaction" at least in some examples refers to a transaction that is carried out on a blockchain or blockchain network. In some examples, the term "on-chain transaction" may be synonymous with the term "transaction".

The term "off-chain transaction" at least in some examples refers to a transaction that takes place or takes value outside of a blockchain. Additionally or alternatively, the term "off-chain transaction" at least in some examples refers to a transaction that is confirmed outside of a blockchain network. Additionally or alternatively, the term "off-chain transaction" at least in some examples refers to a transaction that involves some of the transaction-related work from a blockchain ecosystem, which can later be integrated back into a blockchain.

The term "smart contract" at least in some examples refers to a set of self-executing code. Additionally or alternatively, the term "smart contract" at least in some examples refers to a program, application, set of trigger functions, or transaction protocol that is intended to automatically execute, control, or document relevant events and actions according to some predefined criteria or conditions such as those defined in a contract, agreement, or policy. Additional aspects of smart contracts are discussed in Mudge et al., *EIP-173: Contract Ownership Standard*, Ethereum Improvement Proposals, no. 173 (7 Jun. 2018), https://eips.ethereum.org/EIPS/eip-173 ("[EIP-173]"), Radomski et al., *EIP-1155: Multi Token Standard*, Ethereum Improvement Proposals, no. 1155 (17 Jun. 2018), https://eips.ethereum.org/EIPS/eip-1155 ("[EIP-1155]"), Murray et al., *EIP-1167: Minimal Proxy Contract*, Ethereum Improvement Proposals, no. 1167 (June 2018), https://eips.ethereum.org/EIPS/eip-1167 ("[EIP-1167]"), Giordano et al., *EIP-1271: Standard Signature Validation Method for Contracts*, Ethereum Improvement Proposals, no. 1271 (July 2018), https://eips.ethereum.org/EIPS/eip-1271 ("[EIP-1271]"), *Enterprise Ethereum Alliance Client Specification v7*, EEA Editor's Draft, version 7 (10 Feb. 2022), https://entethalliance.github.io/client-spec/spec.html ("[EEA-CS7]"), *Solidity Documentation*, release 0.8.18, revision c1040815 (8 Sep. 2022) ("[Solidity]"), Vyper Team, *Vyper Documentation*, release v0.3.8, revision 1cd6f3db (15 Dec. 2022), FuelLaps™, Yul+, version 0.2.3 (10 Oct. 2020), https://github.com/FuelLabs/yulp; *The Cadence Programming Language*, Flow Developers (17 Mar. 2021), https://developers.flow.com/cadence/language/index ("[Cadence]"), and *Contracts*, OpenZepplin|docs, version 4.x (2022), https://docs.openzeppelin.com/contracts/4.x/("[OZ-Contracts]"), the contents of each of which are hereby incorporated by reference in their entireties and for all purposes. In some examples, one or more smart contracts can be implemented as "diamonds" as discussed in Mudge, *EIP-2535: Diamonds, Multi-Facet Proxy*, Ethereum Improvement Proposals, no. 2535 (February 2020), https://eips.ethereum.org/EIPS/eip-2535 ("[EIP-2535]"), the contents of which are hereby incorporated by reference in its entirety and for all purposes.

The term "token" at least in some examples refers to a software and/or hardware object or element that represents the right or ability to perform an operation. Additionally or alternatively, the term "token" at least in some examples refers to a software and/or hardware object or element that references or maps to another data item, which may be done through a tokenization system. The term "security token", "authentication token", "cryptographic token", or the like at least in some examples refers to a software object and/or a physical device used for computer authentication. The term "tokenization" at least in some examples refers to a process for substituting a data item with another equivalent data item (e.g., a "token") that has no extrinsic or exploitable meaning or value, or at least a different meaning or value than the original data item. Additional aspects of tokens are discussed in Vogelsteller et al., *EIP-20: Token Standard*, ETHEREUM IMPROVEMENT PROPOSALS, no. 20 (19 Nov. 2015), https://eips.ethereum.org/EIPS/eip-20 ("[EIP-20]"), Dafflon et al., *EIP-777: Token Standard*, ETHEREUM IMPROVEMENT PROPOSALS, no. 777 (20 Nov. 2017), https://eips.ethereum.org/EIPS/eip-777 ("[EIP-777]"), StartfundInc, EIP-5528: *Refundable Fungible Token*, ETHEREUM IMPROVEMENT PROPOSALS, no. 5528 (August 2022), https://eips.ethereum.org/EIPS/eip-5528 ("[EIP-5528]"), and/or Igualada et al., *Fungible Token Metadata*, FLOW IMPROVEMENT PROPOSAL, no. 1087 (16 Aug. 2022), the contents of each of which are hereby incorporated by reference in their entireties and for all purposes. In some examples, the term "token" and/or "NFT" can include semi-fungible tokens as discussed in Wang et al., *EIP-3525: Semi-Fungible Token*, ETHEREUM IMPROVEMENT PROPOSALS, no. 3525 (December 2020), https://eips.ethereum.org/EIPS/eip-3525 ("[EIP-3525]") and/or Zhu et al., *EIP-5727: Semi-Fungible Soulbound Token [DRAFT]*, ETHEREUM IMPROVEMENT PROPOSALS, no. 5727 (September 2022), https://eips.ethereum.org/EIPS/eip-5727 ("[EIP-5727]"), the contents of each of which are hereby incorporated by reference in their entireties and for all purposes.

The term "transaction" at least in some examples refers to a unit of work performed within a computing system and/or a database management system. Additionally or alternatively, the term "transaction" at least in some examples refers to information processing that is divided into individual, indivisible operations. Additionally or alternatively, the term "transaction" at least in some examples refers to the physical and/or electronic exchange or transfer of assets or objects. Additionally or alternatively, the term "transaction" at least in some examples refers to a request to execute operations on a blockchain that change the state of one or more accounts. The term "private transaction" at least in some examples refers to a transaction where some information about the transaction, such as the payload data, or the sender or the recipient, is only available to the subset of parties privy to that transaction.

The term "wallet" or "digital wallet" at least in some examples refers to an electronic device, online/web service, and/or software application that allows a party to make electronic transaction with another party. Additionally or alternatively, the term "wallet" or "digital wallet" at least in some examples refers to an electronic device, online/web service, and/or software application used to store credentials (e.g., cryptographic private keys) that are used to perform transactions and/or access an account. Additional aspects of wallets are discussed in [EEA-CS7].

Aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus for providing a know your customer (KYC) non-fungible token (NFT) service, the apparatus comprising:

memory circuitry; and processor circuitry connected to the memory circuitry, wherein the processor circuitry is configured to implement a distributed NFT engine architecture operating across multiple servers and computing nodes, wherein the processor circuitry is to:

receive a set of user data items associated with a user;

verify each user data item of the set of user data items, wherein the verification includes biometric authentication using sensor hardware that captures physiological characteristics and processes the physiological characteristics through biometric processing circuits, and authenticating at least a portion of the set of user data items from other sources and comparing biographic data against publicly available data to verify an identity of the user;

generate a set of hashes, wherein each hash in the set of hashes corresponds to a verified user data item in the set of user data items;

mint a KYC NFT that includes each hash in the set of hashes;

update a smart contract to include the KYC NFT;

receive one or more anti-money laundering (AML) policies from multiple organizations;

convert the AML policies into a set of real-time codes comprising the smart contract, wherein the real-time codes include conditions, parameters, and criteria for monitoring electronic transactions over one or more networks at the multiple organizations and for detecting potential money laundering activities;

monitor, in real-time via the smart contract, electronic transactions over the one or more networks across the multiple organizations associated with the user;

detect suspicious activity by configuring machine learning algorithms executing on neural processing units to analyze patterns of the electronic transactions over the one or more networks in real-time across the multiple organizations that are not detectable by individual organizations, wherein the patterns include one or more of i) monitoring deposits made into a predetermined or configurable number of financial institution accounts, ii) deposits made by the user into other accounts at various organizations that are owned or not owned by the user, iii) making multiple matching deposits, transfers, or payments on the same day or in successive days, or iv) multiple low-score users associated with different organizations making deposits into a single account; and automatically generate and transmit notifications to relevant entities upon detection of the suspicious activity.

2. The apparatus of claim 1, wherein the processor circuitry is to:

receive the set of user data items via a user application (app); and send the minted KYC NFT to the user app.

3. The apparatus of claim 1, wherein the processor circuitry is to:

generate a block for inclusion in a blockchain, wherein the block includes the minted KYC NFT or the set of hashes; and add the generated block to the blockchain after verification of the generated block.

4. The apparatus of claim 3, wherein the block includes a hash of a previous block in the blockchain, and the block does not include the set of user data items.

5. The apparatus of claim 3, wherein the processor circuitry is to:

cause storage of the set of user data items in a private database separate from the blockchain.

6. The apparatus of claim 1, wherein the generated smart contract includes conditions, parameters, or criteria for detecting potential money laundering activities, and the processor circuitry is to:

detect a suspicious transaction based on the conditions, parameters, or criteria in the smart contract; and send a notification to one or more computing platforms defined in the smart contract, wherein the notification indicates the detected suspicious transaction.

7. The apparatus of claim 1, wherein the real-time codes include:

code snippets configured to monitor transactions at one or more financial institutions; and code snippets configured to generate one or more notifications based on the monitored financial transactions.

8. The apparatus of claim 1, wherein the processor circuitry is to:

submit the minted KYC NFT to a set of selected financial institutions; and receive, from each financial institution in the set of selected financial institutions, an indication of an account opened for the user based on the KYC NFT.

9. The apparatus of claim 1, wherein the set of user data items includes an NFT identity (ID) associated with the user, wherein the NFT ID is generated by an NFT ID service that is separate from the KYC NFT service or the NFT ID generated by the KYC NFT service.

10. At least one non-transitory computer-readable media (NTCRM) comprising instructions for providing a know your customer (KYC) non-fungible token (NFT) service, wherein execution of the instructions is to cause a computing device to:

implement a distributed NFT engine architecture operating across multiple servers and computing nodes;

receive, via a user application (app), a set of user data items associated with a user;

verify each user data item of the set of user data items, wherein the verification includes biometric authentication using sensor hardware that captures physiological characteristics and processes the physiological characteristics through biometric processing circuits, and authenticating at least a portion of the set of user data items from other sources and comparing biographic data against publicly available data to verify an identity of the user;

generate a set of hashes, wherein each hash in the set of hashes corresponds to a verified user data item in the set of user data items;

mint a KYC NFT that includes each hash in the set of hashes;

update a smart contract to include the KYC NFT;

receive one or more anti-money laundering (AML) policies from multiple organizations;

convert the AML policies into a set of real-time codes comprising the smart contract, wherein the real-time codes include conditions, parameters, and criteria for monitoring electronic transactions over one or more networks at the multiple organizations and for detecting potential money laundering activities;

monitor, in real-time via the smart contract, electronic transactions over the one or more networks across the multiple organizations associated with the user;

detect suspicious activity by configuring machine learning algorithms executing on neural processing units to analyze patterns of the electronic transactions over the one or more networks in real-time across the multiple organizations that are not detectable by individual organizations, wherein the patterns include one or more of i) monitoring deposits made into a predetermined or configurable number of financial institution accounts, ii) deposits made by the user into other accounts at various organizations that are owned or not owned by the user, iii) making multiple matching deposits, transfers, or payments on the same day or in successive days, or iv) multiple low-score users associated with different organizations making deposits into a single account; and automatically generate and transmit notifications to relevant entities upon detection of the suspicious activity.

11. The NTCRM of claim 10, wherein execution of the instructions is to cause the computing device to:

generate a block for inclusion in a blockchain, wherein the block includes the minted KYC NFT or the set of hashes; and add the generated block to the blockchain after verification of the generated block.

12. The NTCRM of claim 11, wherein the block includes a hash of a previous block in the blockchain, and the block does not include the set of user data items.

13. The NTCRM of claim 11, wherein execution of the instructions is to cause the computing device to:

cause storage of the set of user data items in a private database separate from the blockchain.

14. The NTCRM of claim 10, wherein the generated smart contract includes conditions, parameters, or criteria for detecting potential money laundering activities, and execution of the instructions is to cause the computing device to:

detect a suspicious transaction based on the conditions, parameters, or criteria in the smart contract; and send a notification to one or more computing platforms defined in the smart contract, wherein the notification indicates the detected suspicious transaction.

15. The NTCRM of claim 14, wherein execution of the instructions is to cause the computing device to:

receive one or more anti-money laundering (AML) policies from one or more organizations;

generate a set of real-time codes from the AML policies; and generate the conditions, parameters, or criteria in the smart contract based on the set of real-time codes.

16. The NTCRM of claim 15, wherein the real-time codes include:

code snippets configured to monitor transactions at one or more financial institutions; and code snippets configured to generate one or more notifications based on the monitored financial transactions.

17. The NTCRM of claim 10, wherein execution of the instructions is to cause the computing device to:

submit the minted KYC NFT to a set of selected financial institutions; and receive, from each financial institution in the set of selected financial institutions, an indication of an account opened for the user based on the KYC NFT.

18. The NTCRM of claim 10, wherein the set of user data items includes one or more of: an NFT identity (ID) associated with the user, personal information, confidential information, sensitive information, one or more identity documents, authentication or authorization credentials, biometric data, electronic health records, knowledge-based authentication (KBA) data, social media profile data, or user system data of a user system used to provide the set of user data items to the KYC NFT service.

19. The NTCRM of claim 18, wherein the user system data includes one or more of: one or more user identifiers (IDs) or addresses, one or more timestamps, one or more digital certificates, geolocation information associated with access of the KYC NFT service, a client app ID, an app type of the app, app vendor, version of the app, app session ID of the app, user agent string, operating system (OS) type, an OS version, OS vendor, network session ID, device ID, serial number, product ID, a cookie ID, domain name, a rendering engine type, a rendering engine version, a device type of the user system, a device manufacturer, hardware platform type, one or more device serial numbers, a device fingerprint, system information of the user system, a screen or display resolution of the user system, or metadata.

* * * * *